US007006993B1

(12) United States Patent
Cheong et al.

(10) Patent No.: US 7,006,993 B1
(45) Date of Patent: Feb. 28, 2006

(54) METHOD AND APPARATUS FOR SURROGATE CONTROL OF NETWORK-BASED ELECTRONIC TRANSACTIONS

(75) Inventors: Leslie Cheong, San Jose, CA (US); Jeffrey A. Mason, Los Altos Hills, CA (US); David A. Vogt, San Leandro, CA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 09/579,787

(22) Filed: May 26, 2000

Related U.S. Application Data

(60) Provisional application No. 60/136,734, filed on May 28, 1999.

(51) Int. Cl.
*G06F 17/60* (2006.01)

(52) U.S. Cl. ............................ 705/38; 705/35; 705/39; 705/40; 705/42

(58) Field of Classification Search .................. 705/39, 705/41, 26, 42, 43, 38, 35, 40
See application file for complete search history.

(56) References Cited

U.S. PATENT DOCUMENTS

| | | | | |
|---|---|---|---|---|
| 4,454,414 | A | 6/1984 | Benton | 235/379 |
| 4,654,793 | A | 3/1987 | Elrod | 364/401 |
| 4,725,719 | A | 2/1988 | Oncken et al. | 235/487 |
| 4,837,422 | A | 6/1989 | Dethloff et al. | 235/380 |
| 4,859,837 | A | 8/1989 | Halpern | 235/380 |
| 4,906,828 | A | 3/1990 | Halpern | 235/379 |
| 4,968,873 | A | 11/1990 | Dethloff et al. | 235/380 |
| 5,287,269 | A | 2/1994 | Dorrough et al. | 364/408 |
| 5,321,241 | A | 6/1994 | Craine | 235/380 |
| 5,326,960 | A | 7/1994 | Tannenbaum | 235/379 |
| 5,350,906 | A | 9/1994 | Brody et al. | 235/379 |
| 5,408,082 | A | 4/1995 | Takagi et al. | 235/492 |
| 5,450,477 | A | 9/1995 | Amarant et al. | 379/93 |
| 5,500,513 | A | 3/1996 | Langhans et al. | 235/380 |
| 5,530,232 | A | 6/1996 | Taylor | 235/380 |

(Continued)

FOREIGN PATENT DOCUMENTS

| | | | |
|---|---|---|---|
| EP | 0793110 A2 | * | 2/1997 |
| GB | 0 848 360 A1 | * | 6/1998 |

OTHER PUBLICATIONS

Hoffman, T., "The Check's In The E-Mail; Banks Plan Electronic Payment System", *Computerworld*, Sep. 4, 1995.

(Continued)

*Primary Examiner*—Jagdish N Patel
(74) *Attorney, Agent, or Firm*—Finnegan Henderson Farabow Garrett & Dunner LLP

(57) ABSTRACT

A surrogate system for the transparent control of electronic commerce transactions is provided through which an individual without a credit card is enabled to shop at online merchant sites. Upon opening an account within the surrogate system, the account can be funded using numerous fund sources, for example credit cards, checking accounts, money orders, gift certificates, incentive codes, online currency, coupons, and stored value cards. A user with a funded account can shop at numerous merchant web sites through the surrogate system. When merchandise is selected for purchase, a purchase transaction is executed in which a credit card belonging to the surrogate system is temporarily or permanently assigned to the user. The credit card, once loaded with funds from the user's corresponding funded account, is used to complete the purchase transaction. The surrogate system provides controls that include monitoring the data streams and, in response, controlling the information flow between the user and the merchant sites.

56 Claims, 60 Drawing Sheets

U.S. PATENT DOCUMENTS

| | | | | |
|---|---|---|---|---|
| 5,559,313 | A | 9/1996 | Claus et al. | 235/380 |
| 5,566,327 | A | 10/1996 | Sehr | 395/600 |
| 5,578,808 | A | 11/1996 | Taylor | 235/380 |
| 5,581,663 | A | 12/1996 | Zlotin et al. | 395/51 |
| 5,621,201 | A | 4/1997 | Langhans et al. | 235/380 |
| 5,751,956 | A | 5/1998 | Kirsch | 395/200.33 |
| 5,774,870 | A | 6/1998 | Storey | 705/14 |
| 5,794,259 | A | 8/1998 | Kikinis | 707/507 |
| 5,806,045 | A * | 9/1998 | Biorge et al. | 705/14 |
| 5,825,003 | A * | 10/1998 | Jennings et al. | 235/379 |
| 5,825,863 | A | 10/1998 | Walker | 379/144 |
| 5,835,718 | A | 11/1998 | Blewett | 395/200.48 |
| 5,864,830 | A | 1/1999 | Armetta et al. | 705/41 |
| 5,914,472 | A | 6/1999 | Foladare et al. | 235/380 |
| 5,945,653 | A | 8/1999 | Walker et al. | 235/380 |
| 5,953,710 | A | 9/1999 | Fleming | 705/38 |
| 5,987,402 | A | 11/1999 | Murata et al. | 704/2 |
| 5,991,795 | A | 11/1999 | Howard et al. | 709/201 |
| 5,999,596 | A | 12/1999 | Walker et al. | 379/91.01 |
| 6,009,412 | A | 12/1999 | Storey | 705/14 |
| 6,014,638 | A | 1/2000 | Burge et al. | 705/27 |
| 6,018,718 | A | 1/2000 | Walker et al. | 705/14 |
| 6,021,943 | A | 2/2000 | Chastain | 235/379 |
| 6,029,175 | A | 2/2000 | Chow et al. | 707/104 |
| 6,044,360 | A | 3/2000 | Picciallo | 705/21 |
| 6,052,730 | A | 4/2000 | Felciano et al. | 709/225 |
| 6,108,637 | A | 8/2000 | Blumenau | 705/7 |
| 6,108,641 | A * | 8/2000 | Kenna et al. | 705/35 |
| 6,138,162 | A | 10/2000 | Pistriotto et al. | 709/229 |
| 6,173,269 | B1 * | 1/2001 | Solokl et al. | 705/35 |
| 6,173,311 | B1 | 1/2001 | Hassett et al. | 709/202 |
| 6,182,226 | B1 | 1/2001 | Reid et al. | 713/201 |
| 6,185,625 | B1 | 2/2001 | Tso et al. | 709/247 |
| 6,199,077 | B1 | 3/2001 | Inala et al. | 707/501 |
| 6,205,435 | B1 * | 3/2001 | Biffar | 705/41 |
| 6,295,522 | B1 * | 9/2001 | Boesch | 705/41 |
| 6,339,766 | B1 * | 1/2002 | Gephart | 705/44 |
| 6,360,209 | B1 * | 3/2002 | Loeb et al. | 705/34 |

OTHER PUBLICATIONS

"New Web Site Enables Teens and Kids to Shop and Save Online", ICanBuy Press release, Jan. 26, 1999.
"FSU Smart Card eases campus life here and around the country", *FS-Times*, vol. I, Issue 3, Apr. 1996.
"Florida State University", from website www.itc.icl.ie/products/smartcard/ems/fsucase.htm, Sep. 1996.
"Florida State University", from website www.fujitsu.com.au/products/cards/florida.htm, 1996, 2 pgs.
"Florida State University AEs FSUCard—A MultiPurpose Identification Card", from website www.house.gov/castle/banking/norwood3.htm, Jul. 10, 1996, 4 pgs.
"Smart Card—FSU Thinks Smart", *Nole Notes*, vol. VI, No. 4, Sept. 1996.
Saker, R., "This year the War Department aims for fairer FSU Card fees", *Florida Flambeau*, Feb. 12, 1997.
Berinato, S., "Smart cards move to head of class", *PCWeek Online*, Mar. 24, 1997, 4 pgs.
Knowles, R., "The future of technology could find roots in Tallahassee, FSU", *Florida Flambeau*, Apr. 25, 1997, 2 pgs.
"Smart card marches on ", *FS-Times*, vol. I, Issue 6, Sep. 1996.
Sinton, P., "Visa Wants To Kill Cash. It hopes "smart cards" will become the payment method of choice", *San Francisco Chronicle*, Oct. 11, 1995, p. B1.
Heady, R., "Brokers Compete With Lenders", *The Denver Post*, Nov. 19, 1995, p. J-14.
Garfinkel, S., "Companies Rush To Say "Buy-Buy" Over Net", *San Jose Mercury News*, Oct. 1, 1996.
Landbert, M., "Verifone Wants To Plug In To Cash", *San Jose Mercury News*, Oct. 1, 1996.
Swenson, J., "Filing Expenses Via American Express", *Information Week*, Jul. 1, 1996, p. 103.
Gianturco, M., "Digital Cash", *Forbes*, Aug. 14, 1995, p. 164.

* cited by examiner

3100

METHOD AND APPARATUS FOR SURROGATE CONTROL OF NETWORK-BASED ELECTRONIC TRANSACTIONS

RELATED APPLICATION

This application claims the benefit of U.S. Provisional Application No. 60/136,734, filed May 28, 1999.

BACKGROUND OF THE INVENTION

1. Field of the Invention

This invention relates to the field of electronic commerce. In particular, the invention relates to surrogate control of electronic commerce transactions.

2. Description of the Related Art

The rapid growth and expansion of network and Internet technologies has facilitated electronic commerce transactions, particularly in the area of consumer retail goods. Taking advantage of the widespread availability of the Internet, numerous retailers have gone online with retail shopping sites on the World Wide Web (web). These sites allow consumers to shop easily and conveniently from the comfort of their homes and offices. However, access to electronic shopping is limited to those possessing specific forms of credit or cash that can be transferred electronically.

Numerous non-cash techniques are typically used for executing purchase transactions among purchasers and online merchants. Indeed, numerous types of credit cards and banking cards are in widespread use. For example, a credit card can be used to effect online purchases, with the transaction being paid for by a credit card clearing house or bank and creating a credit obligation for the owner of the credit card. Another type of card which looks like a credit card but functions differently is the debit card. The debit card is used much like a credit card in that it is tendered by the purchaser to an online merchant for payment. Payment is effected from a bank to the merchant and the funds are deducted directly from the card holder's bank account.

However, the problem with credit cards and debit cards is that certain conditions have to be met for issuance, conditions that can include restrictions on age and financial criteria. As a result, many consumers do not meet the requirements for credit card or debit card issuance, thereby eliminating them from the ranks of online shoppers. Furthermore, the negative security implications associated with exposing credit card or debit card account numbers over a public network like the Internet make many consumers uncomfortable. Thus, while many of these consumers have the technology and financial resources available, they are put out of reach of online merchants because they do not have a particular form of financial resources.

As an alternative to cash and credit cards, stored value cards are now available. Stored value cards require the purchase of a card which looks much like a credit card, but which has a limited amount of available value to be spent. The balance is contained in a magnetic strip or computer chip in the card. As the stored value card is used, the remaining balance on the card is depleted. However, like some debit cards, stored value cards do not enjoy the functionality of credit cards in many business transactions, particularly electronic commerce purchases.

One possible solution to this problem for some, particularly minor children, is found in secondary credit cards. A credit card holder may obtain one or more secondary credit cards from the issuer, as for example for family members, that are linked to the main credit card. The secondary credit cards are functionally identical to the main credit card in all respects and, indeed, typically bear the same account number and differ from the primary card only in the name of the person who is authorized to use the secondary card. Any purchases made with the secondary credit cards are debited against the credit limit of the single account in which the primary and secondary cards are issued. Thus, the main or primary cardholder has no control over the spending power or abilities of the secondary credit cards linked to his card, beyond the fact that the total of all debts incurred by all cards on the account cannot exceed the credit limit of the main credit card.

These secondary credit cards, therefore, are problematic because the secondary cardholders can quickly accumulate a significant outstanding balance on the main credit card account, thus reducing the main cardholder's spending power. Most importantly, the main cardholder is not aware of the decrease in the available credit or spending limit as a result of expenditures by a secondary cardholder. Consequently, there is a need for a system or service that enables those without a credit card, for example teenage children, to shop and buy at online merchants without requiring a credit card.

SUMMARY OF THE INVENTION

A method and apparatus for surrogate control of electronic commerce transactions are provided that include a surrogate system through which an individual without a credit card is enabled to shop at online merchant sites. Upon opening an account within the surrogate system, the account can be funded using numerous fund sources, for example credit cards, checking accounts, money orders, gift certificates, incentive codes, online currency, coupons, and stored value cards. A user with a funded account can shop at numerous merchant web sites through the surrogate system using a typical client computer World Wide Web (web) browser. When merchandise is selected for purchase, a purchase transaction is executed in which a credit card belonging to the surrogate system is assigned to the user. The assignment can be permanent or temporary. The credit card is loaded with funds from the user's corresponding funded account, and used to complete the purchase transaction. While the surrogate system is transparent to the user, controls are provided that include monitoring the data streams and, in response, controlling the information flow between the user and the merchant sites.

The descriptions provided herein are exemplary and explanatory and are provided as examples of the claimed invention.

BRIEF DESCRIPTION OF THE FIGURES

The accompanying drawings illustrate embodiments of the claimed invention. In the drawings:

DETAILED DESCRIPTION

A method and apparatus for surrogate control of network-based electronic commerce or retail transactions are provided in which a World Wide Web ("web") site is provided by a surrogate system that allows anyone not having or not eligible for a credit card, like teenagers and young adults, to shop at online merchant electronics storefronts such as the web sites for Amazon or Barnes and Noble when provided with an account. The account can be funded personally or by another. Advantages of this method and apparatus are numerous.

One advantage of the surrogate web site is that it does not detract from the actual online shopping experience. The spenders shop on the merchant site as if they accessed the site directly without going through the surrogate web site. Furthermore, spenders do not have to enter credit card information to complete their purchases. In fact, spenders do not have to fill out the confusing payment pages that merchants provide for check out. Moreover, in the case of young people, an advantage is realized in that they have the freedom and independence to shop on their own while giving their parents the peace of mind that comes with security, control, and the opportunity to teach financial responsibility.

Another advantage is that special software is not required to be installed on either the client, user, or merchant end of the transaction. As such, spenders and funders are not required to install any software on their personal computers in addition to a typical web browser that provides network access, for example Internet access. Also, the online merchants are not required to install any special server software or modify their web pages in order to accommodate the surrogate transactions. As the surrogate system funds the online transactions, eligible spenders using the surrogate system are not allowed to see the credit card numbers used to complete the merchant transaction. Because these credit cards are actually owned by the surrogate in an embodiment, these numbers are not provided to the spenders or any other party to the transaction.

Figure 1:
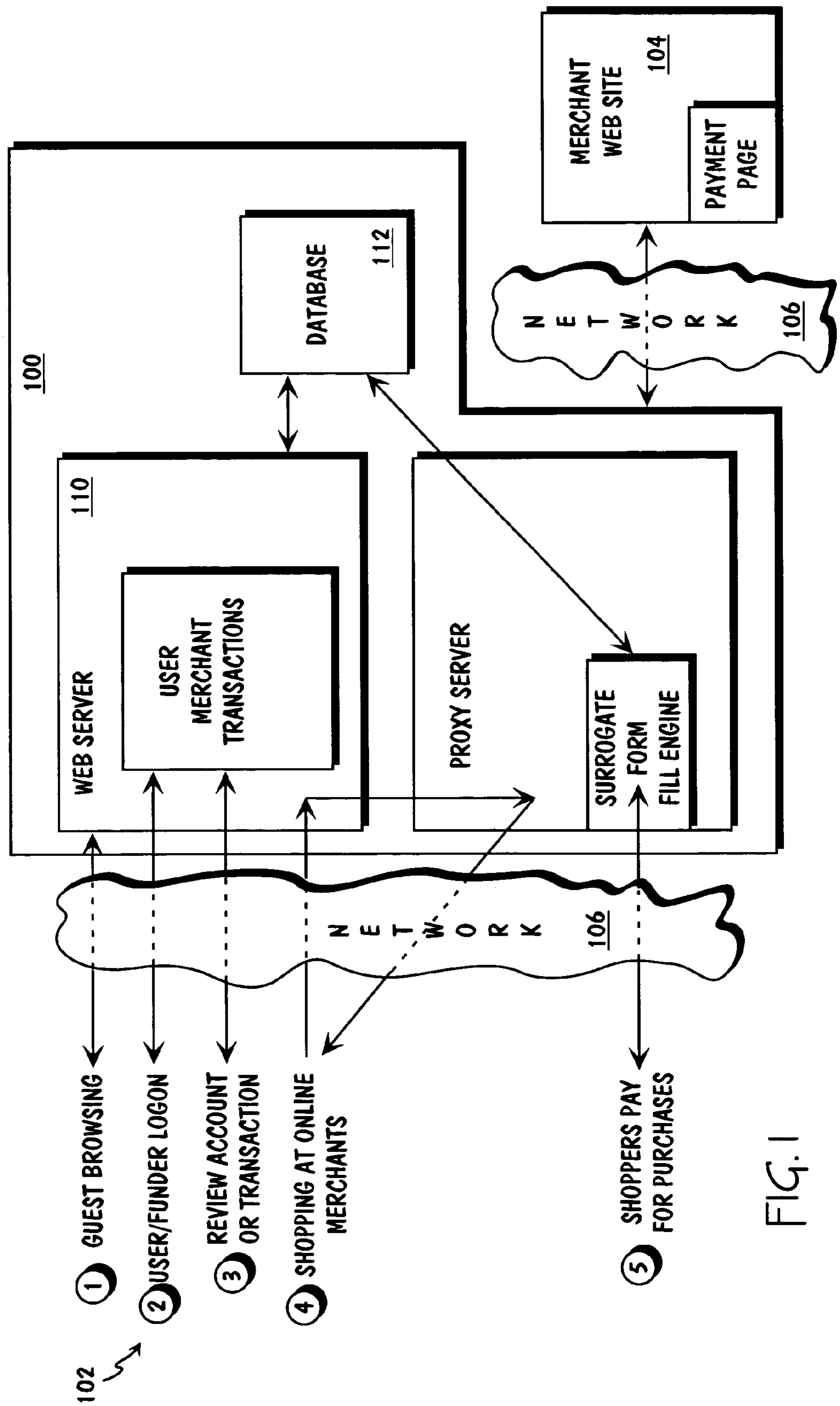
FIG. 1 is a block diagram of a surrogate system for control of electronic commerce or retail transactions of an embodiment.

FIG. 1 is a block diagram of a surrogate system 100 for control of electronic commerce or retail transactions of an embodiment. The surrogate system 100 is coupled among users 102 and online merchant web sites 104 via at least one network 106. The network 106 includes the Internet, local area networks, wide area networks, wired networks, and wireless networks. Furthermore, different components of the surrogate system 100 can be located at different physical locations and linked via network couplings.

The surrogate system 100 uses proxy-caching technology that enables it to allow spenders seemingly full access to an online merchant shopping site while allowing the surrogate system 100 to maintain complete control of the transactional information, including credit card exposure. In an embodiment, the surrogate system 100 comprises a Sun Ultra 250 single 400 megahertz (MHz) central processing unit (CPU) with six 9-gigabyte Small Computer System Interface (SCSI) disks, an ethernet network adaptor, a DLT 70-gigabyte tape drive device, the Solaris 2.6 Operating System, a Hypertext Transfer Protocol (HTTP) server, and an Oracle database, but is not so limited. In an embodiment, the tape drive device will be installed on the database server and backups will occur on a regular periodic basis. For more immediate data redundancy, the hard disk storage for the HTTP machine will employ redundant array of independent disks (RAID), or redundant array of inexpensive disks, disk mirroring. In this manner, if one set of disks go down, the server can remain online with the mirror disks while the original disks are being repaired.

The transactions available using the surrogate system 100 include guest browsing, account setup or activation, funder logon, spender logon, funder account review, funder transactional information, spender account review, spender transactional information, spender shopping at an online merchant, and spender purchase transactions, but are not so limited. As one can open and fund an account for themselves, a spender and a funder can be one in the same. Guest browsing 1 includes people accessing the surrogate web server 110 through the surrogate web site to get information about the surrogate services and get links to sign up for surrogate services. The web server 110 also maintains a database 112 of information. This operation is a Hypertext Transfer Protocol (HTTP) operation, but is not so limited.

The user/funder logon 2 is used when a user or funder wants to set up an account, or if a user or funder with existing accounts wants to look at their transaction history 3 or shop 4. This transaction accesses the database 112. The process of setting up new accounts protects the private information of the funder, including any credit card information the funder may use for depositing into a spender account. Once accounts are established, all further transactions with the accounts use the database 112. Logging onto the database 112 results in a logon transaction to the database 112 to verify the identity of the client before proceeding.

The database 112 maintains the information for the finders, spenders, merchants, and transactions registered within the surrogate system 100, per user and per surrogate credit card. The transactional information includes deposits into a spender account in addition to all spender purchases. Purchase transactions 5, in addition to the individual line items, are logged as separate database entries, but are not so limited. As a result, a transaction table handles the transaction entries.

Database access is not necessary for all actions performed using the surrogate system 100. Functions including logon, or login, and review of account information access the database 112 in an embodiment. Also, when a spender buys products, the database 112 is accessed. However, during the shopping process of an embodiment the database 112 may not used. Therefore, an embodiment of the database engine does not require advanced performance features such as replication and partitioning, but is not so limited.

Figure 2:
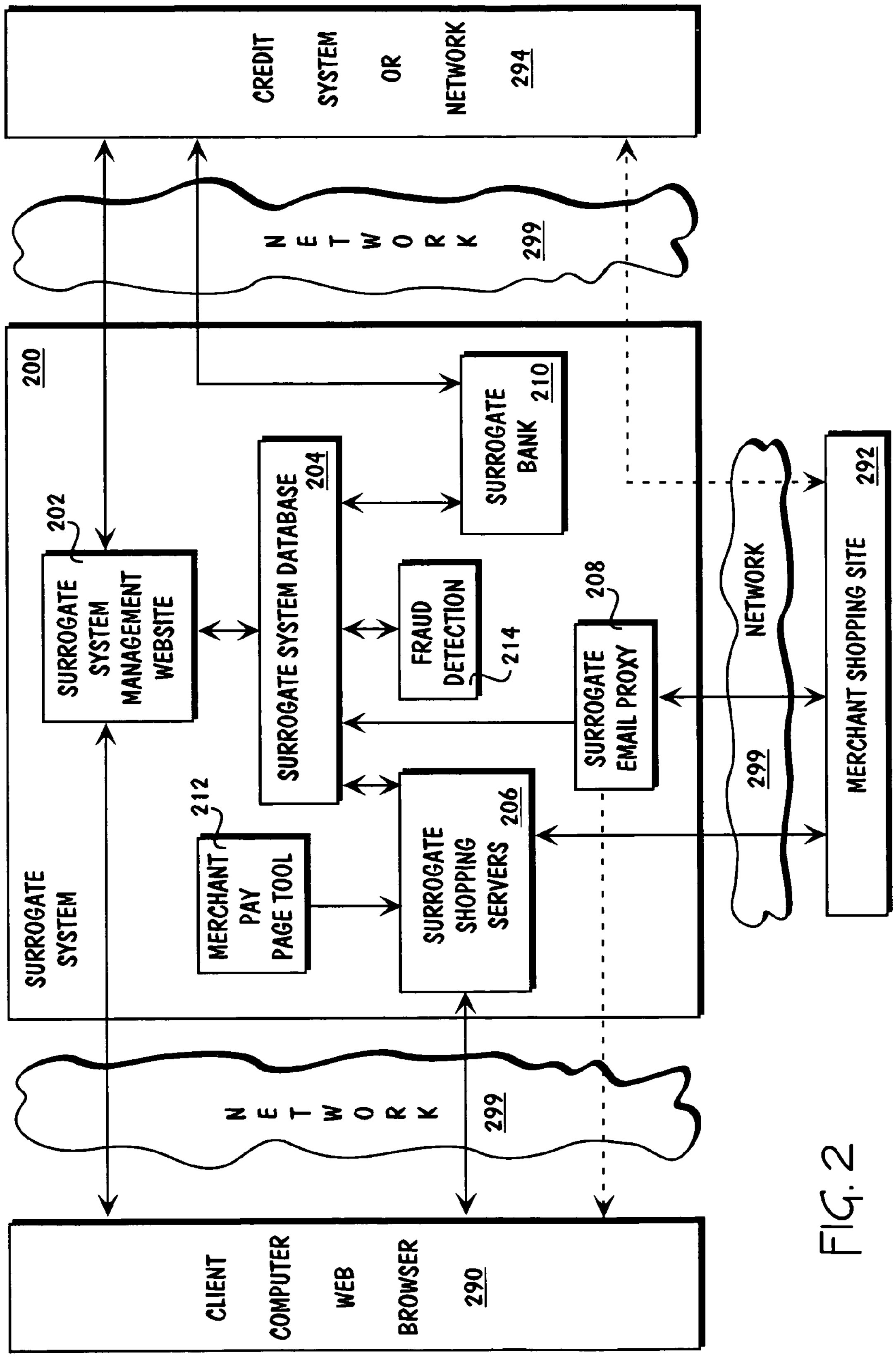
FIG. 2 is a block diagram of a surrogate system for control of network-based electronic transactions of an alternate embodiment.

FIG. 2 is a block diagram of a surrogate system 200 for control of network-based electronic transactions of an alternate embodiment. The surrogate system 200 includes, but is not limited to, at least one surrogate system management web site 202, at least one surrogate system database 204, at least one surrogate shopping proxy server 206, at least one surrogate electronic mail proxy 208, at least one surrogate bank 210, fraud detection devices 214, and at least one merchant pay page tool 212. The surrogate system 200 is accessed by users with a web browser 290 hosted on a client computer. The surrogate system 200 provides shopping access to electronic merchant shopping sites 292.

The surrogate system 200 is coupled among client computers 290, online merchant shopping or web sites 292, and a financial or credit system/network 294 via at least one network 299. The coupling network 299 includes the Internet, local area networks, wide area networks, wired networks, and wireless networks. Furthermore, the components 202–214 of the surrogate system 200 can be located at different physical locations and linked via different network couplings.

Figure 3:
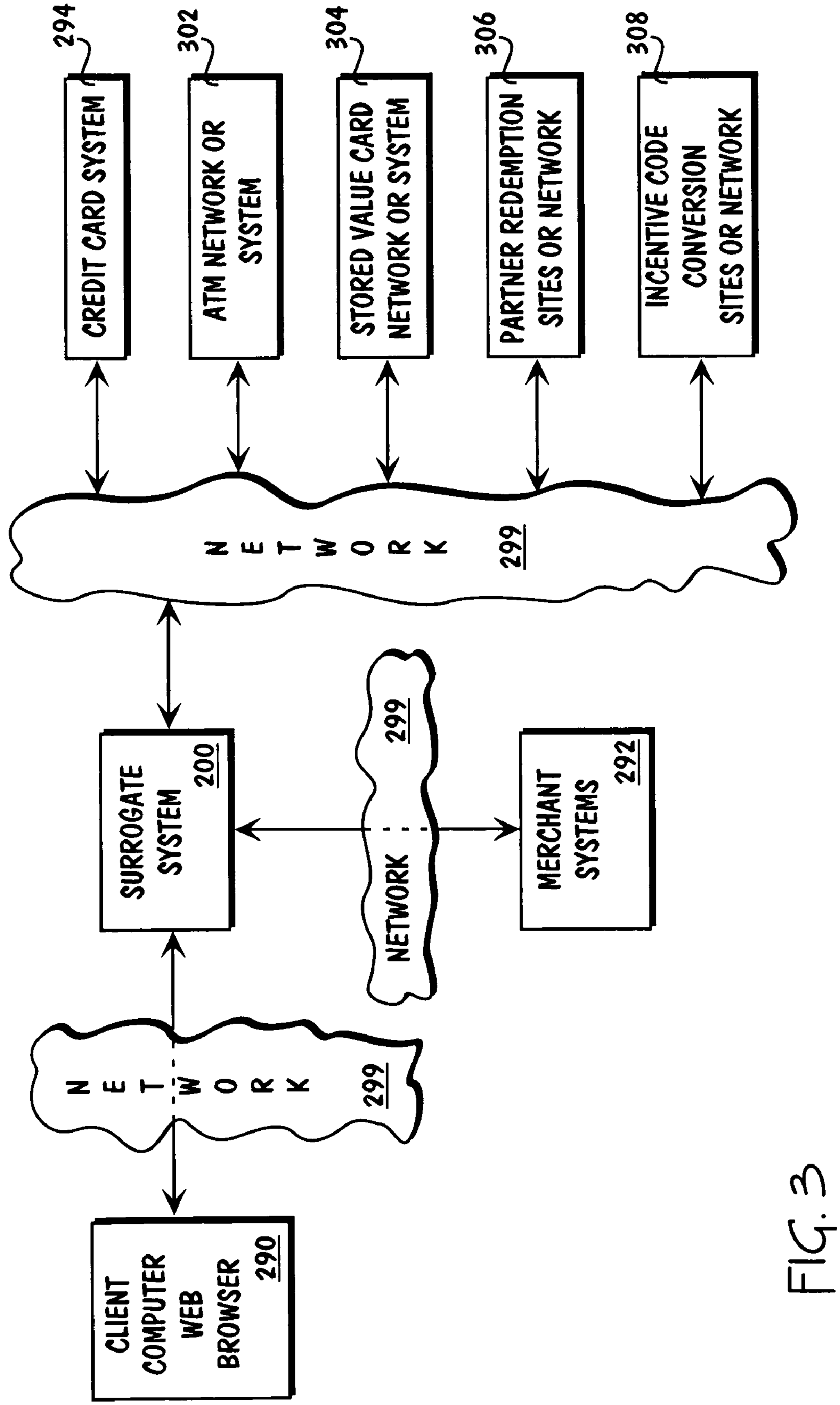
FIG. 3 is a block diagram of a surrogate system of another alternate embodiment.

FIG. 3 is a block diagram of a surrogate system 200 of another alternate embodiment. The surrogate system 200 includes, but is not limited to, a surrogate system management web site, surrogate system databases, surrogate shopping proxy servers, a surrogate electronic mail proxy, a surrogate bank, fraud detection devices, and a merchant pay page tool. The surrogate system 200 is accessed by a user using a web browser 290 hosted on a client computer, and provides shopping access to electronic merchant shopping sites 292.

The surrogate system 200 is coupled to financial systems including a credit card system 294, an Automatic Teller Machine (ATM) network or system 302, a stored value card network or system 304, a partner redemption site or network 306, and an incentive code conversion site or network 308. The surrogate system 200 is coupled among client computers 290, online merchant shopping or web sites 292, and the financial systems 294–308 via at least one network 299 including the Internet, local area networks, wide area networks, wired networks, and wireless networks. Furthermore, different components of the surrogate system can be located at different physical locations and linked via network couplings.

In using the surrogate system, a user creates a new account prior to merchant shopping. A new account can be created by a user without charge, but is not so limited. To create a new account, a user enters the surrogate system management web site. The user navigates to and enters the area to create a new account. The following information is received from the user using prompts or a template: logon name; password; password hint; email address; date of birth; and, any promotion code. The date of birth is used for those sites where the user's age is required; also, it is used for Children's Online Privacy & Protection Act (COPPA) processing. The optional promotion code is used to immediately give the user any sign up promotions (i.e. radio promotion, money for referring another customer, free coupons, etc.). If either the logon name or email address entered as a selection by the user is already taken, the surrogate system so informs the user and takes the user back to the sign-up page.

Upon receipt of the user information, a user account is created in the surrogate system database. The user is provided with credit for any money, coupons, or credits based on the promotion code inputted. Using the provided date of birth, a determination is made whether the user is under 13 years of age. If the user is determined to be under 13 years of age, COPPA processing is performed and creation of an account for the user is terminated. When the user is determined to be 13 years of age or older, an account is created. The user is taken to the surrogate home page from which they can view account information, add money to accounts, or shop, for example.

The surrogate system of an embodiment supports COPPA processing because COPPA was enacted to limit the types of operations provided to users under 13 years of age. The COPPA processing can occur when a new account is created or when someone logs into an account, but is not so limited. When it is determined that the user is under 13 years of age, the surrogate system prevents the user from editing their date of birth. The user is subsequently redirected to a page informing them that parental approval is required, and requesting a parent or guardian email address. If a parent/guardian email address is provided, the surrogate system transmits a parental approval email to the parent email address. The user account is inactivated until parental approval is obtained.

The parental approval email includes a request for the parent to approve or deny the child access to the system. To deny access, the parent goes to the surrogate system management web site page, specifies the user's account, and disables the account. To approve access, the parent goes to the surrogate system management web site page and conforms with one of two available alternatives. Using a first alternative, the parent may use a credit card to prove that they are an adult. The parent may either authorize use of the account by the minor child or deposit money into the child's account; in either case, the surrogate system uses the credit card network to do the authorization/billing. If successful, the child's account is automatically activated. Using a second alternative, the parent may send a written affidavit of permission to the surrogate system providers. Upon receipt of the affidavit the child's account is activated.

Figure 4:
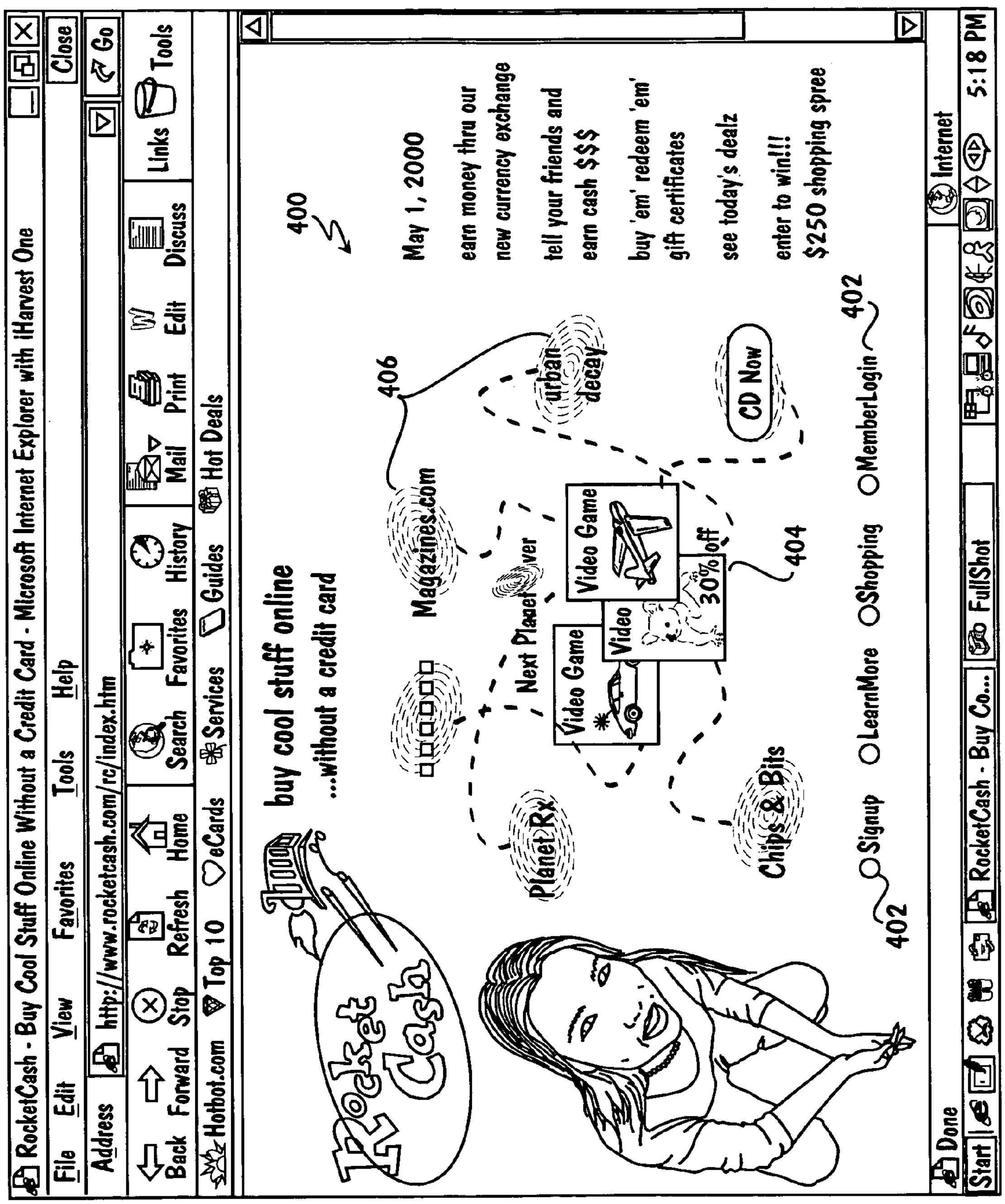
FIG. 4 is a home page or information page provided by a surrogate of an embodiment.

FIG. 4 is a home page 400 or information screen provided by a surrogate of an embodiment. The home page 400 is presented upon initial contact with the surrogate system web site, and comprises information on the services provided by the surrogate 402, advertisements 404, and electronic links to other surrogate web pages 406. The surrogate web pages accessible using the electronic links from the information screen comprise sign up pages, additional information pages, shopping pages, login pages, terms, and privacy screens.

Figure 5:
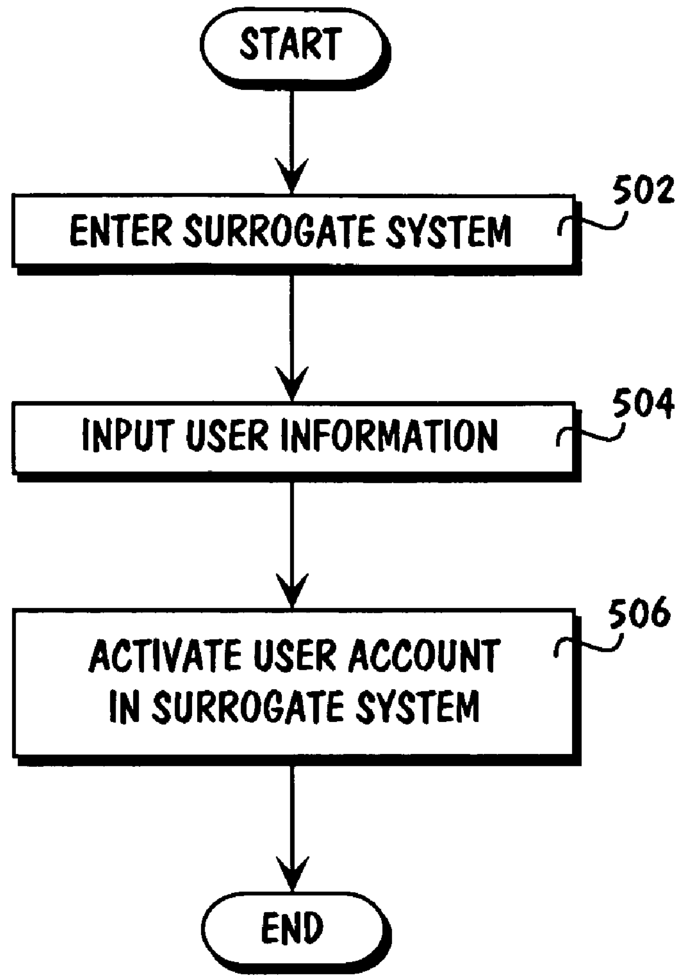
FIG. 5 is a flow chart for an account activation process of an embodiment.

FIG. 5 is a flow chart for an account activation process of an embodiment. Operation begins when a user enters the surrogate system web site 502 using a browser on the user computer. The user is prompted to input information appropriate for activation of a surrogate system account 504. Upon submission and acceptance of the inputted user information, an account is activated for the user 506.

Figure 6:
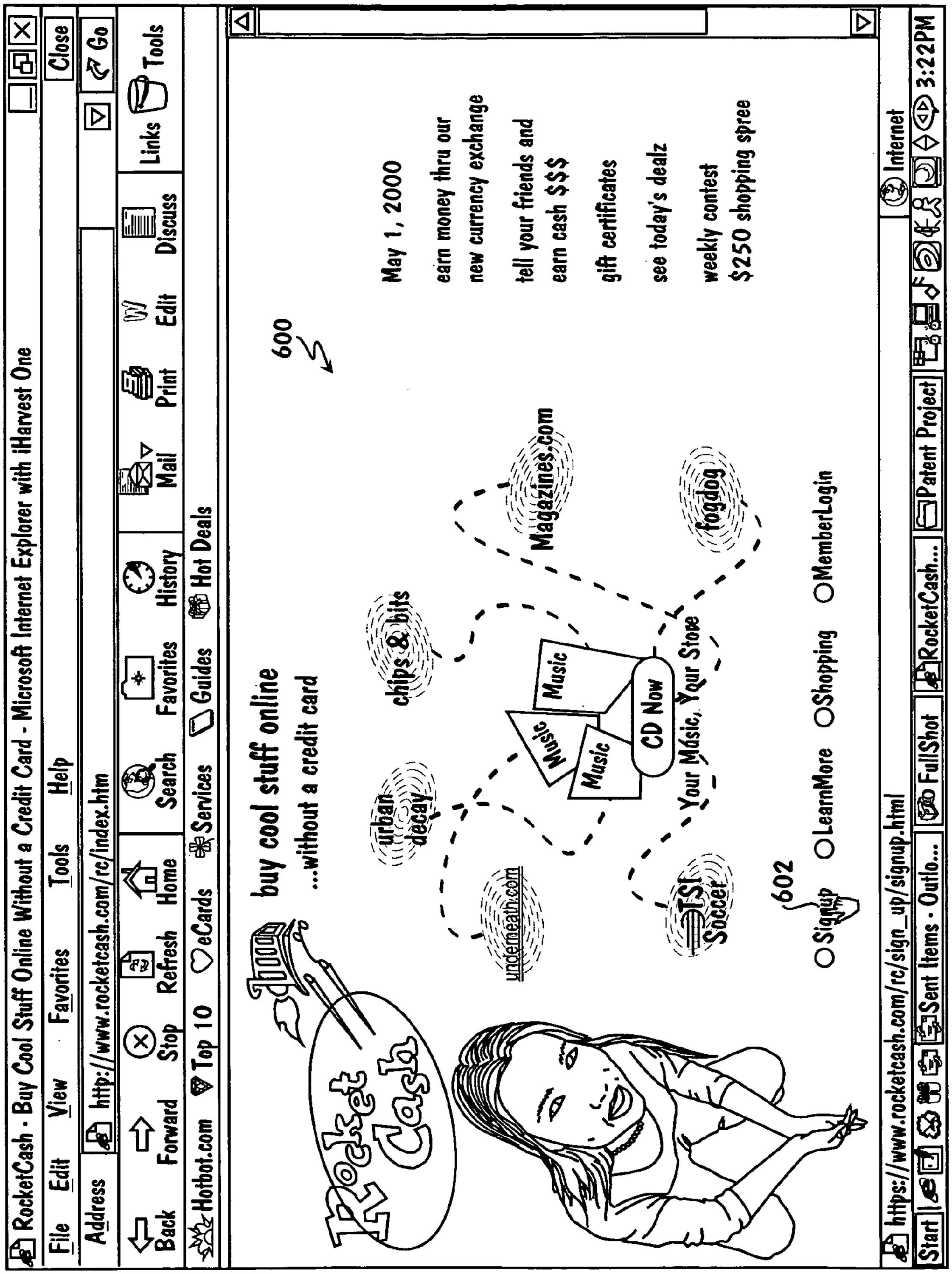
FIG. 6 is a home page from which a user wishing to signup for the surrogate service would click on or select the "signup" icon to begin navigating through the signup process.

FIGS. 6–9 show the web pages for the signup process of an embodiment. FIG. 6 is a home page 600 from which users wishing to signup for the surrogate service would click on or select the "signup" icon 602 with a cursor to begin navigating through the signup process. Selection of the "signup" icon 602 results in presentation of signup pages to the users.

Figure 7:
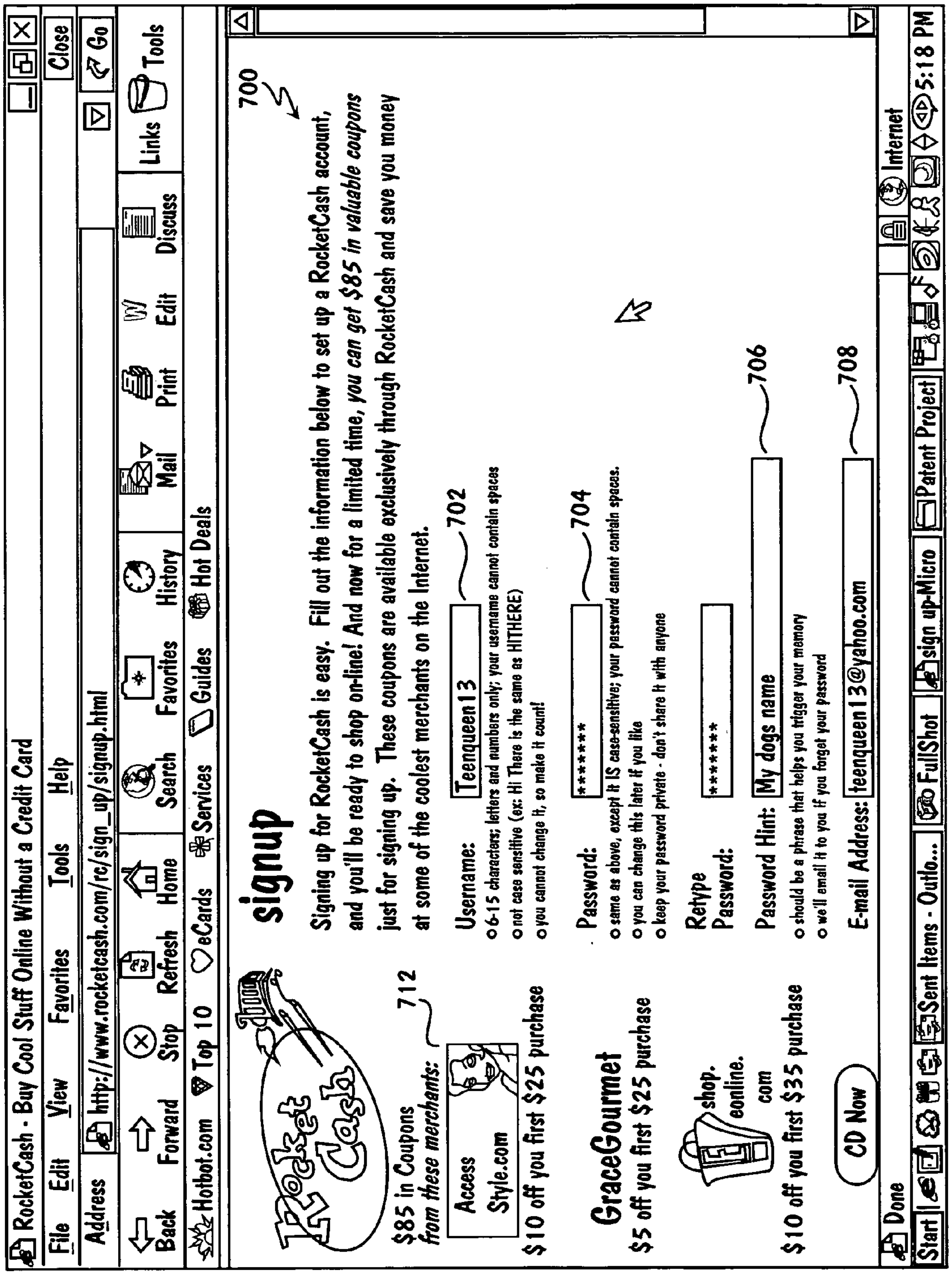
FIGS. 7 and 8 show a signup page of an embodiment.
Figure 8:
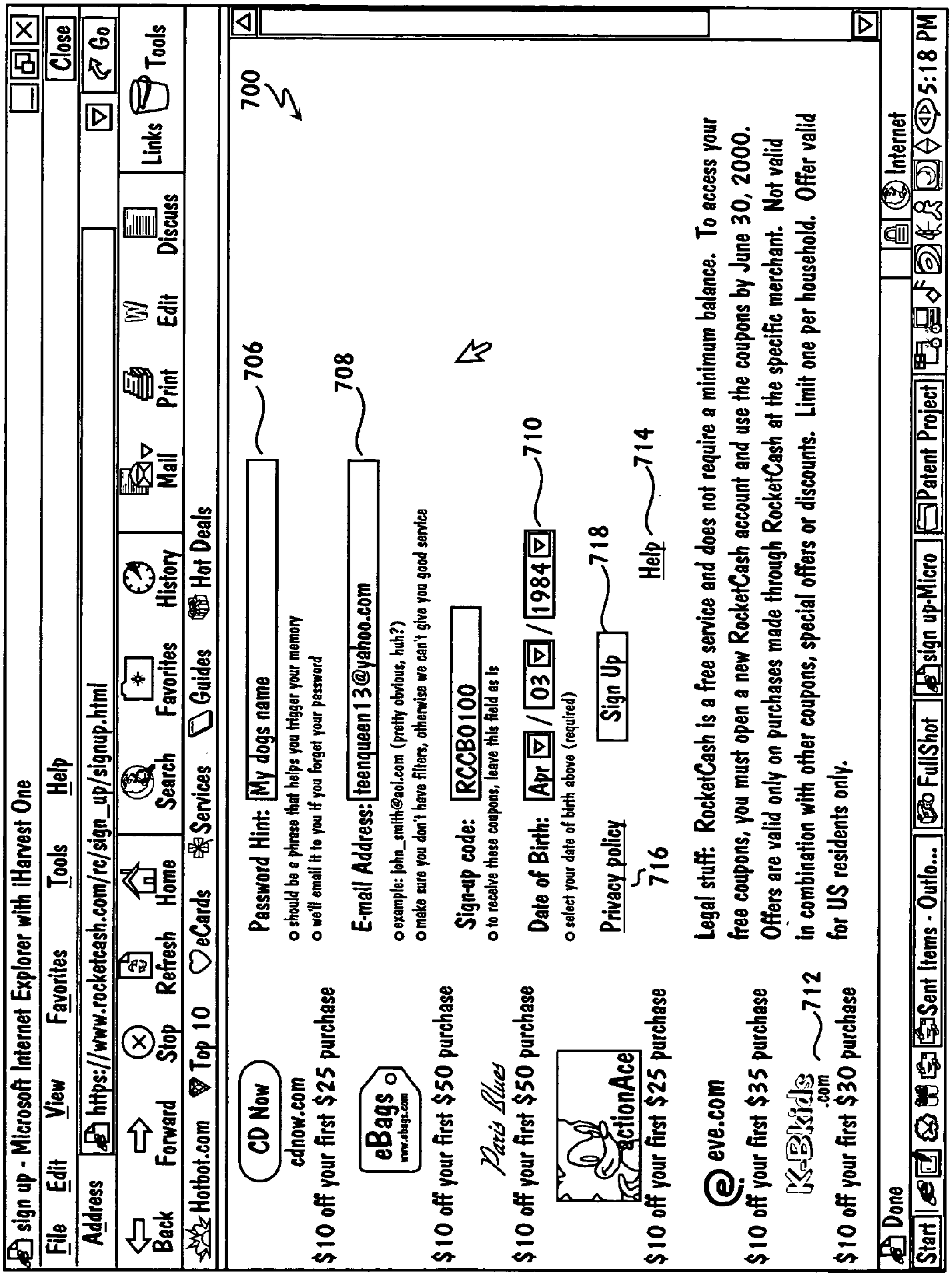

FIGS. 7 and 8 show a signup page 700 of an embodiment. The signup page 700 prompts users to enter a username 702, password 704, password hint 706, email address 708, and date of birth 710, but is not so limited. The signup page 700 also includes electronic links, advertising banners, and incentive offers to online merchants 712 and links to other surrogate system pages including a help area 714 and a privacy policy 716. Following input of the requested information, users wishing to signup would select the "Sign Up" icon 718. Selection of the "Sign Up" icon 718 results in submission of the requested information and, upon acceptance of the requested information by the surrogate system, activation of a shopping account within the surrogate system. Activation of a shopping account results in users being presented with a congratulations page 900.

Figure 9:
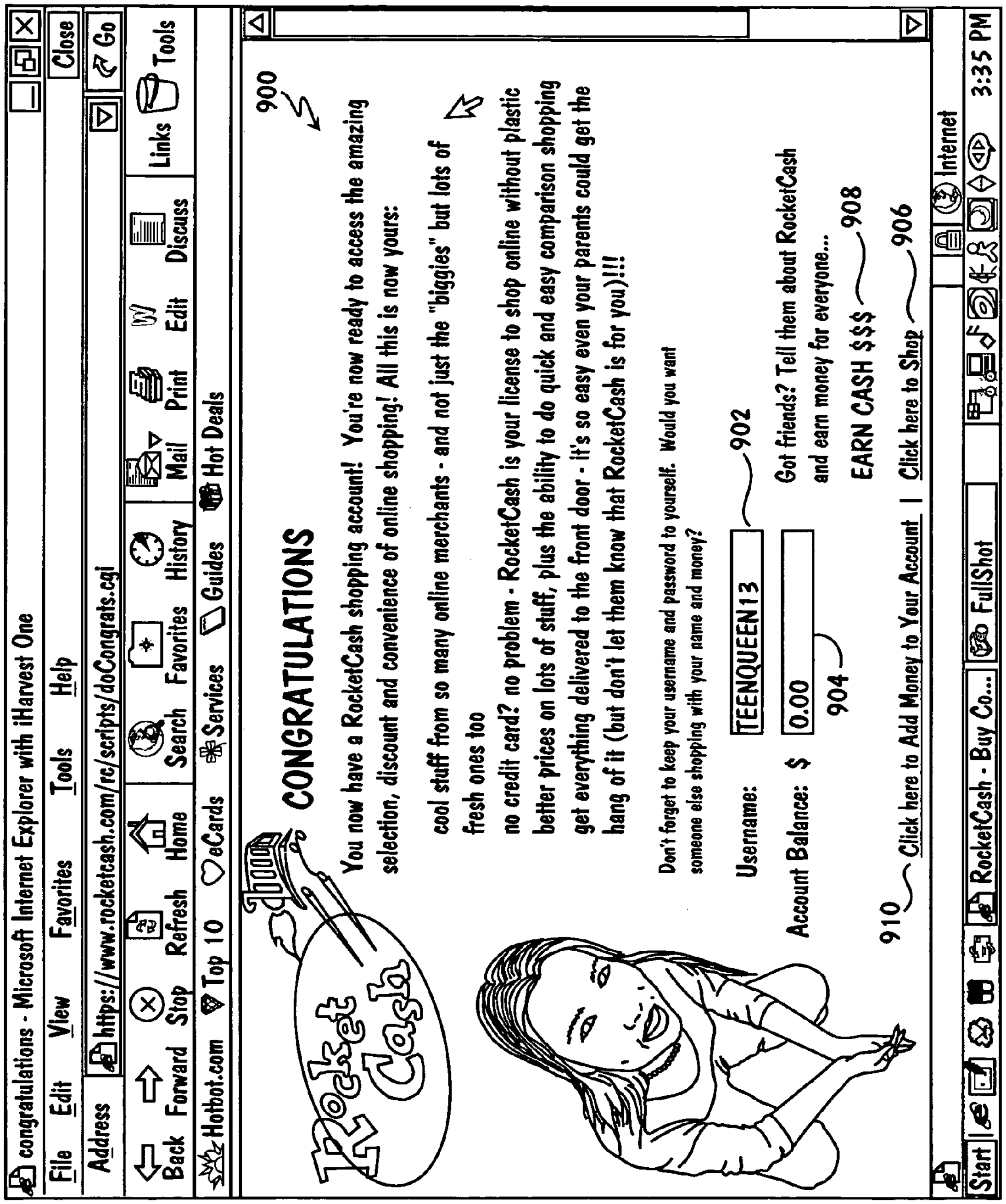
FIG. 9 is a signup congratulations page of an embodiment.

FIG. 9 shows a congratulations page 900 of an embodiment. The congratulations page 900 informs users that they now have a shopping account within the surrogate system and provides them with information about the surrogate system services. Furthermore, the congratulations page 900 provides users with their usernames 902 and account balances 904, but is not so limited. The congratulations page 900 also provides electronic links that allow the user to navigate to areas of the surrogate system from which they may shop 906, earn shopping incentives 908, and fund their account 910, but is not so limited.

Figure 10:
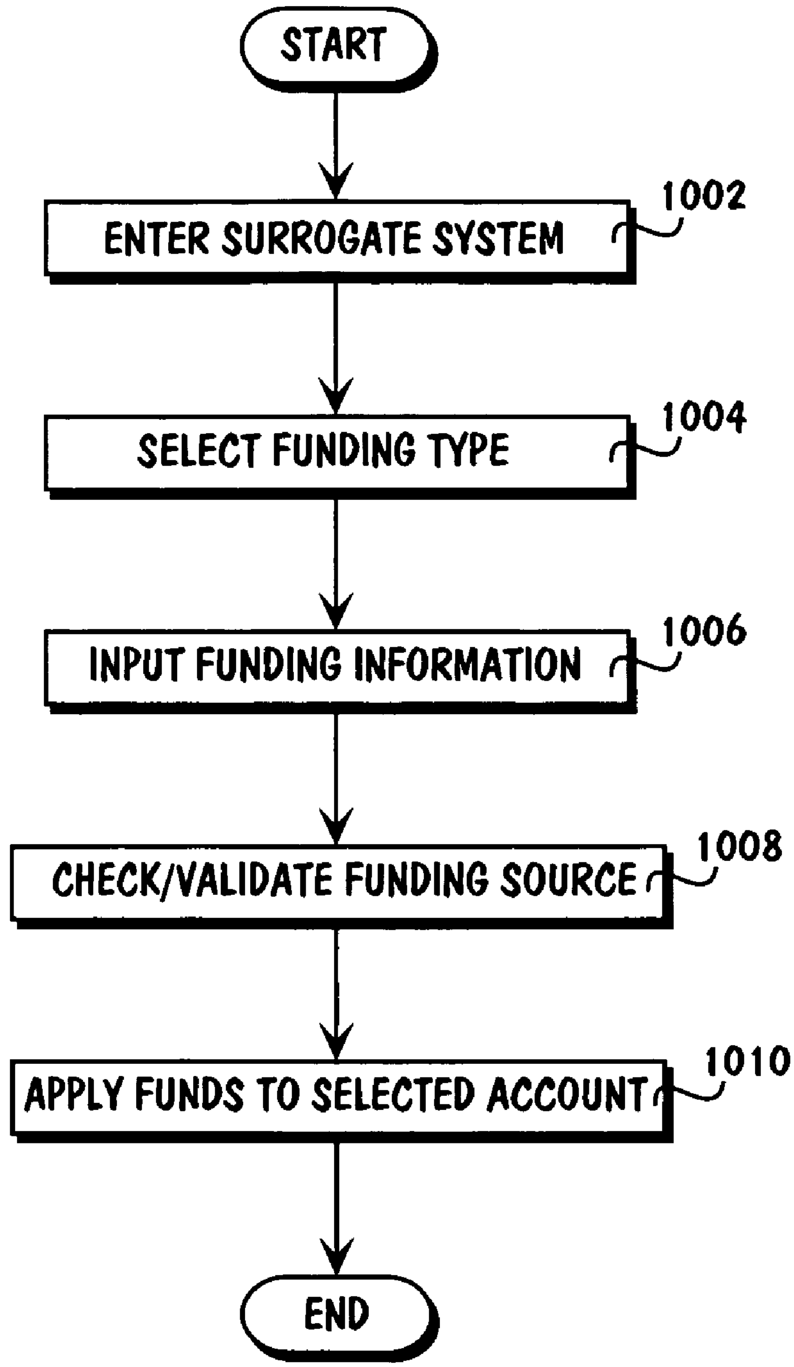
FIG. 10 is a flow chart for an account finding process of an embodiment.

FIG. 10 is a flow chart for an account funding process of an embodiment. Operation begins when a user enters the surrogate system web site 1002 using a browser on the user computer. The user selects a finding type 1004. The user is prompted to input information appropriate for the funding source selected 1006. The surrogate system checks and validates the finding source 1008. Upon approval and validation of the funding source, the funds are credited or applied to a selected account 1010.

Once created, an account is funded prior to executing purchase transactions or concurrently with a purchase transaction. FIGS. 11–14 show the surrogate web pages for the account funding process of an embodiment. In an embodiment, numerous funding types are accommodated including, but not limited to: credit cards; auto-allowance; check; money order; gift certificate; currency conversion; incentive code conversion; earning credit at the surrogate management web site; earning credit at an online merchant web site; automatic teller machine (ATM); and, offline stored value cards. Regardless of the funding type used, the money is not loaded to the user's individual credit card, when one is assigned, until the user attempts to spend at a merchant site.

Figure 11:
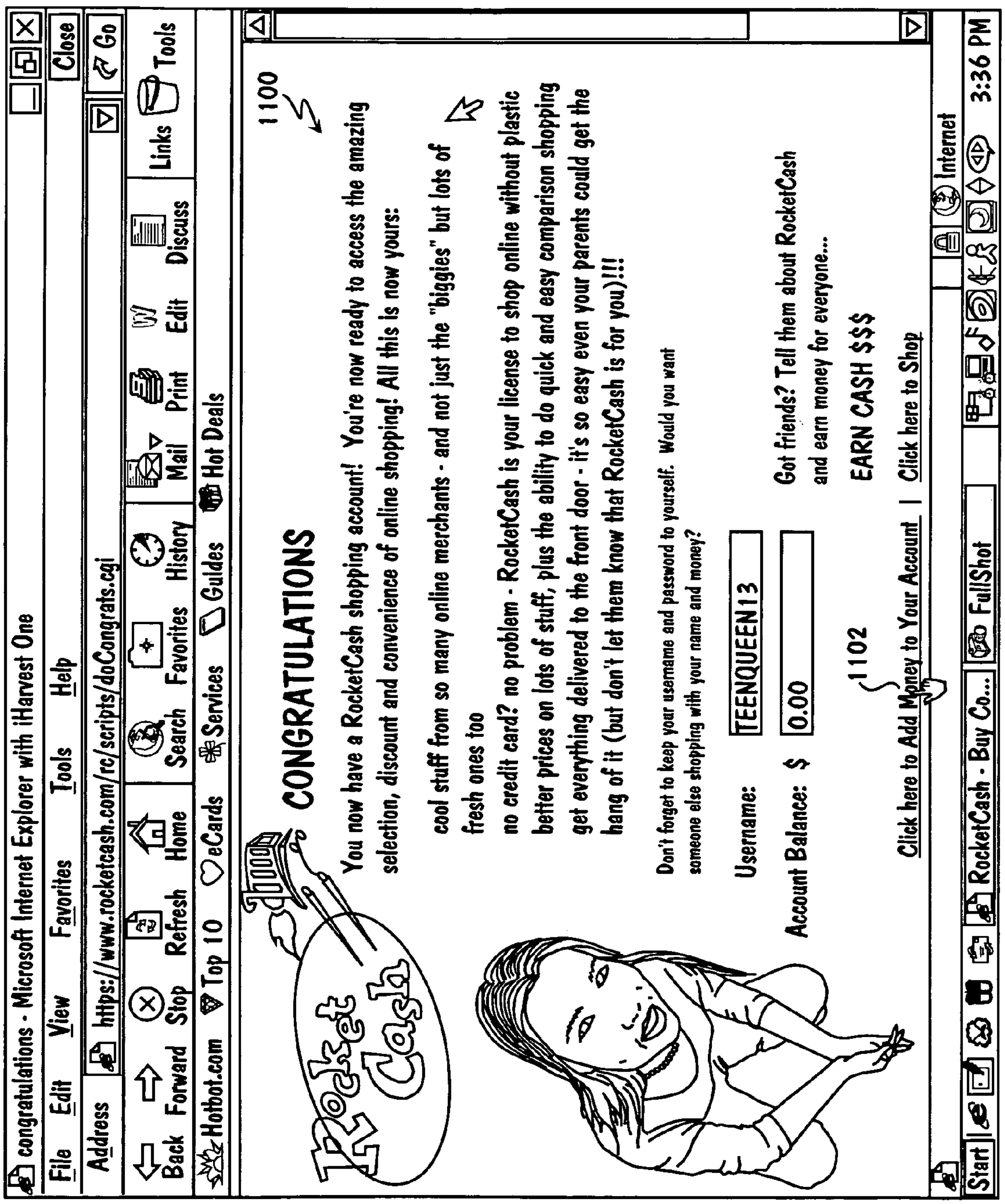
FIG. 11 is a congratulations page of an embodiment.

FIG. 11 shows a congratulations page 1100 of an embodiment. The user manipulates a cursor to select an electronic link 1102 on the congratulations page 1100 that takes the user to an area of the surrogate system from which they can add funds to their account.

Figure 12:
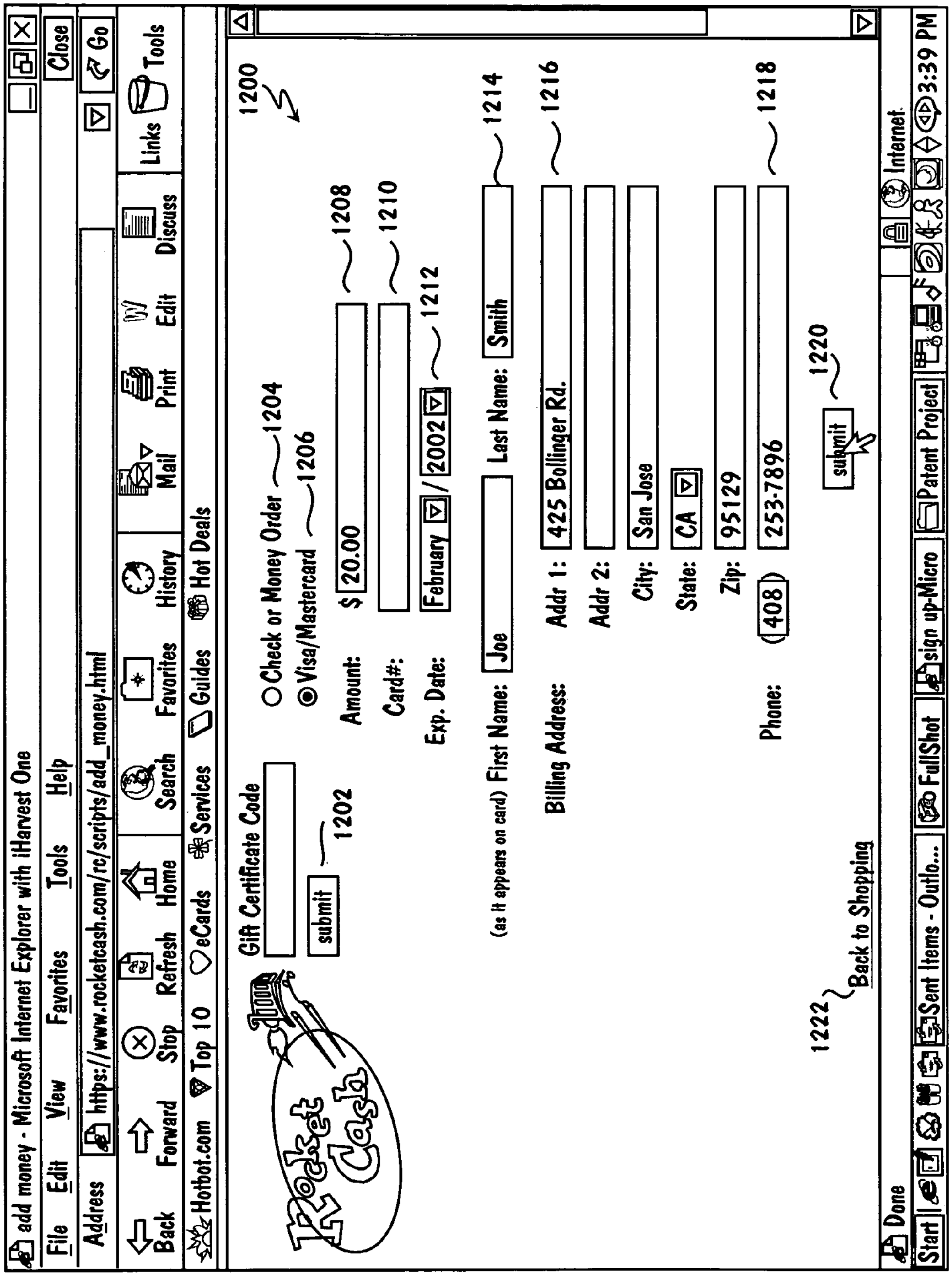
FIG. 12 is a portion of a funding page of an embodiment.

FIG. 12 is a portion of a funding page 1200 of an embodiment. The funding page 1200 prompts the user to select a type or method of funding from types including, but not limited to, a gift certificate 1202, a check or money order 1204, or a credit card 1206. If credit card funding is selected, the user enters information including the amount funded 1208, the credit card number 1210, the credit card expiration date 1212, the name as it appears on the credit card 1214, the credit card billing address 1216, and the card holder's telephone number 1218. Following selection of a funding type and inputting of the corresponding information, the user submits the information to the surrogate system by selecting a "submit" icon 1220. The funding page 1200 also includes electronic links 1222 to shopping areas of the surrogate system.

When funding a surrogate account with a credit card, the user or funding individual logs into the surrogate management site and navigates to the Add Money section of the site. A funder can add money to their own account or the surrogate account of another. The funder is prompted to provide information about the credit card used for funding, information including name, address, email, credit card number, and expiration date. The surrogate fraud detection system executes a fraud check on the credit card used for funding. If the funding credit card is determined to be good by the fraud detection system, the funding credit card information is provided to the credit system for a determination as to whether charges can be made to the funding credit card. If the credit system returns an approval for the funding credit card, then the requested amount is charged against the funding credit card and applied to the selected surrogate system account.

Figure 13:
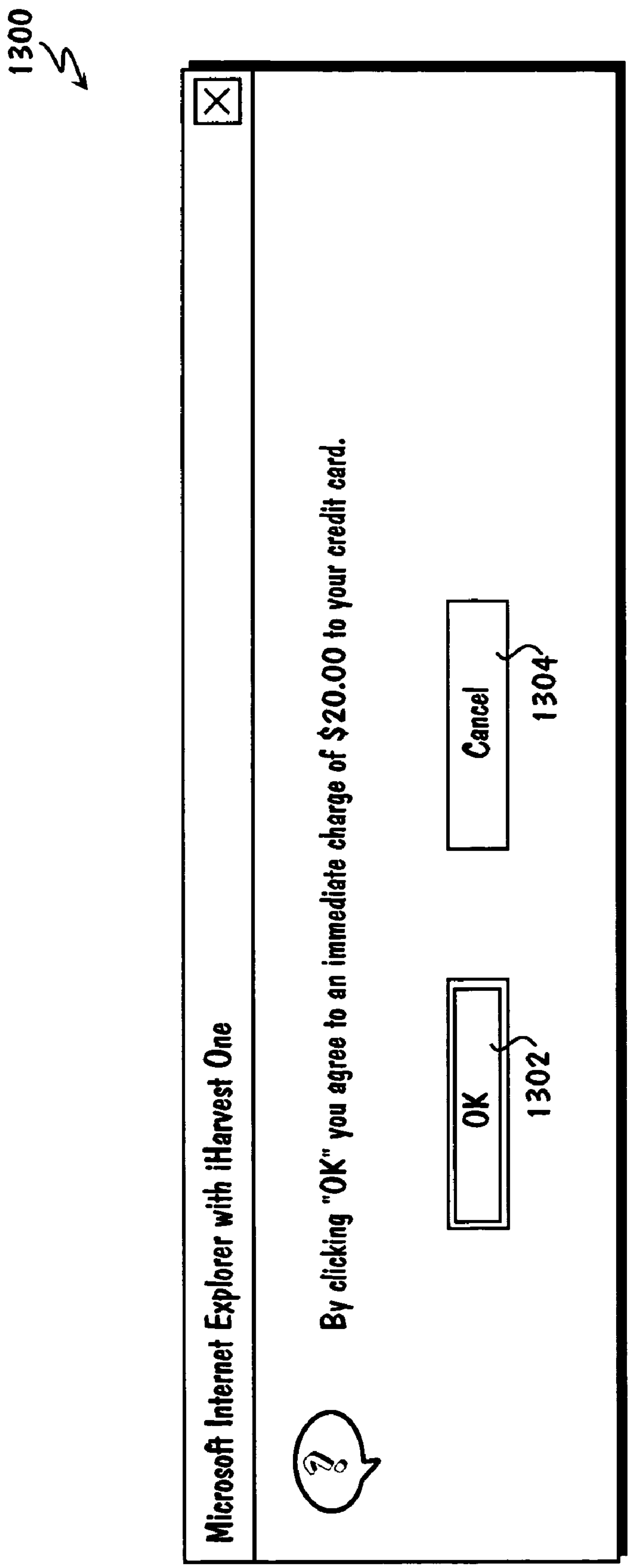
FIG. 13 is a credit card billing confirmation page of an embodiment.

FIG. 13 is a credit card billing confirmation page 1300 of an embodiment. In response to a funding page submission that funds using a credit card, the user is presented with the credit card billing confirmation page 1300. The user confirms the funding charges to the credit card by selecting the "OK" icon 1302. Funding with the credit card can be canceled by selecting the "Cancel" icon 1304.

Figure 14:
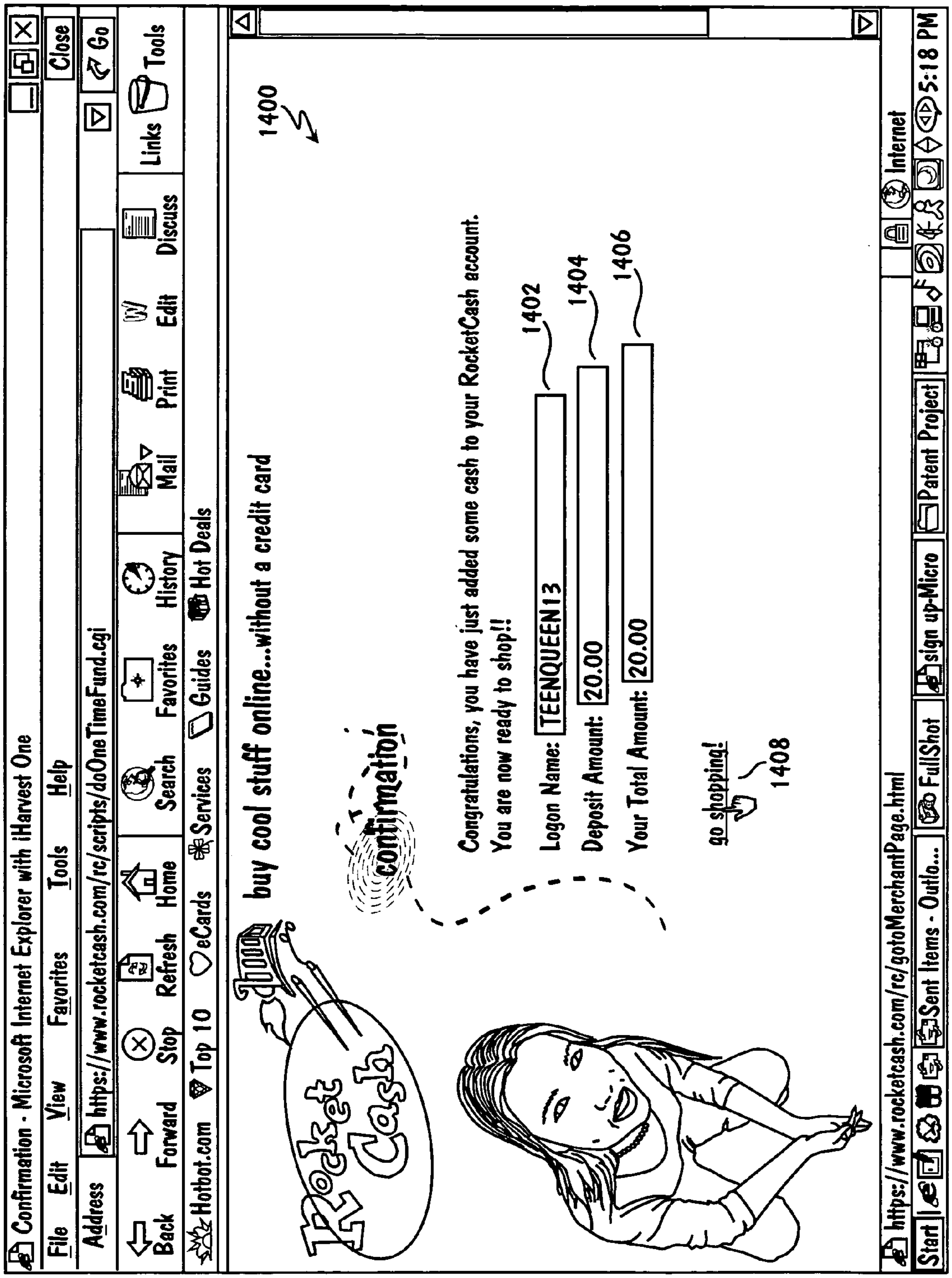
FIG. 14 is a funding confirmation page of an embodiment.

FIG. 14 is a funding confirmation page 1400 of an embodiment. The funding confirmation page 1400 is presented upon successful completion of a credit card funding transaction within the surrogate system. The funding confirmation page 1400 presents information including logon name 1402, deposit amount 1404, and total balance 1406, but the embodiment is not so limited. Moreover, the funding confirmation page 1400 includes an electronic link 1408 to at least one shopping area of the surrogate system.

Auto-allowance funding is an optional method of periodically funding an account from a credit card, checking account, and automatic transfer from another account, but is not so limited. When auto-allowance is selected by a user or funder, the funder is prompted for additional information including, but not limited to, a type of funding, a funding period (for example, whether funding should occur weekly or monthly), and a day of the week or month on which funding is desired.

When auto-allowance funding is performed with a credit card, at some time during the specified day of the week or month, the funder's credit card is checked using the fraud detection system and the credit system. The amount specified for funding is charged against the funder's credit card and the selected surrogate system account is credited with the amount upon approval of the credit charge by the issuing authority.

When auto-allowance funding is performed with a checking account, at some time during the specified day of the week or month, an electronic funds withdrawal is performed from the funder's checking account. The user's surrogate system account is credited with the requested amount upon clearance of this transaction.

When auto-allowance funding is performed with an automatic transfer from another account, at some time during the specified day of the week or month, the transfer is made between the designated accounts of the surrogate system. The user's surrogate system account is credited with the requested amount upon successful completion of the transfer.

Figure 15:
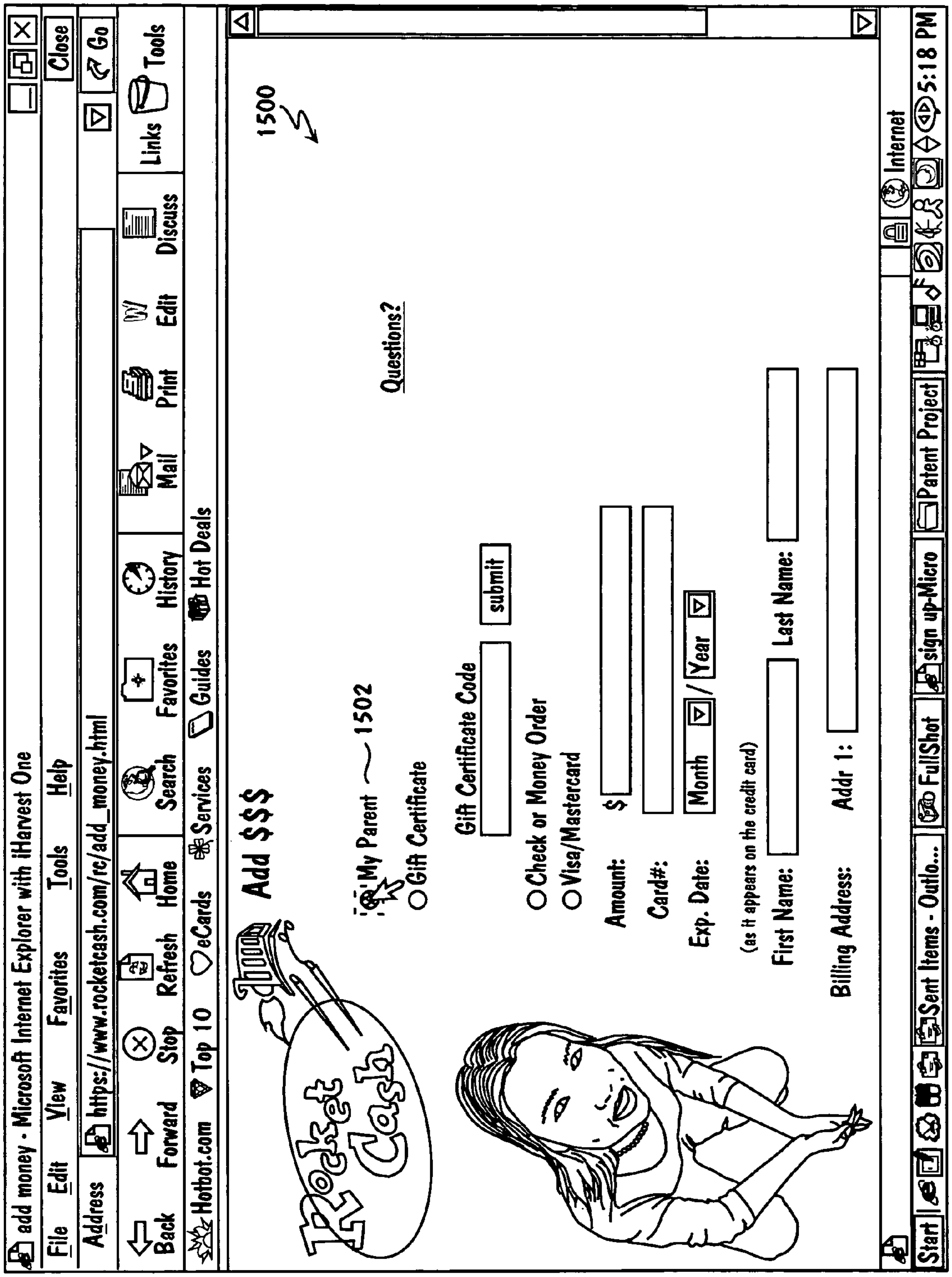
FIG. 15 is another portion of a funding page of an embodiment.

FIG. 15 is another portion of a funding page 1500 of an embodiment. The funding page 1500 allows a parent or guardian to navigate to an auto-allowance funding screen by selecting the "My Parent" funding option 1502 and submitting the information to the surrogate system. Submission of the "My Parent" funding option results in the presentation of a parent/administrator login and set-up page 1600.

Figure 16:
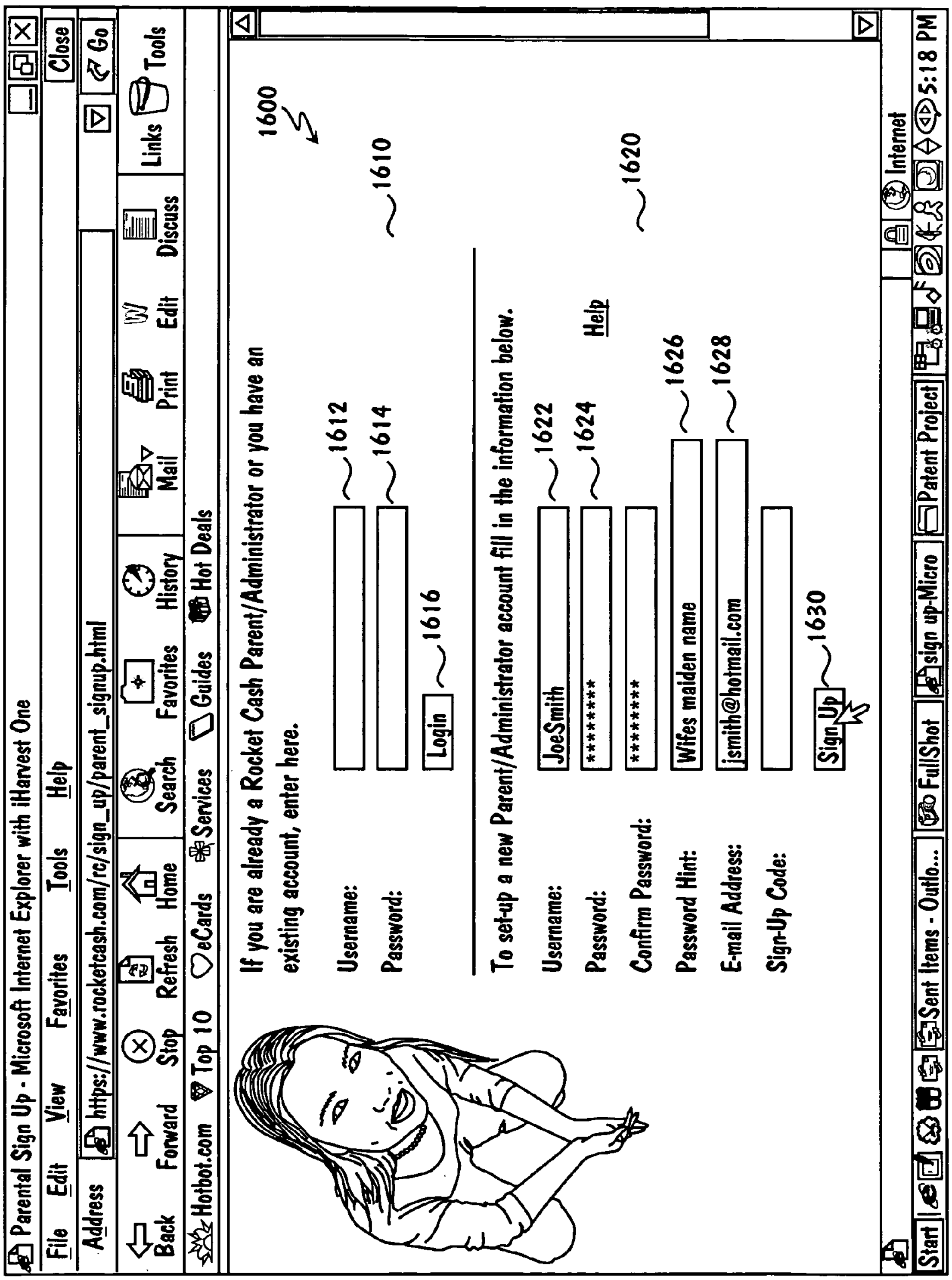
FIG. 16 is a parent/administrator login and set-up page of an embodiment.

FIG. 16 is a parent/administrator login and set-up page 1600 of an embodiment. The login portion of the page 1610 is used if the parent/administrator is already registered with the surrogate system. The set-up portion of the page 1620 is used if the parent/administrator is not registered with the surrogate system.

The login portion of the page 1610 prompts the parent/administrator for a username 1612 and password 1614. The username 1612 and password 1614 are entered, and submitted to the surrogate system by selecting the "login" icon 1616.

The set-up portion of the page 1620 prompts the parent/administrator for information including the selection and entry of a username 1622, password 1624, password hint 1626, and email address 1628. The set-up information is submitted to the surrogate system by selecting the "Sign Up" icon 1630.

Figure 17:
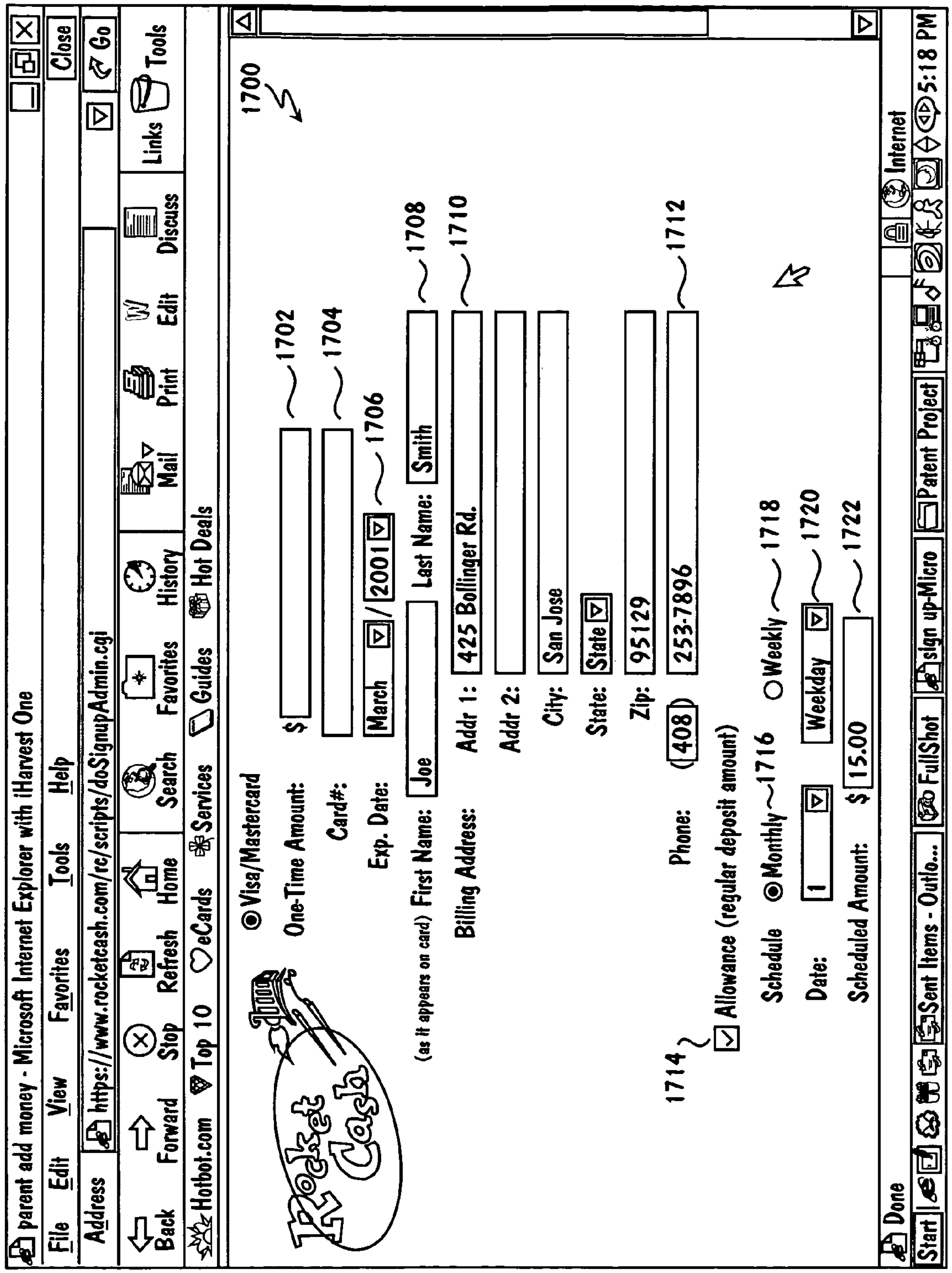
FIG. 17 is an auto-allowance funding page of an embodiment.

Following successful login or registration by a parent/administrator, an auto-allowance funding page 1700 is presented. FIG. 17 is an auto-allowance funding page 1700 of an embodiment. This page 1700 prompts the parent/administrator for information including a one-time amount funded 1702, and information about the credit card used for funding including the credit card number 1704, the credit card expiration date 1706, the first and last name of the card holder as it appears on the credit card 1708, the credit card billing address 1710, and the card holder's telephone number 1712.

Furthermore, the parent/administrator can choose the auto-allowance funding option by selecting the "Allowance" portion of the page 1714 and selecting a funding schedule, either monthly 1716 or weekly 1718, a funding date 1720, and a scheduled amount 1722. Following input of the appropriate information, the parent/administrator submits the information to the surrogate system. The requested funding amount is credited to the surrogate account upon receipt of an approval from the funding source.

When funding an account with a check or money order, the funder logs into the surrogate management web site and navigates to the Add Money section of the site. A funder can add money to their own account or the account of another. The funder is prompted to specify the type of funding and the surrogate system provides a deposit slip that has been automatically filled out. The funder prints the completed deposit slip and mails the deposit slip along with a check or money order to an address designated by the surrogate system. Upon clearance of the check or money order, the amount of the check or money order is applied to the selected surrogate system account.

The surrogate system of an embodiment supports the provision of gift certificates or stored value numbers for use in funding surrogate system accounts. Someone wishing to purchase a gift certificate navigates to the surrogate management web site and to the Purchase Gift Certificate section of the site. The gift certificate can be purchased electronically using a credit card or by mailing a check or money order to the surrogate system providers. Upon confirmation and clearance of the credit card, check, or money order, a gift certificate is issued. Gift certificate issuance includes creating and storing a gift certificate in the surrogate system database. The gift certificate includes a sixteen character alpha-numeric string that is unique across the space of all gift certificates. The alpha-numeric string is completely unordered and therefore unpredictable in its coding algorithm. The gift certificate is displayed on the purchaser's computer screen for printing. Furthermore, the gift certificate can be electronically mailed to a recipient's email address.

Figure 18:
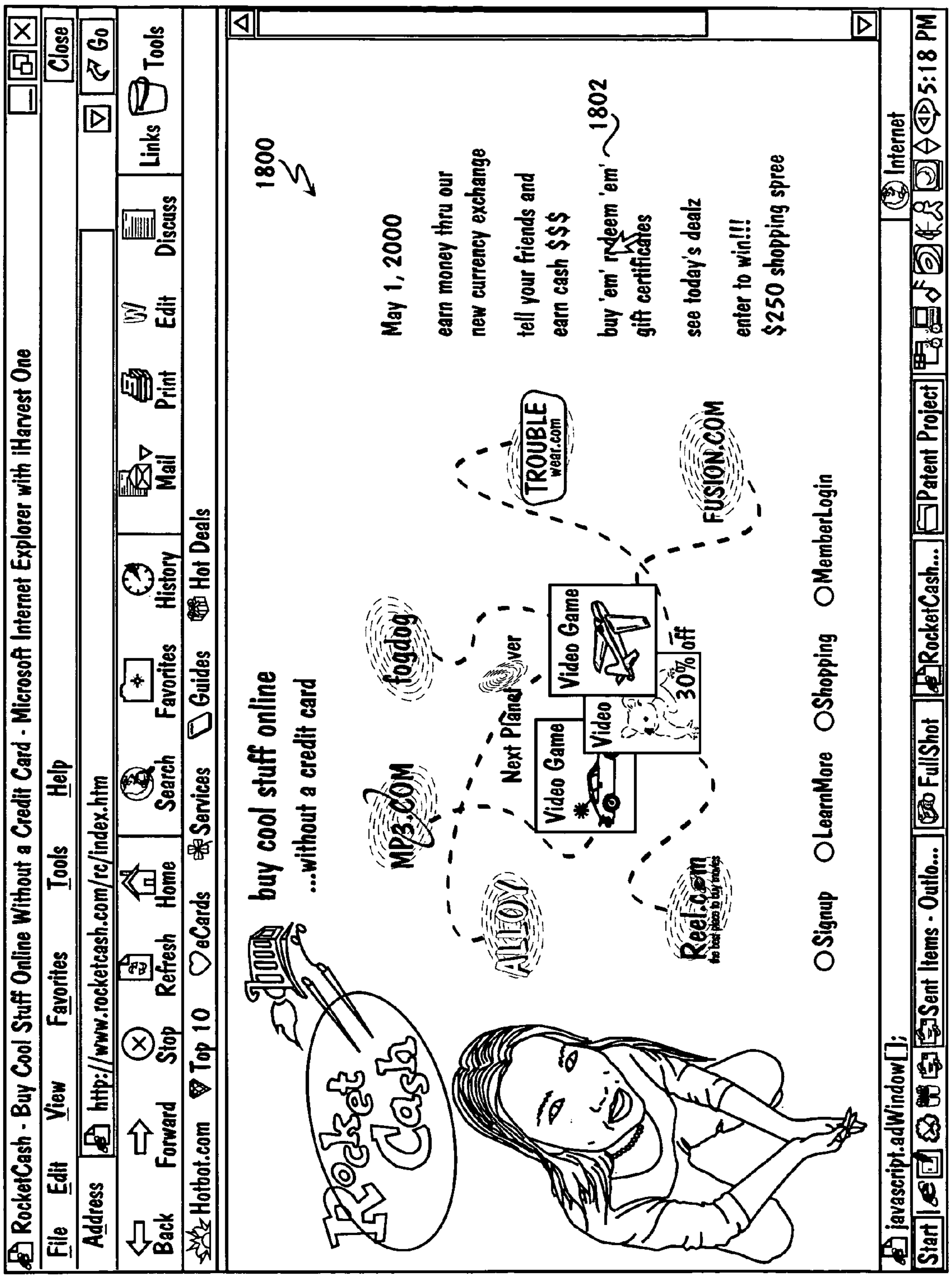
FIG. 18 is a home page of an embodiment from which a user selects a "gift certificate" icon.
Figure 19:
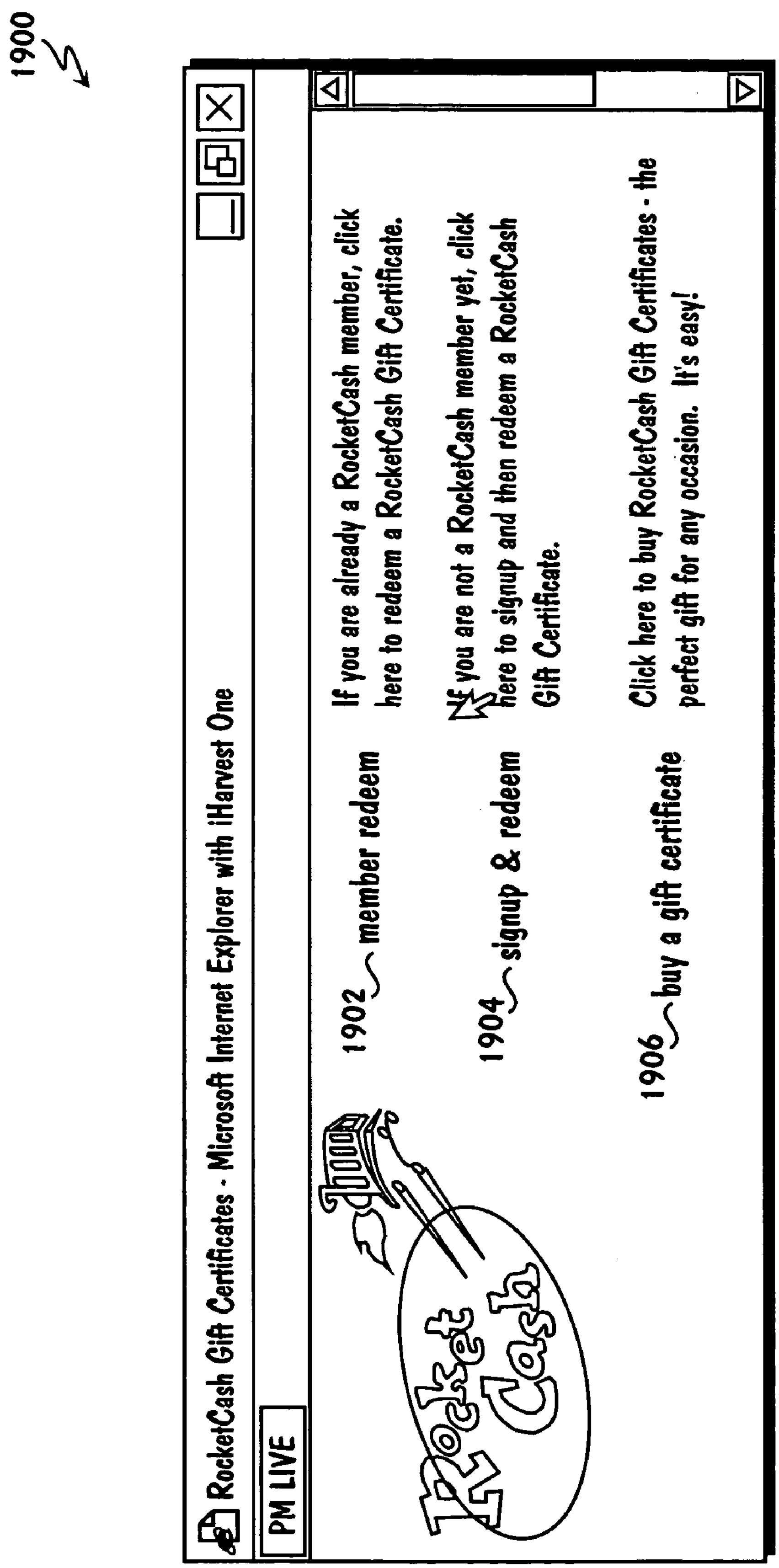
FIG. 19 is a gift certificate options page of an embodiment.

A user navigates to an area for gift certificate purchase beginning from the home page. FIG. 18 is a home page 1800 of an embodiment from which a user selects the "gift certificate" icon 1802. Selection of the "gift certificate" icon results in presentation of a gift certificate options screen. FIG. 19 is a gift certificate options page 1900 of an embodiment.

The gift certificate options page 1900 provides users with a number of choices including, but not limited to, redeeming gift certificates and buying gift certificates. The "member redeem" icon 1902 provides for redemption of gift certificates by users having surrogate system accounts. The "signup & redeem" icon 1904 allows a user who does not have a surrogate system account to sign up for an account and then redeem a gift certificate. The "buy a gift certificate" icon 1906 allows one to purchase a gift certificate for use within the surrogate system.

Figure 20:
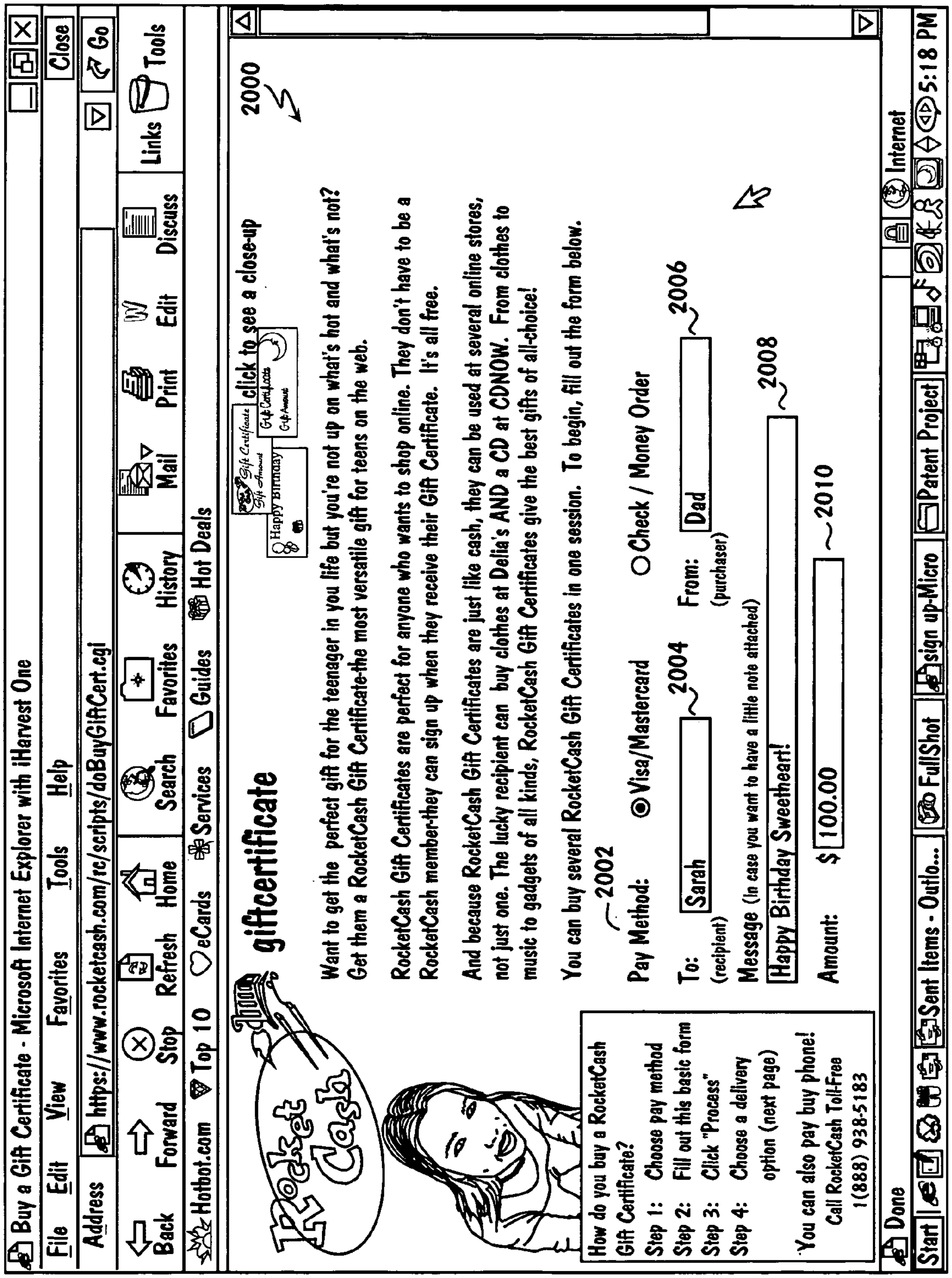
FIGS. 20 and 21 are a gift certificate purchase page of an embodiment.
Figure 21:
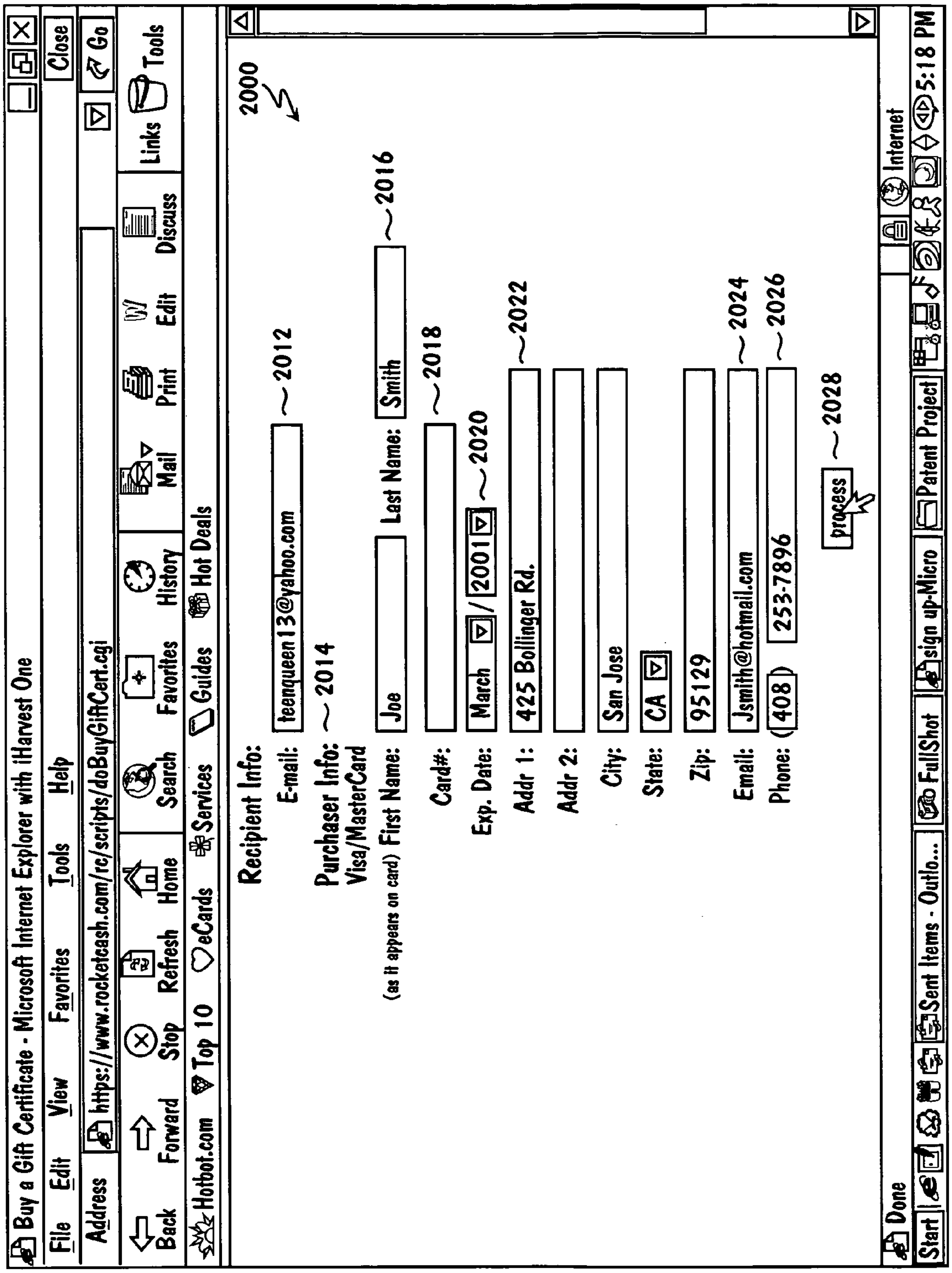

In response to selection of the "buy a gift certificate" icon 1906 a user is presented with a gift certificate purchase page 2000. FIGS. 20 and 21 show a gift certificate purchase page 2000 of an embodiment. The gift certificate purchase page 2000 prompts the user for information including, but not limited to, a payment method 2002, a recipient name 2004, a purchaser name 2006, a message to the recipient 2008, a gift certificate amount or value 2010, a recipient email address 2012, and purchaser information 2014. The purchaser information requested includes the first and last name of the credit card holder 2016 if a credit card is used for the purchase, a credit card number 2018, a credit card expiration date 2020, a credit card billing address 2022, a purchaser email address 2024, and a purchaser telephone number 2026. After inputting the appropriate information for the gift certificate purchase the "Process" icon 2028 is selected and the transaction is completed by the surrogate system. In response to successful completion of a gift certificate purchase transaction, the surrogate system emails the gift certificate to a selected recipient. In an alternate embodiment, the gift certificate can be mailed to the selected recipient.

Gift certificates are redeemed by users at the surrogate management web site. The user logs into the surrogate management web site and navigates to the Add Money section of the site. The user is prompted for the sixteen character alpha-numeric string, or gift certificate code, that identifies the gift certificate. Upon input of the gift certificate code, the surrogate system verifies that: the gift certificate code is valid when compared against the code stored in the surrogate system database; and, the gift certificate has not already been redeemed. If the gift certificate is valid and has not been redeemed, the surrogate system database is updated to reflect use of the gift certificate, and a corresponding amount of credit is applied to the user's surrogate system account.

Another type of funding available in the surrogate system is currency conversion funding. Currency Conversion Partners are companies that provide online currency to their users. This online currency is earned or given to users and accrues in their accounts on the partner sites. A unique feature of an embodiment of the surrogate system allows the surrogate system to redeem many forms of online currency, aggregate these different forms of online currency, and spend the aggregated online currency at any online merchant without money ever being issued directly to the user.

Figure 22:
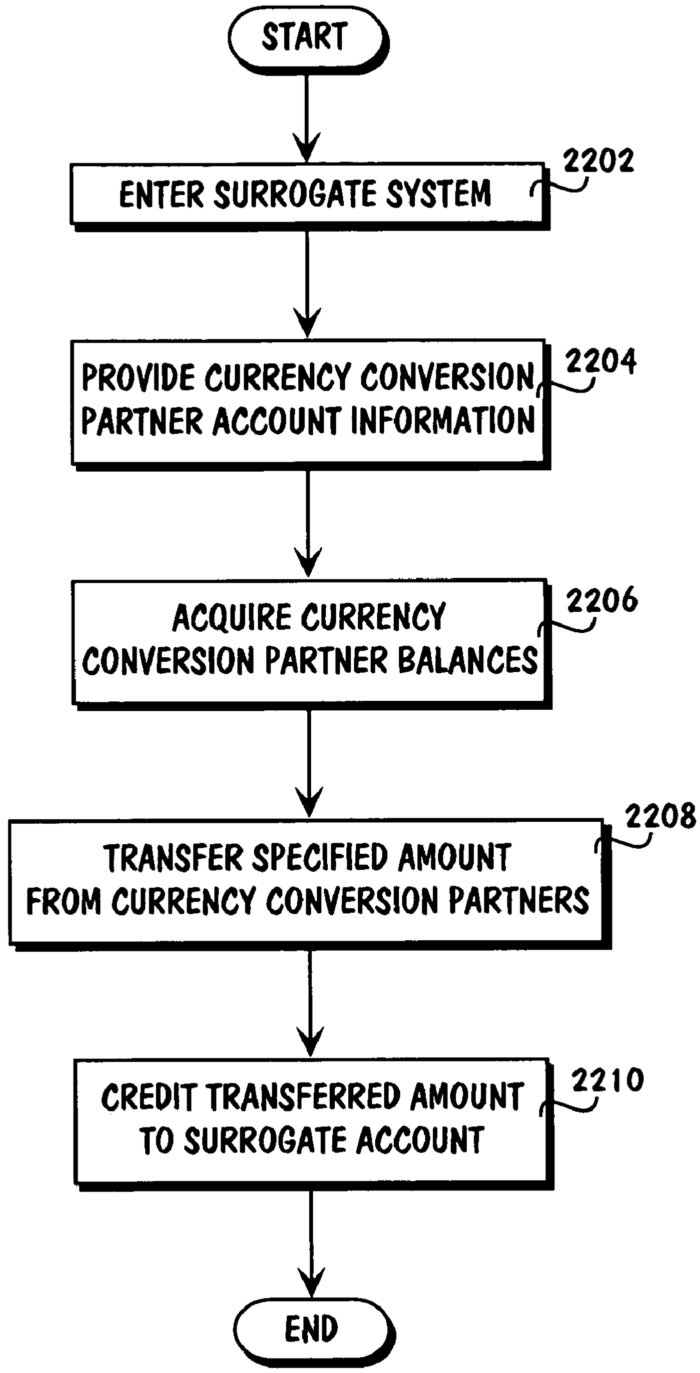
FIG. 22 is a flow chart for a currency conversion and aggregation process of an embodiment.

FIG. 22 is a flow chart for a currency conversion and aggregation process of an embodiment. Operation begins with users entering the surrogate system web site using a browser on client computers 2202. The users provide account information for their active currency conversion partner accounts 2204. The surrogate system acquires account balances from the currency conversion partners 2206. A specified amount of money or credit is transferred from the currency conversion partners as specified by the users 2208. Upon validation of the transfer, the funds are credited or applied to a selected account 2210.

When converting online currency for use in funding a surrogate system account, the user logs into the surrogate management site and navigates to the Account Summary section of the site. The Account Summary section presents the user with their account balance in the surrogate system. Furthermore, users are presented with a balance on all other Currency Conversion Partner sites in response to the users providing electronic addresses for the Currency Conversion Partner sites on which they have accounts. This is done by storing the user account information for each partner site in the surrogate system database. When the Account Summary page is presented, each Currency Conversion Partner site is accessed in real-time by the surrogate system to query the amount of currency the person has at that partner site. The amounts are totaled to present users with their "online net worth."

At this point, funds can be transferred from the user's Currency Conversion Partner account to the user surrogate system account. The users begin the transfer by specifying information including, but not limited to, the Currency Conversion Partner account from which they wish to transfer money, and the amount of money to transfer. The surrogate system queries the Currency Conversion Partner site over a predetermined set of secure protocols to confirm that the users have the funds at the partner site. If the funds are available and the account is in good standing at the Currency Conversion Partner site, the surrogate system issues a request to the Currency Conversion Partner site to transfer the specified amount of money from the users' corresponding Currency Conversion Partner account into the user surrogate system account. In response to the surrogate system request, information is returned including a transaction identifier used for reconciliation. The user surrogate system account is credited with the transfer amount while the corresponding account at the Currency Conversion Partner site is debited the same amount.

At a predetermined periodic time interval, for example every 15 days, each Currency Conversion Partner site wires the money that has been transacted during those past 15 days along with a datafile. The datafile contains all the transaction identifiers for which funds are included for transfer. The surrogate system database receives the datafile and reconciles the partner redemption transactions using the transaction identifiers and the amount of the wire transfer. All discrepancies are brought to the attention of the surrogate financial administrator.

Redemption from a Currency Conversion Partner site can also be initiated from the Currency Conversion Partner web site rather than from the surrogate system web site. In this case, the Currency Conversion Partner web site will redirect the user to the surrogate system web site, allowing the user to first log into the surrogate system. From this point the transaction occurs as described herein. When the redemption is complete, the user is redirected back to the Currency Conversion Partner web site or, optionally, allowed to immediately spend the newly transferred money at the surrogate system web site.

Yet another way in which a surrogate system account is funded is with incentive code conversion funding. Both online and offline companies and retail merchants can use the surrogate system to support online shopping by performing incentive code conversion. For example, a soft drink company may place incentive codes under bottle caps, or a food provision company or service may place incentive codes on food labels or food service devices like sticks, containers, and trays. These incentive codes have an equivalent cash value in credit when used in purchase transactions through the surrogate system. In an embodiment, the incentive codes convert into values between 20 cents and one dollar, but are not so limited. The incentive codes are input into the surrogate system web site by the user, much like a gift certificate code. The incentive codes are converted into some equivalent amount of credit that is applied to the user's surrogate system account, credit that can then be spent at online merchants using the surrogate shopping servers.

The incentive code includes a sixteen character alpha-numeric string that is unique across the space of all incentive codes, wherein the alpha-numeric string is completely unordered and therefore unpredictable in its coding algorithm. An alternate embodiment uses a thirteen character alpha-numeric string, but is not so limited. The surrogate system database includes all incentive codes for which credit may be provided. The unique incentive codes are provided with particular consumer products. Upon purchasing a product containing an incentive code, the user can proceed with redeeming the code for shopping credit.

Incentive codes are redeemed by users at the surrogate management web site. The user logs into the surrogate management web site and navigates to the Redemption section of the site. The user is prompted for the thirteen or sixteen character alpha-numeric string, or incentive code. Upon input of the incentive code, the surrogate system verifies that: the incentive code is valid when compared against the code stored in the surrogate system database; and, the incentive code has not already been redeemed. If the incentive code is valid and has not been redeemed, the surrogate system can credit a preassigned value associated with the particular incentive code. Alternatively, the surrogate system can use a random number generator to create a random value for the particular incentive code. In either case, the surrogate system database is updated to reflect use of the particular incentive code, and an amount of credit corresponding to the value assigned by the surrogate system is applied to the user's surrogate system account. At regular periodic time intervals, the surrogate system financial administrator will invoice the company sponsoring the incentive code program to cover the costs of the incentive codes that have been redeemed and/or spent.

Users can also earn monies for account funding by earning credit at the surrogate management web site and at an online merchant web site. A user can log into the surrogate system and earn money for credit to their surrogate system account by performing actions while logged in. These actions include, but are not limited to: entering or engaging in contests offered at the surrogate system web site; entering or engaging in contests offered at an online merchant web site; responding to surveys provided on the surrogate system web site or an online merchant web site; visiting advertiser web sites or other web sites as directed; participating in special online promotions where money or coupons are given away to users; and, referring new users to the surrogate system web site. In all cases, the surrogate system credits the user's surrogate system account as the user satisfies the conditions for receiving the incentive credit. Therefore, the credit is immediately placed in the user's surrogate system account and made available for spending. Pages showing the amounts earned and credited can be inserted into the data stream to the client computer to be presented as stand alone pages, overlay pages, or pop-ups on a displayed page.

Funding of surrogate system accounts can also be accomplished using cash provided to or through ATMs. The surrogate system of an embodiment can be integrated with other electronic finance technologies, for example electronic finance devices that accept or dispense cash including, but not limited to, automatic teller machines, Internet-connected kiosks, and point-of-sale devices. In operation, a user locates, for example, an ATM enabled for operation with the surrogate system. The user inputs their particular surrogate system logon information, and selects an option that allows for the deposit of funds into a selected surrogate system account. The system logon information can be manually entered by the user with a keypad or touch screen, or automatically loaded from a smart card or magnetic card provided by the user, or a combination of card and keypad or touch screen, but is not so limited.

Following authentication of the user and their surrogate system account, the ATM accepts a cash deposit from the user as is known in the art, and the cash is scanned and verified for authenticity. The ATM communicates the amount deposited to a central network. The ATM central network uses a secure communication protocol to inform the surrogate system that the user is to be credited the amount of money deposited into the machine. The secure communication protocol of an embodiment includes a unique transaction identifier used for reconciliation. The surrogate system credits the user's account in response to the transmission from the ATM central network. Furthermore, the surrogate system updates the surrogate database with the transaction from the ATM vendor.

In an alternate embodiment, the capability is provided to transfer money from an account into a selected surrogate system account using an electronic finance device. In operation, a user locates, for example, an ATM enabled for operation with the surrogate system. The user inputs their surrogate system logon information, and selects an option that allows for the deposit of funds into a selected surrogate system account. The ATM accepts transfer instructions from the user including, but not limited to, the account to transfer from and the amount to transfer. The ATM communicates the transfer amount to a central network. The ATM central network uses a secure communication protocol to inform the surrogate system that the user is to be credited the amount of money transferred. The secure communication protocol of an embodiment includes a unique transaction identifier used for reconciliation. The surrogate system credits the user's account in response to the transmission from the ATM central network. Furthermore, the surrogate system updates the surrogate database with the transaction from the ATM vendor.

At a predetermined periodic time interval, such as every 7 days, the ATM vendor wires the money corresponding to the transactions, both deposits and transfers, of the previous 7 days along with a datafile containing the transaction identifiers corresponding to the transactions for which payment is provided. The surrogate system database receives the datafile and reconciles the ATM transactions using the transaction identifiers and the amount of the wire transfer. Any discrepancies are brought to the attention of the surrogate financial administrator.

In an alternate embodiment, a user can withdraw cash from their surrogate system account using an ATM, Internet-connected kiosks, and point-of-sale devices. This cash withdrawal can be made in response to entry by the user of surrogate system logon information. Alternately, the cash withdrawal can be made in response to information received from a credit or debit card assigned to the user on their account by the surrogate system.

The surrogate system of an embodiment further supports funding using offline stored value cards. An offline stored value card is a card that can be purchased at an offline retailer, for example a department store or a convenience store. The card includes a number printed on the card. At the time of purchase, the purchaser gives the card to a cashier, who then receives payment from the purchaser for the card. The cashier swipes the card through a terminal which is hooked up to the stored value card backend network or system. The stored value card backend network recognizes the individual card and, using an associated database, enables the card to be used. The card now has a stored value equal to the amount paid by the purchaser.

To use the card, the purchaser, or user, logs into their surrogate system account and navigates to the section to redeem offline stored value cards. The surrogate system provides a template or otherwise prompts the user to enter the unique number printed on the card. In response to entry of the unique number, the surrogate system database queries the stored value card backend network or system over a secure communication protocol to confirm that the number is valid and the number has not previously been used. If the stored value card backend network replies that the number is valid, the backend network marks the card as used in its database. The response to the surrogate database includes the value of the card and a transaction identifier for reconciliation purposes, but is not so limited. Upon confirmation, the amount stored on the card is credited to the user's surrogate system account and the surrogate database is updated to reflect the redemption of this particular card number, storing the transaction identifier.

At a predetermined periodic time interval, such as every 7 days, the stored value card vendor wires the money corresponding to the transactions of the previous 7 days along with a datafile containing the transaction identifiers corresponding to the transactions for which payment is provided. The surrogate system database receives the datafile and reconciles the stored value card vendor transactions using the transaction identifiers and the amount of the wire transfer. Any discrepancies are brought to the attention of the surrogate financial administrator.

Fraud checking and detection is an important function performed by the surrogate system of an embodiment. The surrogate system checks for two types of fraud, including individuals activating multiple accounts in order to take advantage of promotional account funding opportunities, and the use of stolen credit cards to fund an account, but is not so limited.

Individuals activating multiple accounts is problematic because many promotions, coupons, or other offerings within the surrogate system have actual value. As most of these offerings are limited to one per customer, individuals may attempt to create multiple accounts for themselves in the hopes of capitalizing on an offer multiple times.

Use of stolen credit cards is always problematic, and by its nature the surrogate system provides the ability to aggregate numerous stolen cards into a common surrogate system account. Undetected, this allows someone with a few stolen cards to misappropriate the value of the stolen cards at a single place by funding a surrogate account with a large amount of money, and then shop at numerous merchants using legitimate surrogate cards. Protection should be provided against this type of fraud.

Fraud checking is performed in an embodiment of the surrogate system using a fraud scoring system. The fraud scoring system scores data items including, but not limited to: email addresses; shipping addresses; and, credit card numbers and expiration dates. Each of these data items detected by the system are stored in the surrogate system database with links to the associated user or users. Furthermore, each user surrogate account is assigned a score, based on the accumulated scores of the items of information associated with the user's surrogate account.

The fraud checking function stores email addresses and credit card information exactly as specified. The particular information is then scored by normalizing the information into a common format. Therefore, shipping addresses are scored by normalizing the address line and zip code into a common format. For example, "123 Main Street Suite B . . . 95111-1234" and "123 Main St. # B . . . 95111" will both be transformed to the common address "123MainStB95111".

In operation, the fraud detection system is operating on all user-specific information entered during any session on the surrogate system management web site and/or the surrogate shopping servers. The user-specific information includes, for example, email addresses, shipping addresses, and credit card numbers. The surrogate system of an embodiment reviews the information inputted by the user, including information provided during the shopping checkout process where the user may manually try to override a new shipping address.

When an item of information is inputted by a user, the surrogate database is called with that item, the identity of the user that is providing it, and any other relevant information such as the amount of the purchase transaction. The surrogate database fraud detection system determines if this information is already stored in the database, and adds it to the scoring tables if it is not in the database. In addition, information relating to the event associated with the information is added, specifying the date/time, user, item, and amount. A set of rules are then evaluated to determine if a fraud situation has occurred. If so, the database will invoke the appropriate routines including flagging the appropriate item as FRAUD, sending email to the fraud administrator and disabling the account, or other configurable operations.

Within the surrogate system fraud detection system, items of information used by a single user are linked together. When a particular item is marked as FRAUD (for example, a credit card is deemed to be stolen), then all users that have used that credit card are marked FRAUD. Furthermore, all credit cards, shipping addresses, and email addresses used by users marked FRAUD are marked FRAUD. Thus, once an item or user is ruled to be FRAUD, all items linked to that item or user are also flagged as FRAUD on the assumption that these are all the same user attempting to bypass fraud checking. Legitimate surrogate system users can work with customer support personnel if their account is incorrectly flagged as FRAUD.

The fraud levels used to define fraudulent situations in an embodiment include, but are not limited to: SCORE-INCREASE, fraud scores are initialized at zero, and are increased for an item/user by N, wherein if the fraud score of an item increases the fraud score of any associated user linked to that item also increases by an equivalent or proportional amount; WARNING, an email is sent to the surrogate system customer service to place a watch on the item or user; TEMPORARY-FRAUD, an email is sent to the surrogate system customer service to place a watch on the item or user and disable the associated account until the surrogate customer service has a chance to review the situation and make a determination, and a notification email is sent to the user; and, FRAUD, an item or user is determined to be fraudulent resulting in the associated account being disabled along with all related or linked items and accounts, and a notification email is sent to the user.

The fraud rules used to define fraudulent situations in an embodiment include, but are not limited to: WARNING, a same user deposits "large" sums of money into an account twice within 30 minutes; TEMPORARY-FRAUD, a same user deposits "large" sums of money into an account three times within 30 minutes; FRAUD, a user deposits "large" sums of money into an account a certain number of times using N number of credit cards; TEMPORARY-FRAUD, a same user account has used more than four shipping addresses within the last two months; WARNING, a user changes their email address three times within the previous 15 days; SCORE-INCREASE, if $500.00 is deposited into an account, increase the fraud score by 10; SCORE-INCREASE, if more than three shipping addresses are used by a user, increase the fraud score by 5; SCORE-INCREASE, if a user changes their email address, increase their fraud score by 5; WARNING, an item/user reaches a fraud score of 20; TEMPORARY-FRAUD, an item/user reaches a fraud score of 35; and, FRAUD, an item/user reaches a fraud score of 50.

Figure 23:
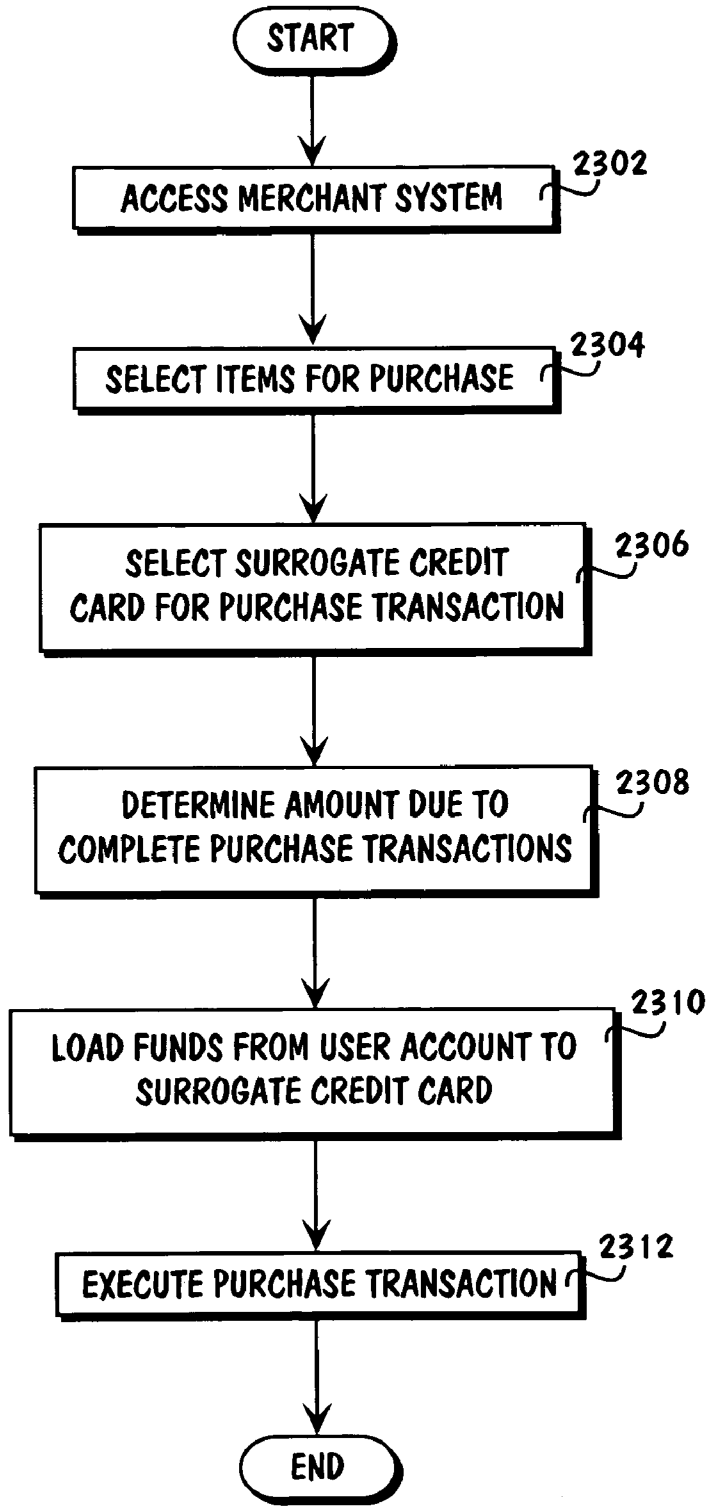
FIG. 23 is a flow chart for surrogate control of a shopping process of an embodiment.

FIG. 23 is a flow chart for surrogate control of a shopping process of an embodiment. Operation begins with a user entering the surrogate system web site using a browser on the client computer 2302. The user shops through the surrogate system by accessing a merchant online system through the surrogate system. The user selects items for purchase from the merchant system 2304. A surrogate system credit card is selected for the purchase transaction 2306. The amount due to complete the purchase transaction is determined by the surrogate system 2308. Funds are loaded from the user's account to the surrogate system credit card 2310. The purchase transaction is executed using the surrogate system credit card 2312.

The surrogate system of an embodiment supports online and offline shopping, but is not so limited. When shopping online, a user can navigate to an area for shopping from numerous areas of the surrogate system web site by selecting a "shopping" icon from the surrogate system template. Selection of the "shopping" icon results in presentation of shopping screens. FIGS. 24–27 are example shopping pages 2400–2700 of an embodiment including numerous types of merchant links. The shopping pages of an embodiment present the user with merchant logo icons 2402, lists of merchant names arranged alphabetically 2702, merchant special offer and incentive icons 2404, merchandise advertisement icons 2406, ordered lists of merchandise 2502, and prespecified merchandise grouping icons 2408. The displayed icons, names, coupons, offers, ads, and list items are enabled so that selection of an icon, list name, coupon, offer, ad, or list item will take the user to the corresponding merchant online shopping site or web pages through the surrogate system, but the embodiment is not so limited.

Figure 24:
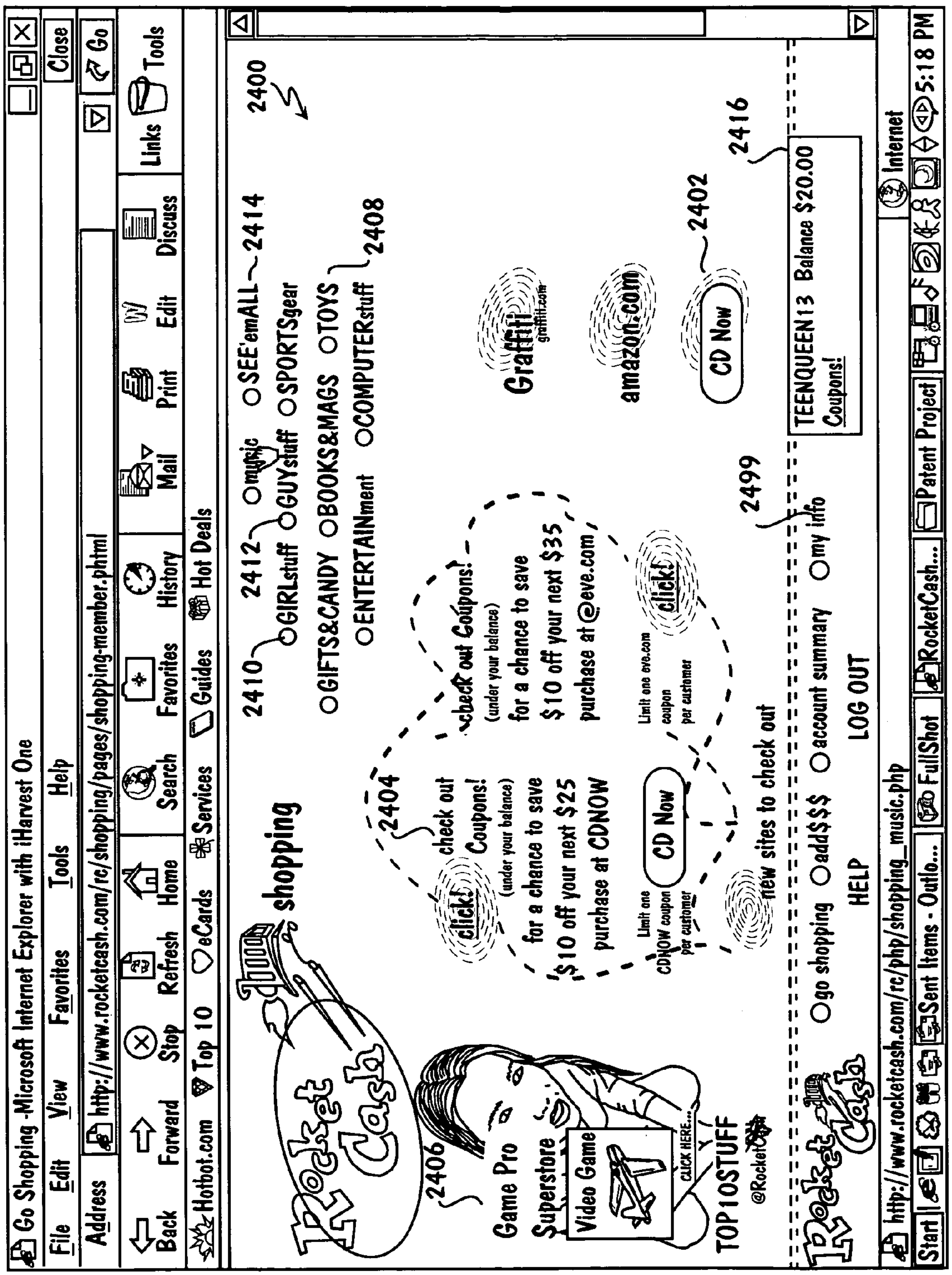
FIG. 24 is a shopping page of an embodiment.
Figure 25:
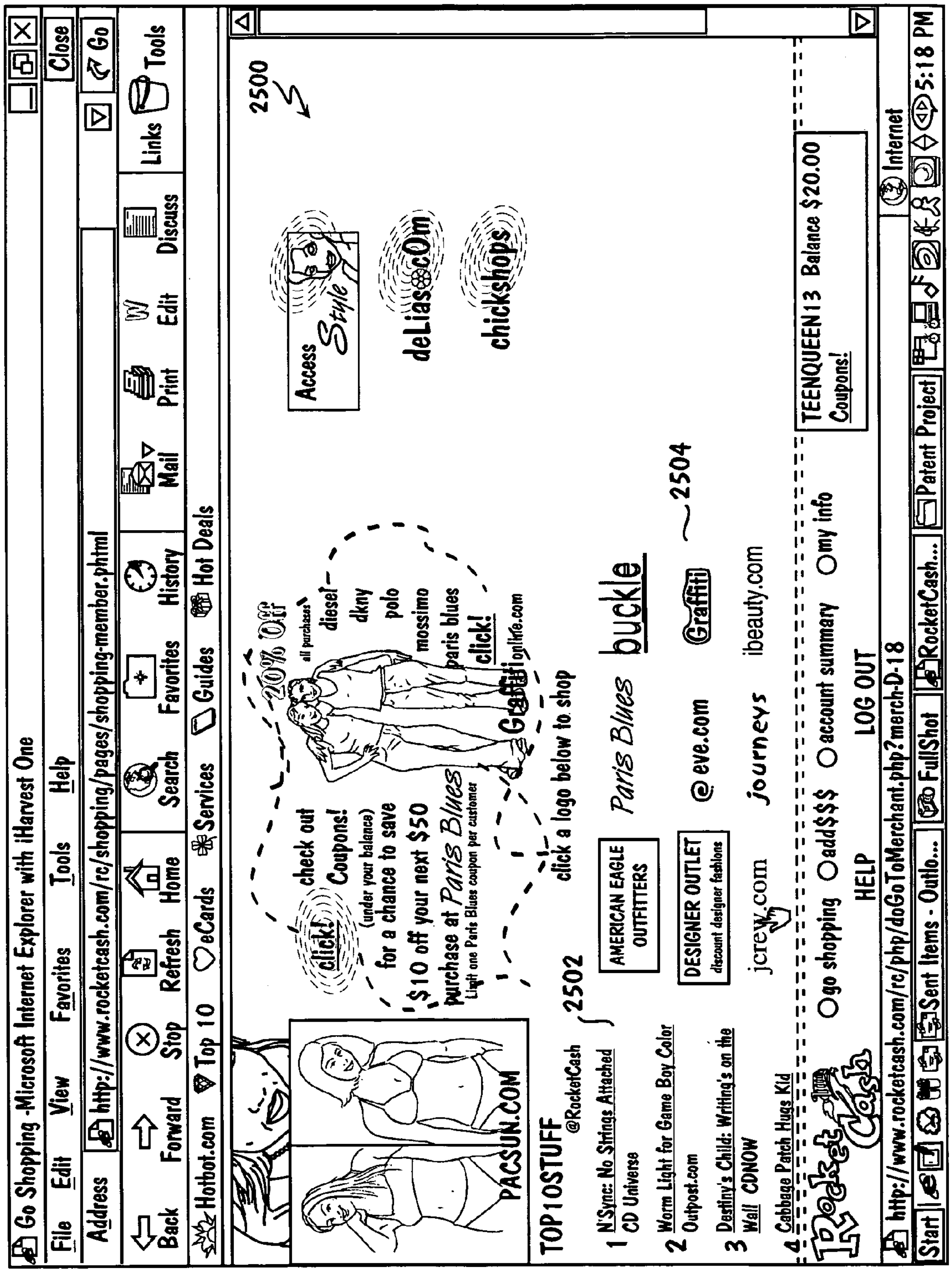
FIG. 25 is a merchandise type-specific shopping page of an embodiment.

With reference to FIG. 24, selection of the "Girl Stuff" icon 2410, a prespecified merchandise grouping icon, results in presentation of a type-specific shopping page 2500. FIG. 25 is a type-specific shopping page 2500 of an embodiment. This shopping page 2500 presents icons 2504 for merchants and merchandise that might be of particular interest to female shoppers. Furthermore, the rank-ordered list 2502 presented on a type-specific shopping page 2500 can include a rank-ordered type-specific list of a type corresponding to the page type.

Figure 26:
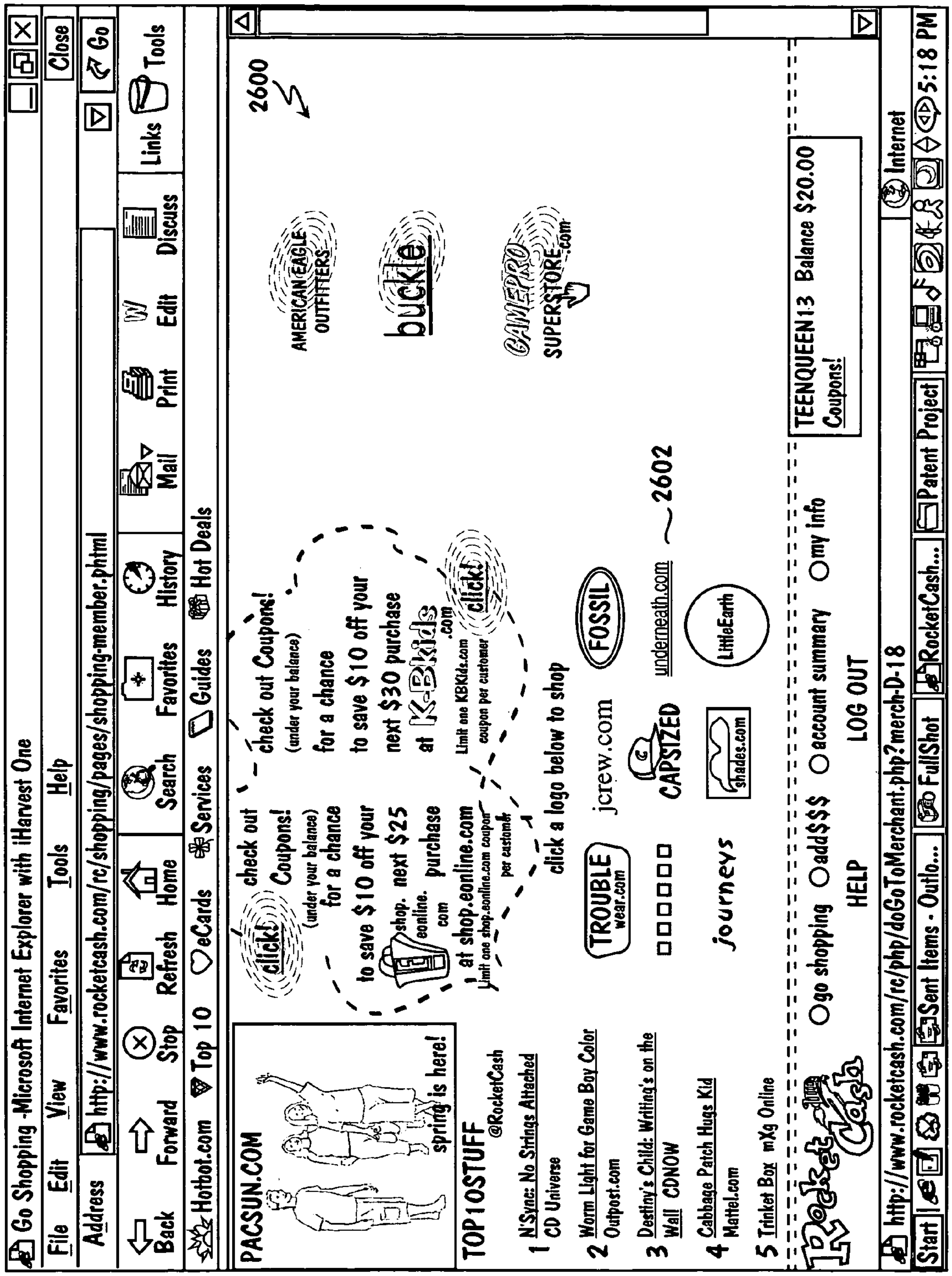
FIG. 26 is another merchandise type-specific shopping page of an embodiment.

FIG. 26 is another type-specific shopping page 2600 of an embodiment. This shopping page 2600 is presented in response to selection of the "Guy Stuff" icon 2412 on a shopping page 2400, and presents icons 2602 for merchants and merchandises that might be of particular interest to male shoppers.

Figure 27:
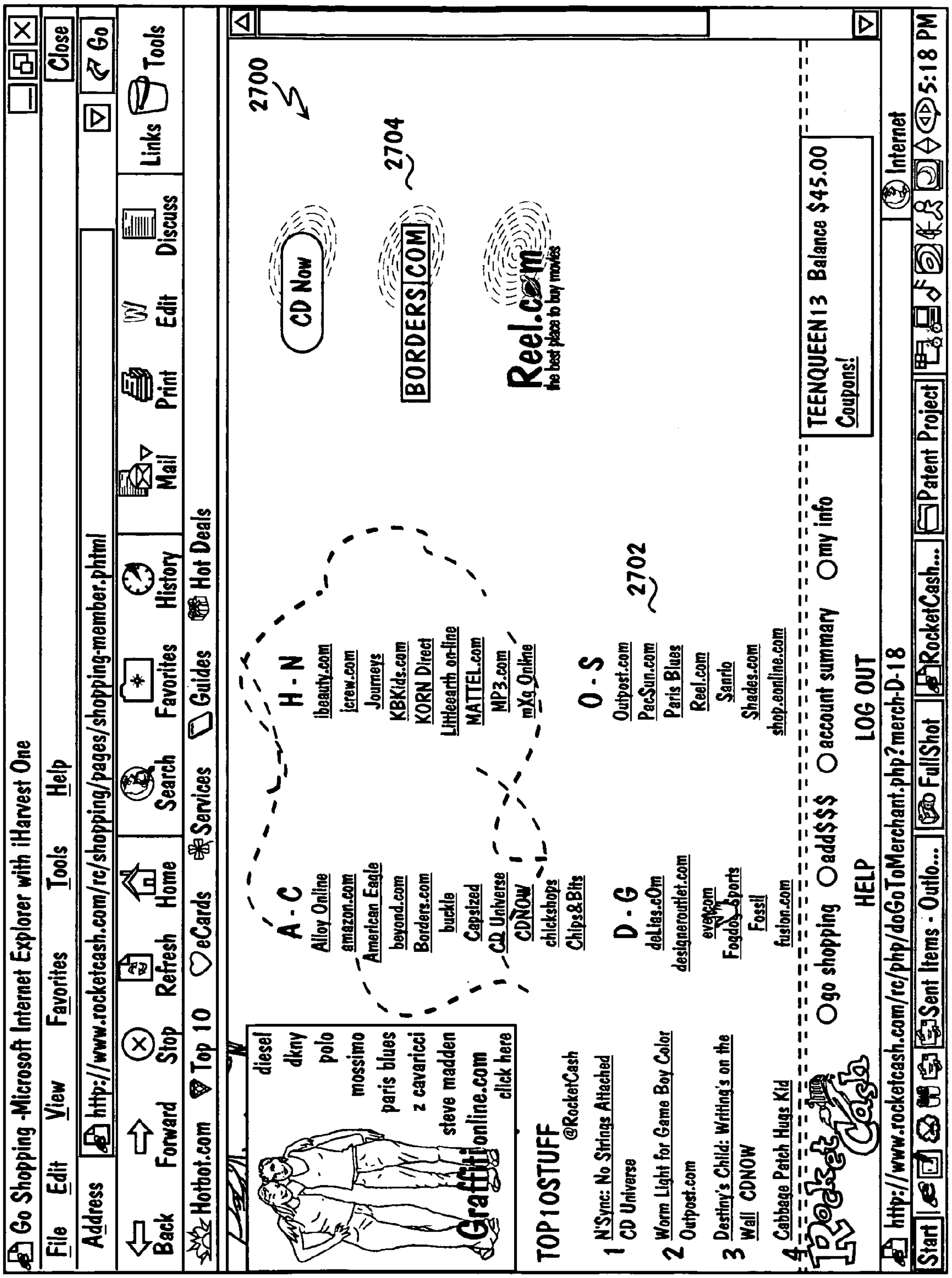
FIG. 27 is a shopping page of an embodiment including an alphabetical list of all online merchants available through the surrogate system.

Selection of the "See 'em All" icon 2414 on a shopping page 2400 results in the presentation of a shopping page 2700 containing a list of all online merchants available through the surrogate system. The merchants of the list can be arranged alphabetically. FIG. 27 is a shopping page 2700 of an embodiment including a list 2702 of all online merchants available through the surrogate system. The shopping page 2700 including the list 2702 can include electronic links 2704 to merchant shopping sites.

The ordered lists of merchandise 2502 include at least one rank-ordered list of merchandise compiled from sources including records of merchandise sales in the surrogate system database. These lists may be compiled for prespecified intervals of time, but are not so limited. The ordered lists of merchandise can also include rank-ordered lists of merchandise compiled from periodic or regular user surveys or feedback. Furthermore, the ordered lists of merchandise can be generated from online merchant records.

The shopping screens 2400–2700 can also include electronic links for shopping, account funding, account summary, personal information, help, and log off in a navigation bar 2499. Furthermore, the shopping screens can include a display 2416 of the users user name and account balance, but is not so limited.

Figure 28:
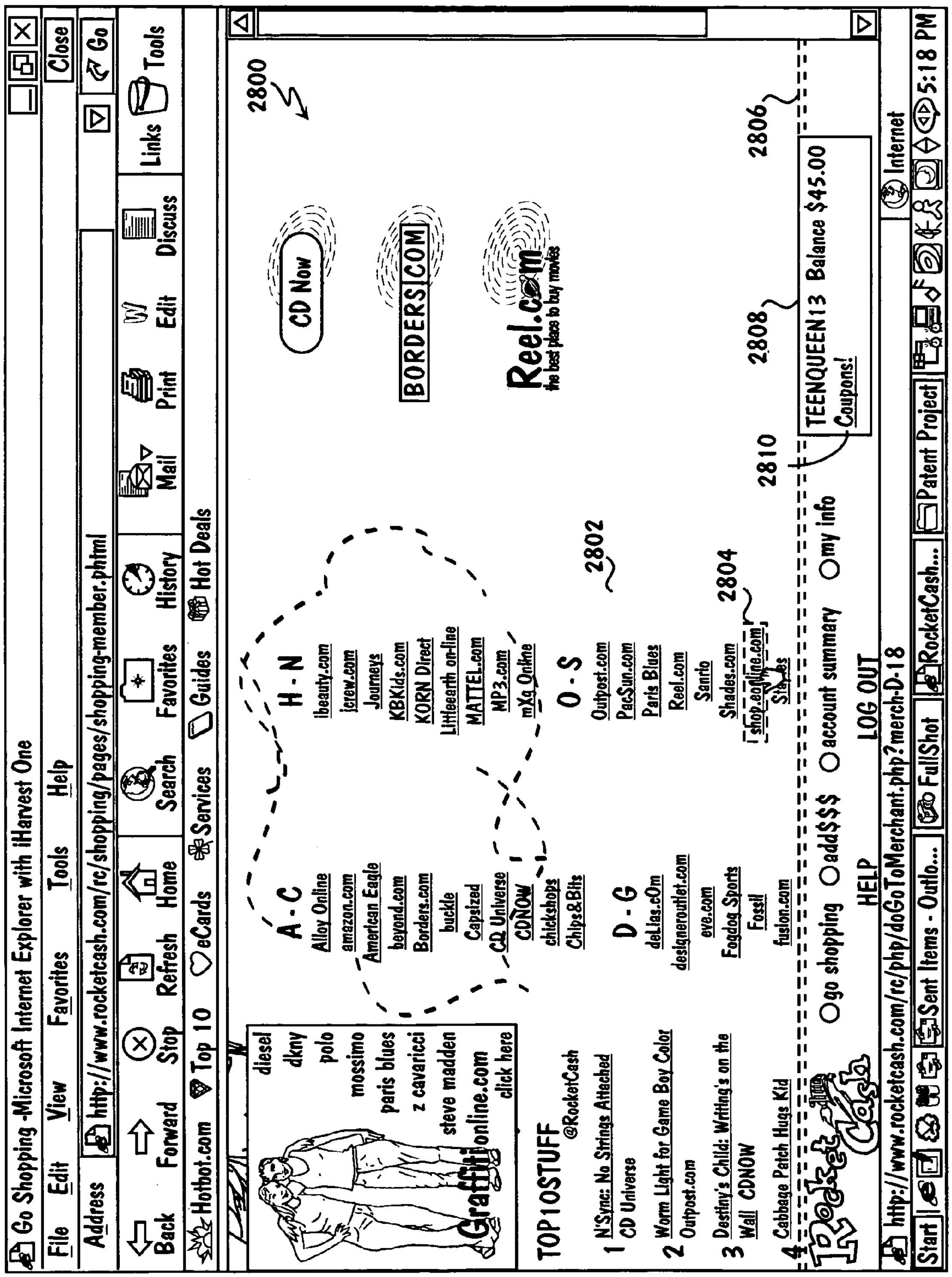
FIG. 28 is a shopping page of an embodiment from which a shopping session begins.

FIGS. 28–44 illustrate a shopping session using the surrogate system of an embodiment. FIG. 28 is a page 2800 of an embodiment including an alphabetical list 2802 of online merchants. The merchant names are enabled so that selection of a name takes the user to the corresponding merchant online shopping site or web pages. In this example, the user is selecting the icon 2804. The merchant list page 2800 displays information including the surrogate navigation bar 2806 comprising the user's username and current surrogate system account balance 2808. The merchant list page 2800 also includes an electronic link to coupons 2810.

Figure 29:
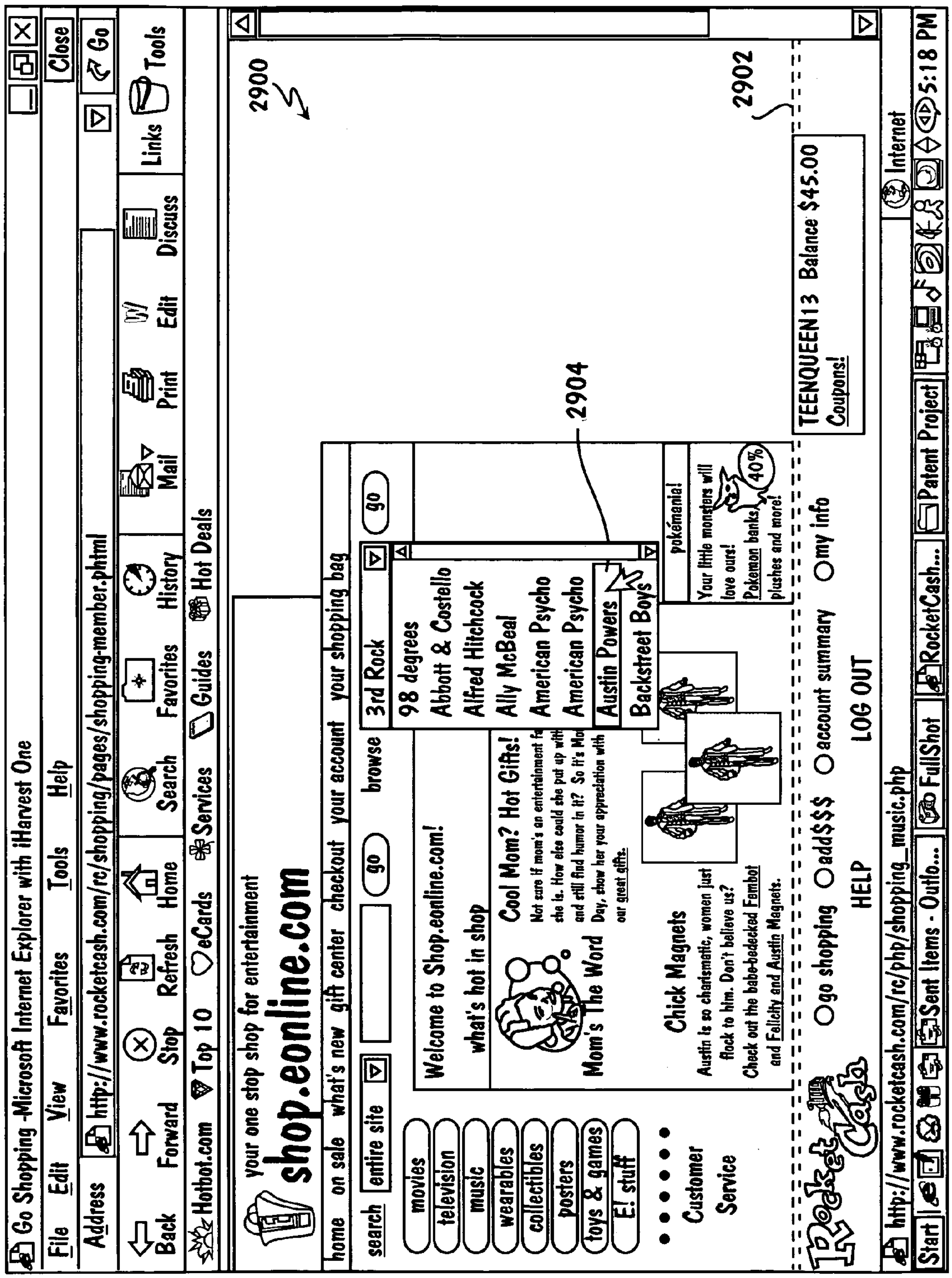
FIG. 29 is a web page of a selected merchant site as presented through the surrogate system of an embodiment.

In response to the selection of the icon 2804 the user is taken to the shop.eonline web site. FIG. 29 is a web page 2900 of a selected merchant site as presented through the surrogate system of an embodiment. The merchant web page 2900 is presented to users the same as it would be if they went directly to the merchant web site without using the surrogate system, except that the merchant web page 2900 is displayed along with a surrogate system navigation bar 2902, but the embodiment is not so limited. The surrogate system navigation bar provides the user with access to surrogate system functionality while navigating through and shopping from the merchant web site. This functionality includes access to other merchants, account funding, account summary information, personal information, help, log out, and a display of the users user name and account balance. Using the functions of the merchant web page the user selects and navigates to particular areas of a merchant site or merchandise 2904 in which they are interested, for example Austin Powers.

Figure 30:
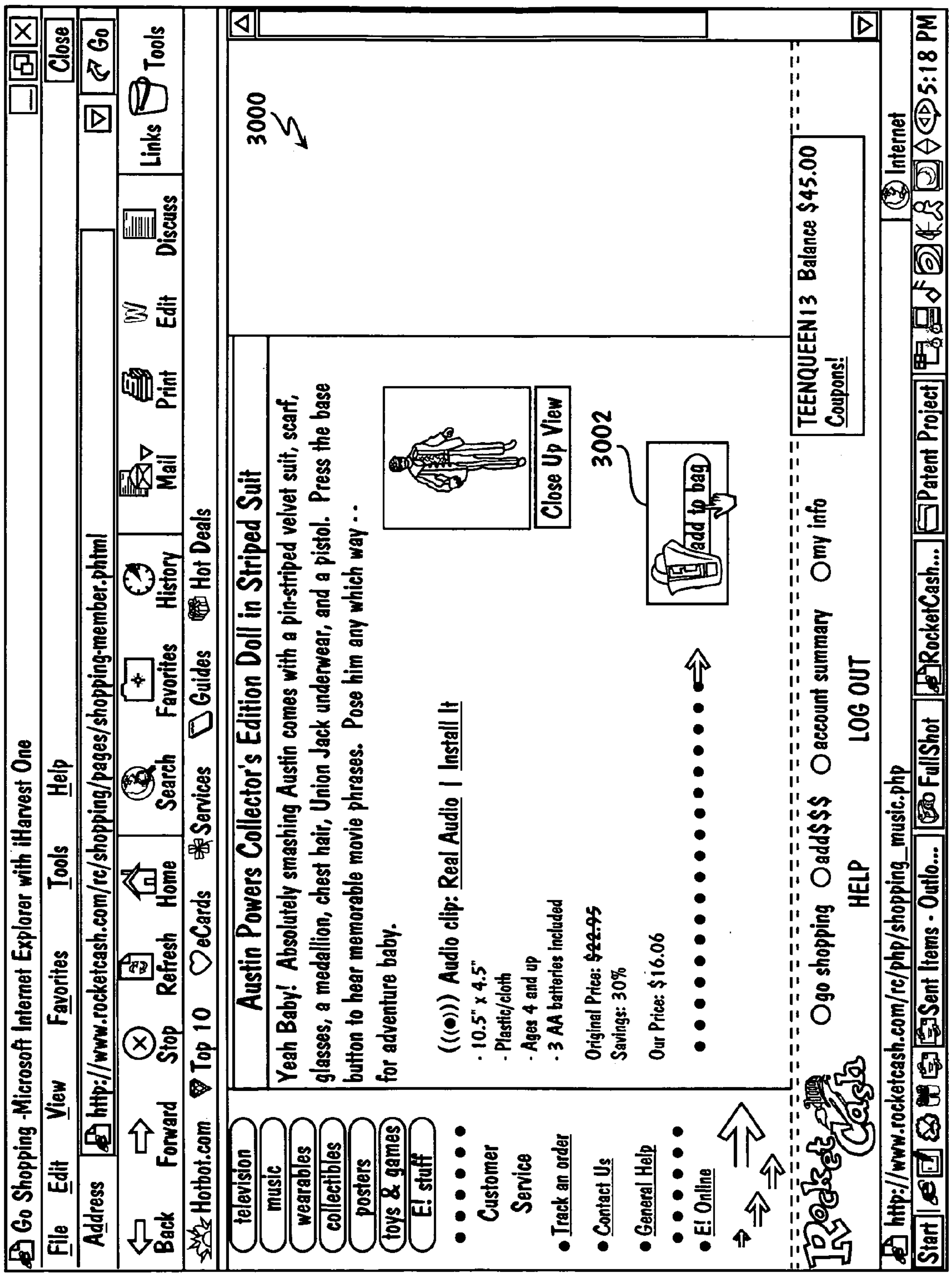
FIG. 30 is a web page containing merchandise of a selected merchant site as presented through the surrogate system of an embodiment.

In response to selection of Austin Powers merchandise 2904, the user is taken to at least one web page 3000 of the merchant web site containing Austin Powers merchandise. FIG. 30 is a web page 3000 containing merchandise of a selected merchant site as presented through the surrogate system of an embodiment. To initiate a purchase transaction the user selects a purchase icon provided by the online merchant, for example the "add to bag" icon 3002.

Figure 31:
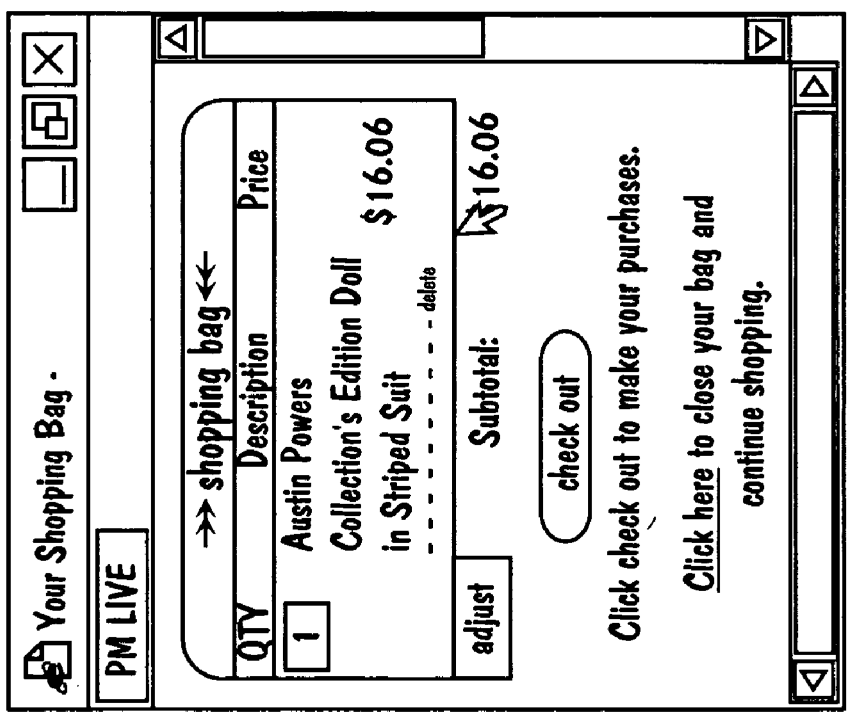
FIG. 31 is a shopping bag list web page of a selected merchant site as presented through the surrogate system of an embodiment.

In this example, selection of the "add to bag" icon 3002 results in presentation of a typical web page 3100 including a list of the items selected for purchase from the online merchant thus far in the user's shopping session. FIG. 31 is a shopping list web page 3100 of a selected merchant site as presented through the surrogate system of an embodiment. The typical shopping list page 3100 provides users with icons that allow them to either finalize their purchase transaction or return to shopping pages and continue shopping. In this example the user elects to continue shopping and navigates to another merchant web or shopping page 3200.

Figure 32:
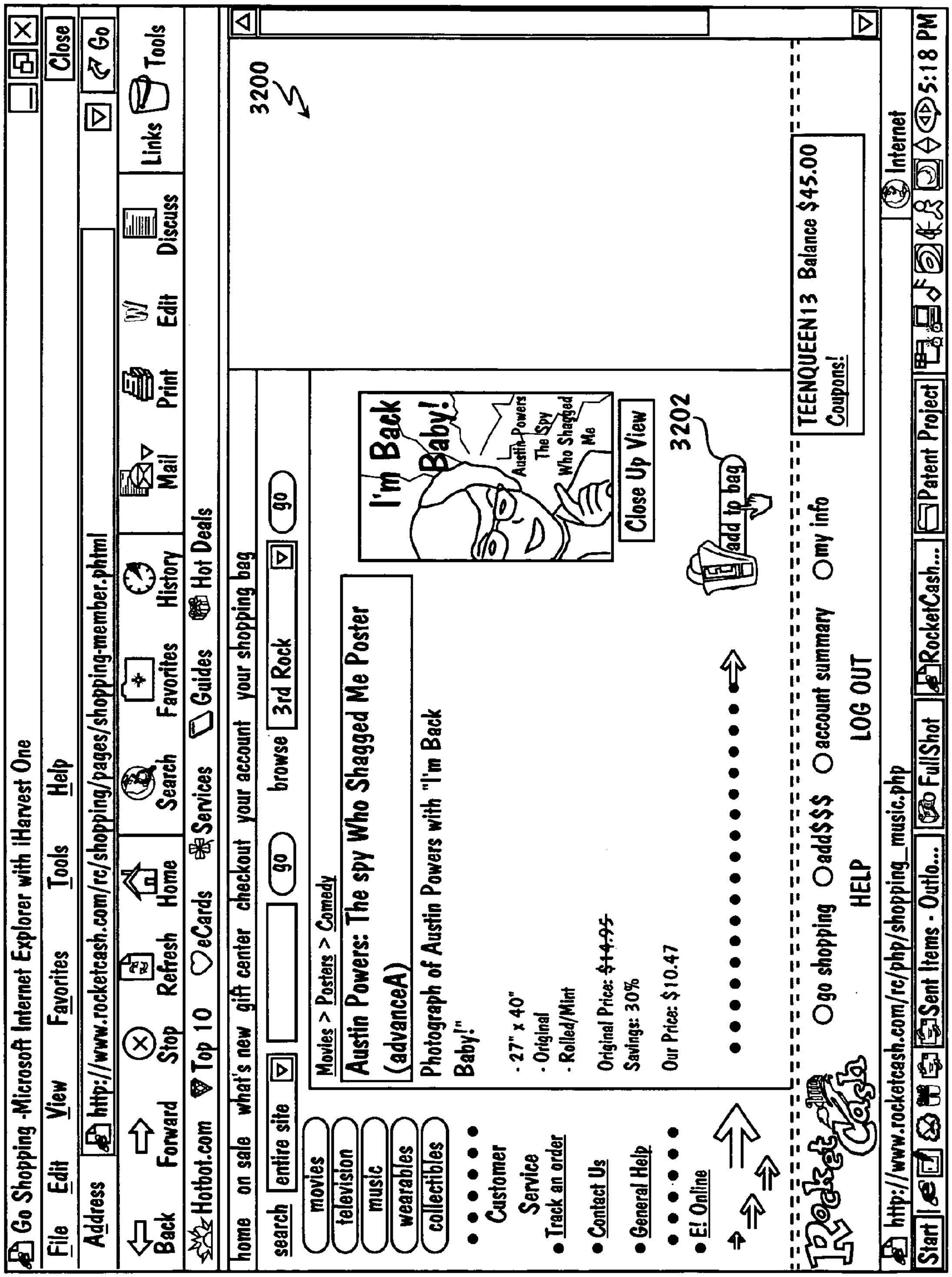
FIG. 32 is another web page containing merchandise of a selected merchant site as presented through the surrogate system of an embodiment.
Figure 33:
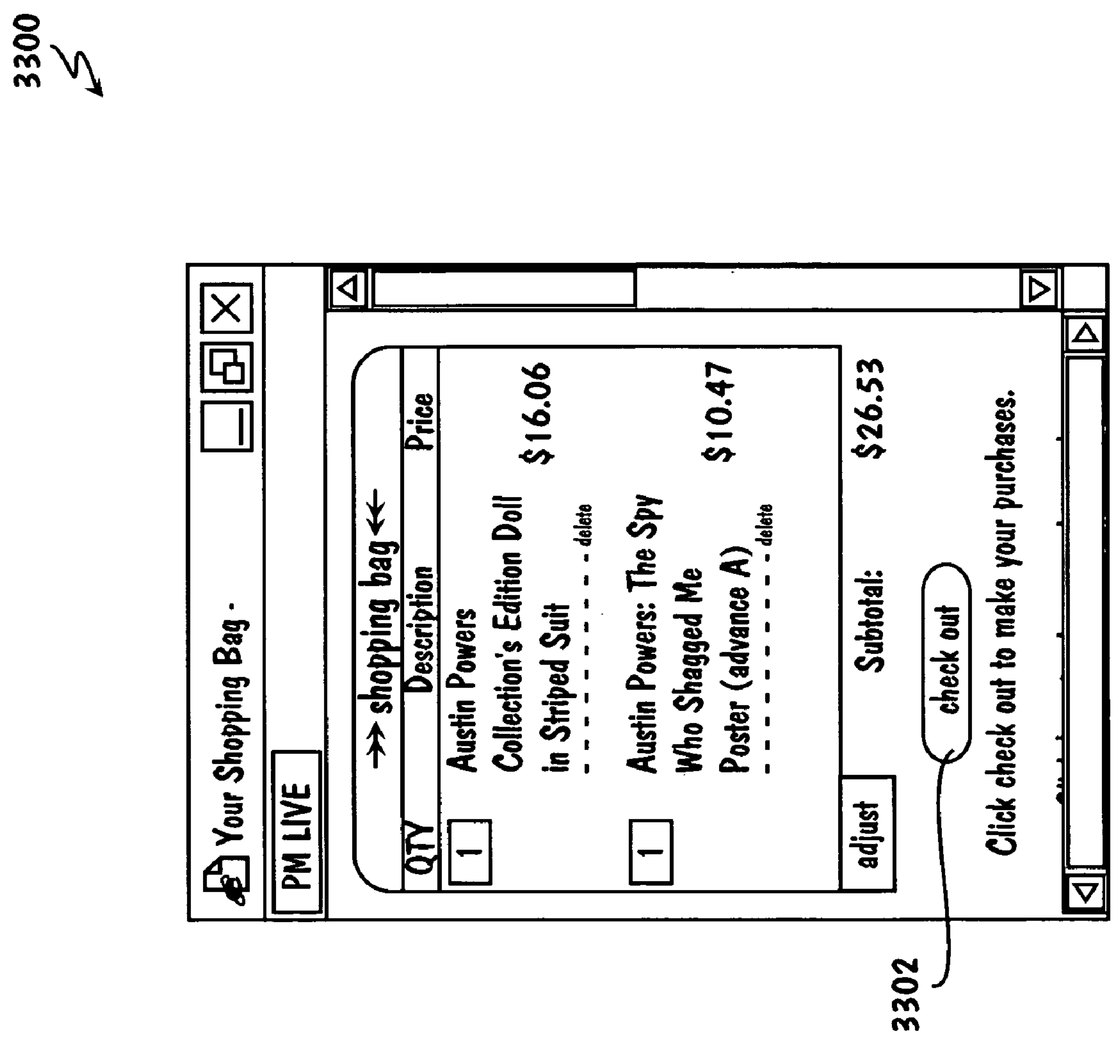
FIG. 33 is an updated shopping bag list web page of a selected merchant site as presented through the surrogate system of an embodiment.
Figure 34:
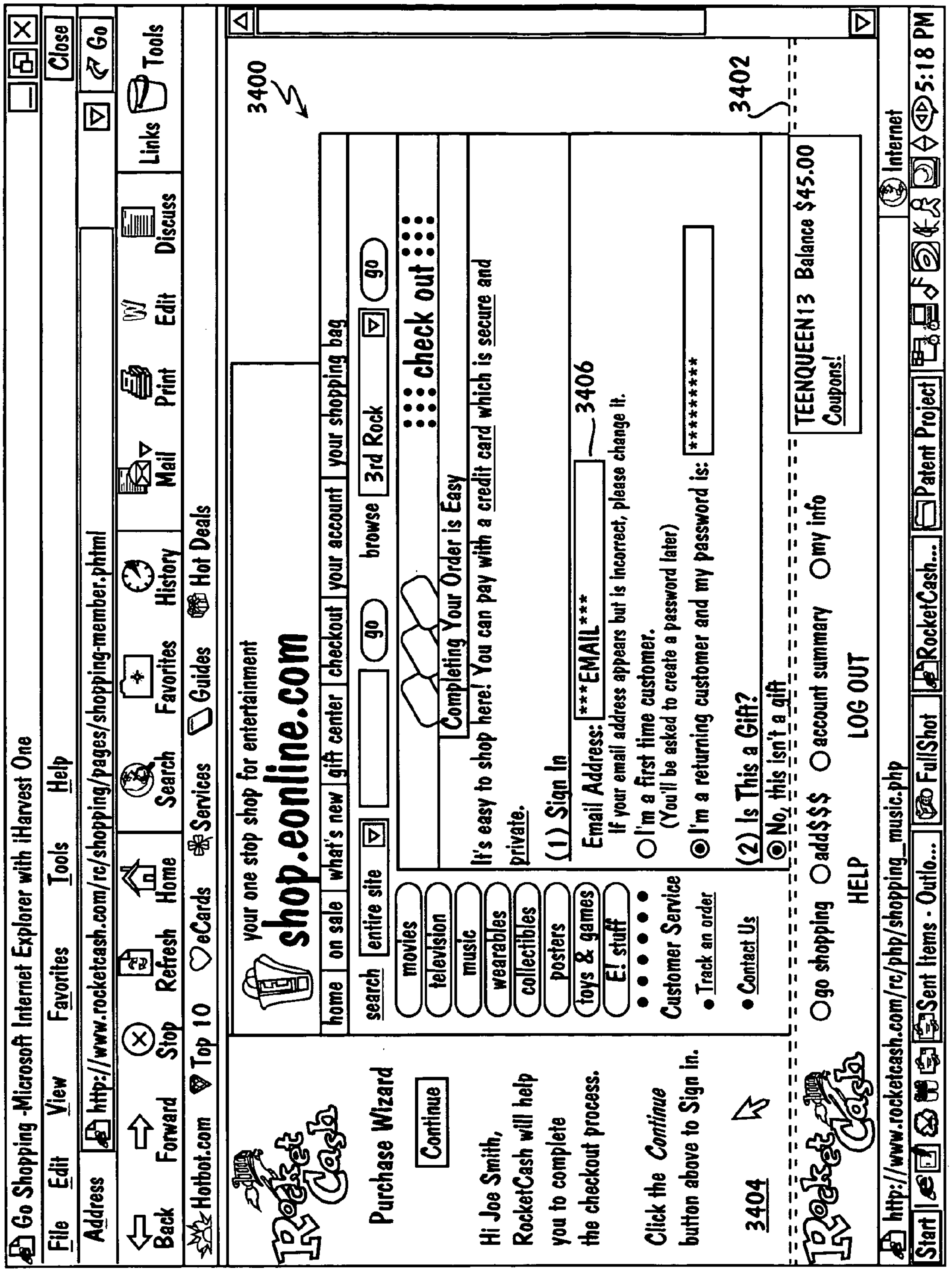
FIGS. 34–37 show the check out web pages of a selected merchant site as presented through the surrogate system of an embodiment.
Figure 35:
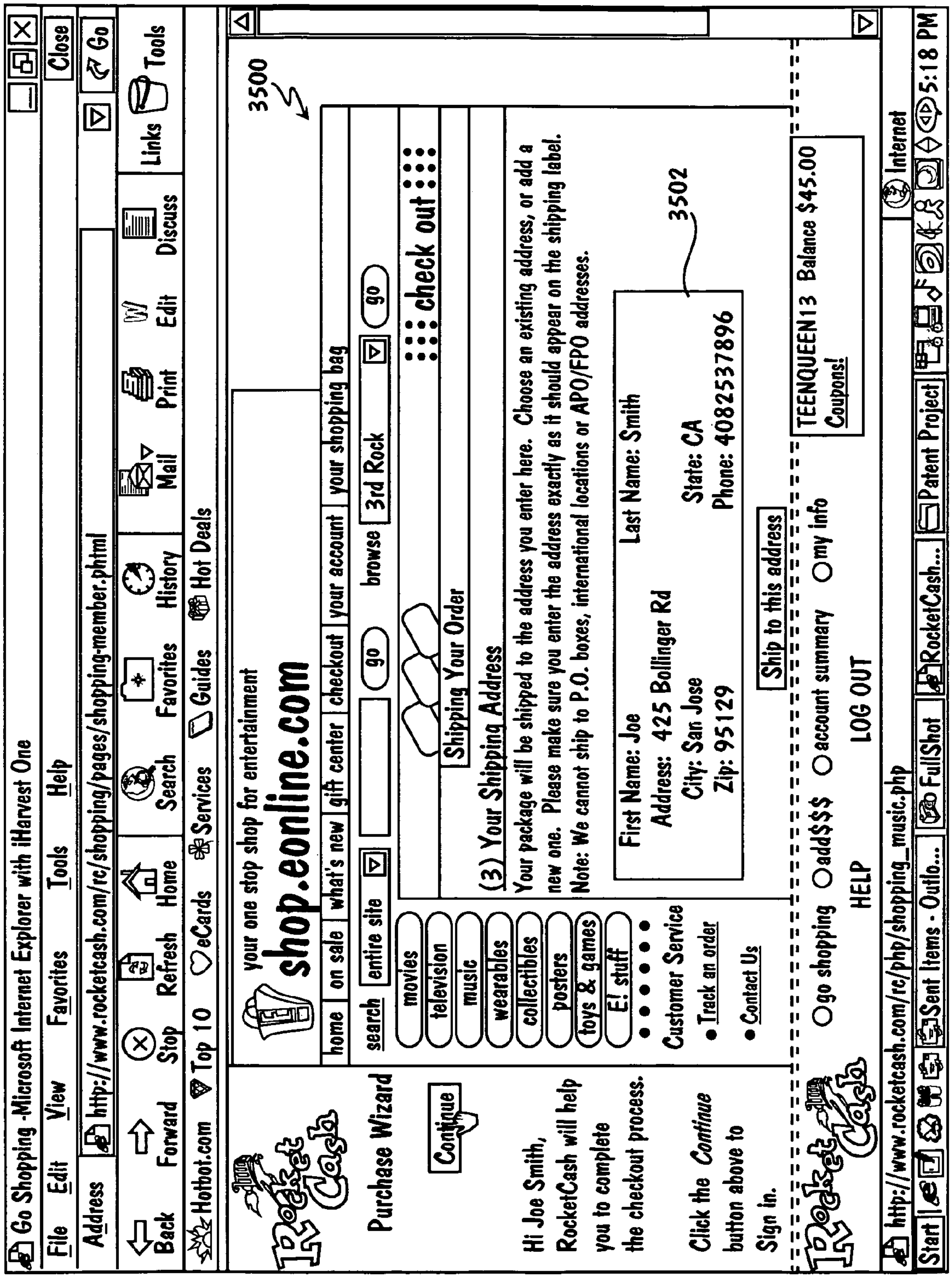
Figure 36:
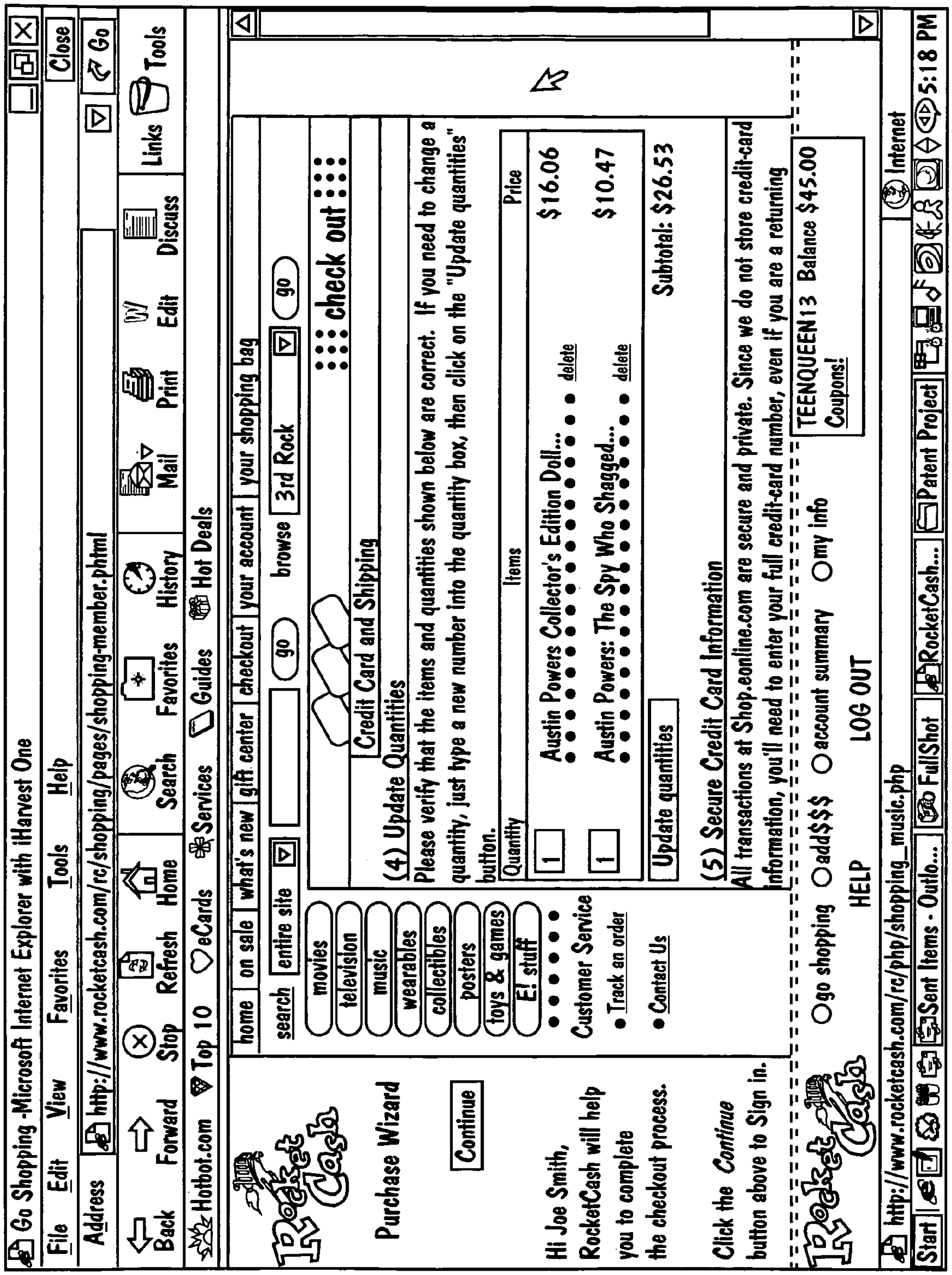
Figure 37:
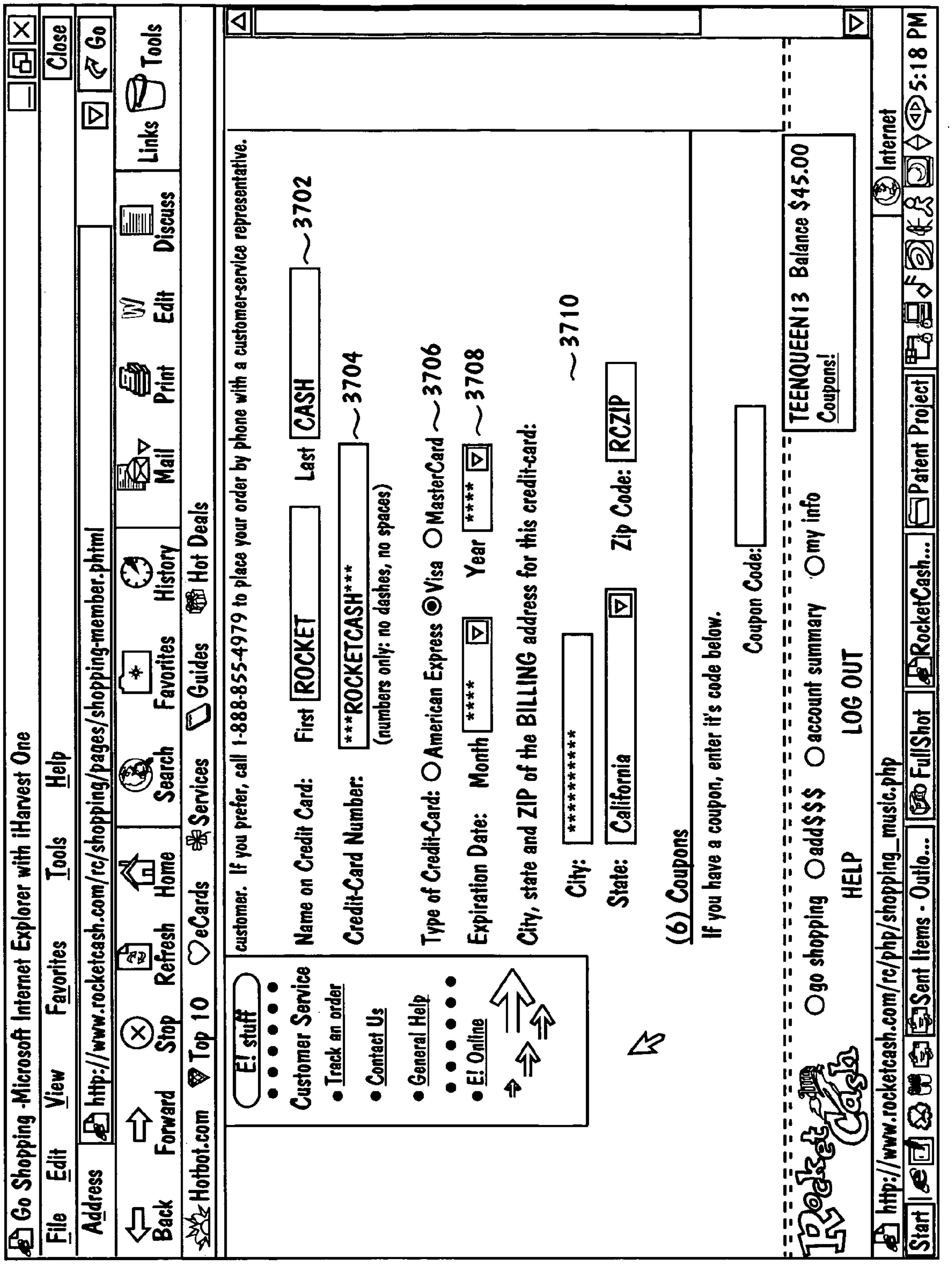

FIG. 32 is a web page 3200 containing merchandise of a selected merchant site as presented through the surrogate system of an embodiment. Again, the user initiates a purchase transaction by selecting the purchase icon provided by the online merchant, the "add to bag" icon 3202, and a shopping list page 3300 is presented that now includes the two items selected by the user for purchase thus far in the user's shopping session. FIG. 33 is an updated shopping list web page 3300 of a selected merchant site as presented through the surrogate system of an embodiment. The user elects to cease shopping and complete the purchase transaction by selecting the "check out" icon 3302. A number of check out web pages 3400–3700 are presented to the user in response to selection of the "check out" icon 3302.

FIGS. 34–37 show the check out web pages 3400–3700 of a selected merchant site as presented through the surrogate system of an embodiment. The check out web pages 3400–3700 presented to the user are the same check out web pages the user would be presented with if they went directly to the merchant web site without using the surrogate system, except that the check out web pages 3400–3700 are displayed along with information including a surrogate system navigation bar 3402 and a Purchase Wizard 3404 or Pay Wizard. The surrogate system navigation bar 3402 provides the user with access to surrogate system functionality while completing a purchase transaction on the merchant web site.

The Purchase Wizard 3404 is presented by the surrogate system on a portion of the check out pages 3400–3700, thereby allowing the user to complete the purchase transaction using funds from their surrogate system account. The Purchase Wizard 3404 can be presented along with any of the check out pages of the online merchant site, and can be presented on any portion of a page. When prompted, the user can sign in to the surrogate system, if they have not previously done so during the shopping episode, by selecting the "continue" icon of the Purchase Wizard 3404. In addition to activation of the Purchase Wizard 3404, the surrogate system form fill engine automatically fills in the required fields 3406, 3502, and 3702–3710 of the check out web pages 3400–3700.

In an embodiment, the surrogate credit card information 3702–3710 entered on the check out web pages is not displayed to the user as the credit card belongs to the surrogate system, even though this information is sent to the merchant. Therefore, the credit card information is secured by not allowing the user to view the information.

Figure 38:
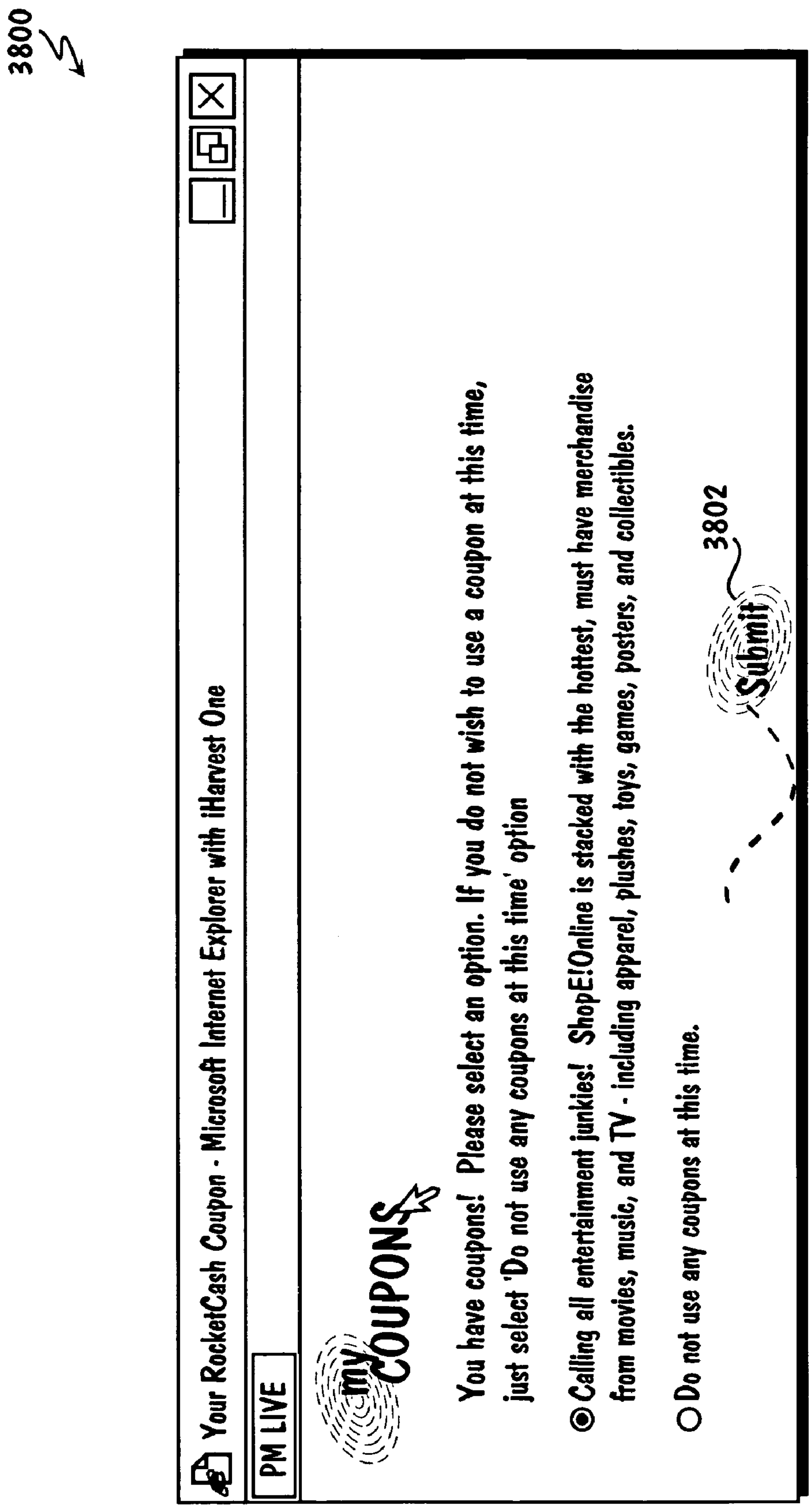
FIG. 38 is a coupon page of a surrogate system of an embodiment.

If a user has coupons that are determined to be applicable to the particular online merchant and the particular items selected for purchase then the surrogate system can so advise the user by inserting a coupon page 3800. FIG. 38 is a coupon page 3800 of a surrogate system of an embodiment. The coupon page 3800 inserted can be displayed as a separate page, a page overlay, or a pop-up page. The coupon page 3800 provides the user with a number of options including, but not limited to, using the coupons or not using the coupons for the current purchase. Following selection of an option the user selects a "submit" icon 3802 to submit their selection to the surrogate system.

Figure 39:
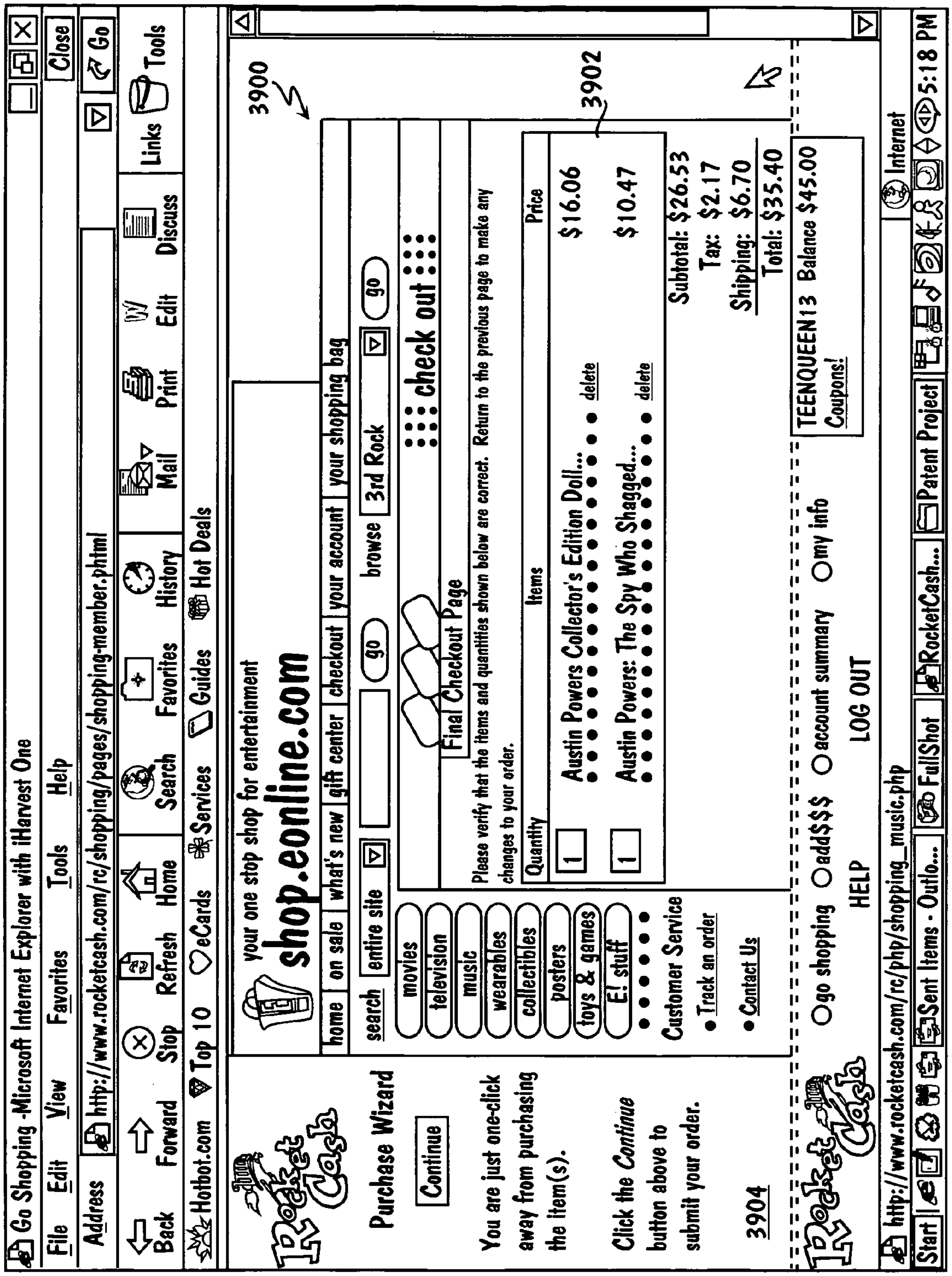
FIGS. 39 and 40 are a check out confirmation page of a selected merchant site as presented through the surrogate system of an embodiment.
Figure 40:
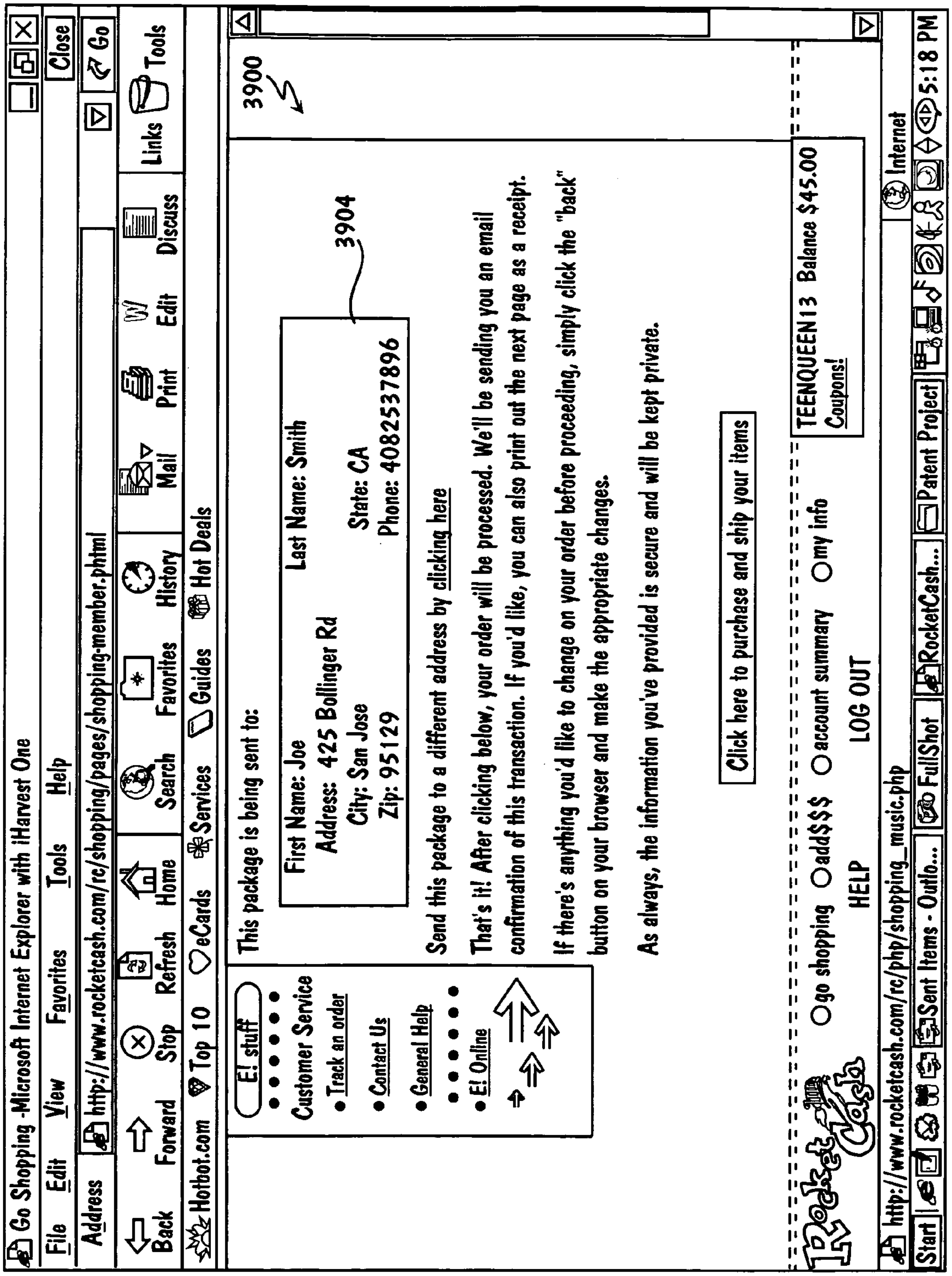

FIGS. 39 and 40 are a check out confirmation page 3900 of a selected merchant site as presented through the surrogate system of an embodiment. The check out confirmation page 3900 includes items, quantities, and totals 3902 of the current order along with shipping information 3904 provided for verification by the user, but are not so limited. The Purchase Wizard 3904 provides a "continue" icon, the selection of which results in submission of the order to the online merchant through the surrogate system once the user has verified the information.

Figure 41:
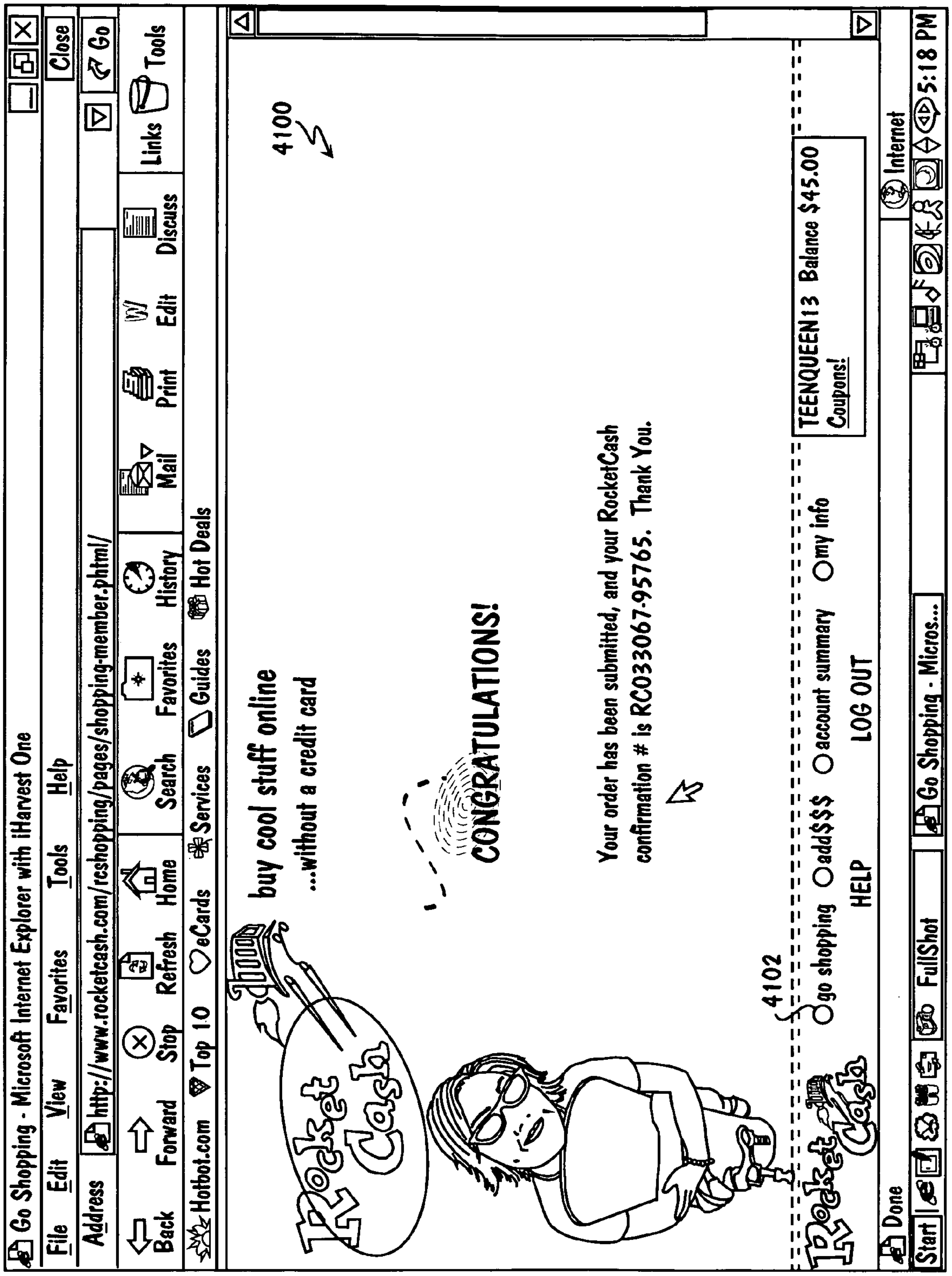
FIG. 41 is a congratulations page presented by the surrogate system of an embodiment.

Upon successful submission of the order, a congratulations page 4100 is presented by the surrogate system. FIG. 41 is a congratulations page 4100 presented by the surrogate system of an embodiment. Following successful completion of the order the user can return to areas in the surrogate system from which shopping can continue by selecting the "go shopping" icon 4102 from the congratulations page 4100. At least one shopping page is presented in response to selection of the "go shopping" icon 4102.

Figure 42:
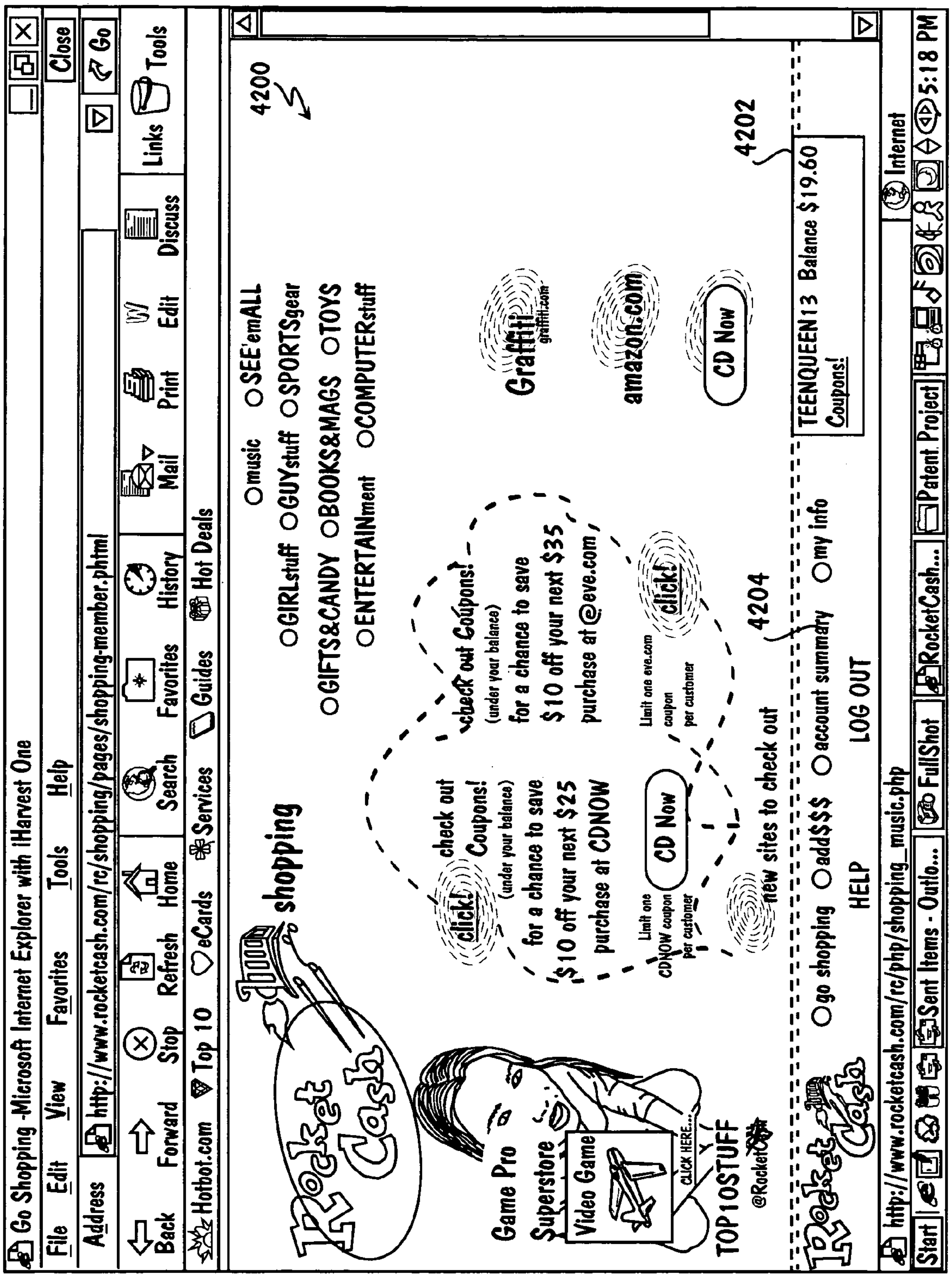
FIG. 42 is a shopping page displayed by a surrogate system of an embodiment.

FIG. 42 is a shopping page 4200 displayed by a surrogate system of an embodiment. The user's surrogate system account balance 4202 displayed on the shopping page is updated reflecting the user's purchase. Selection of the "account summary" icon 4204 results in the presentation of an account summary page 4300 by the surrogate system.

Figure 43:
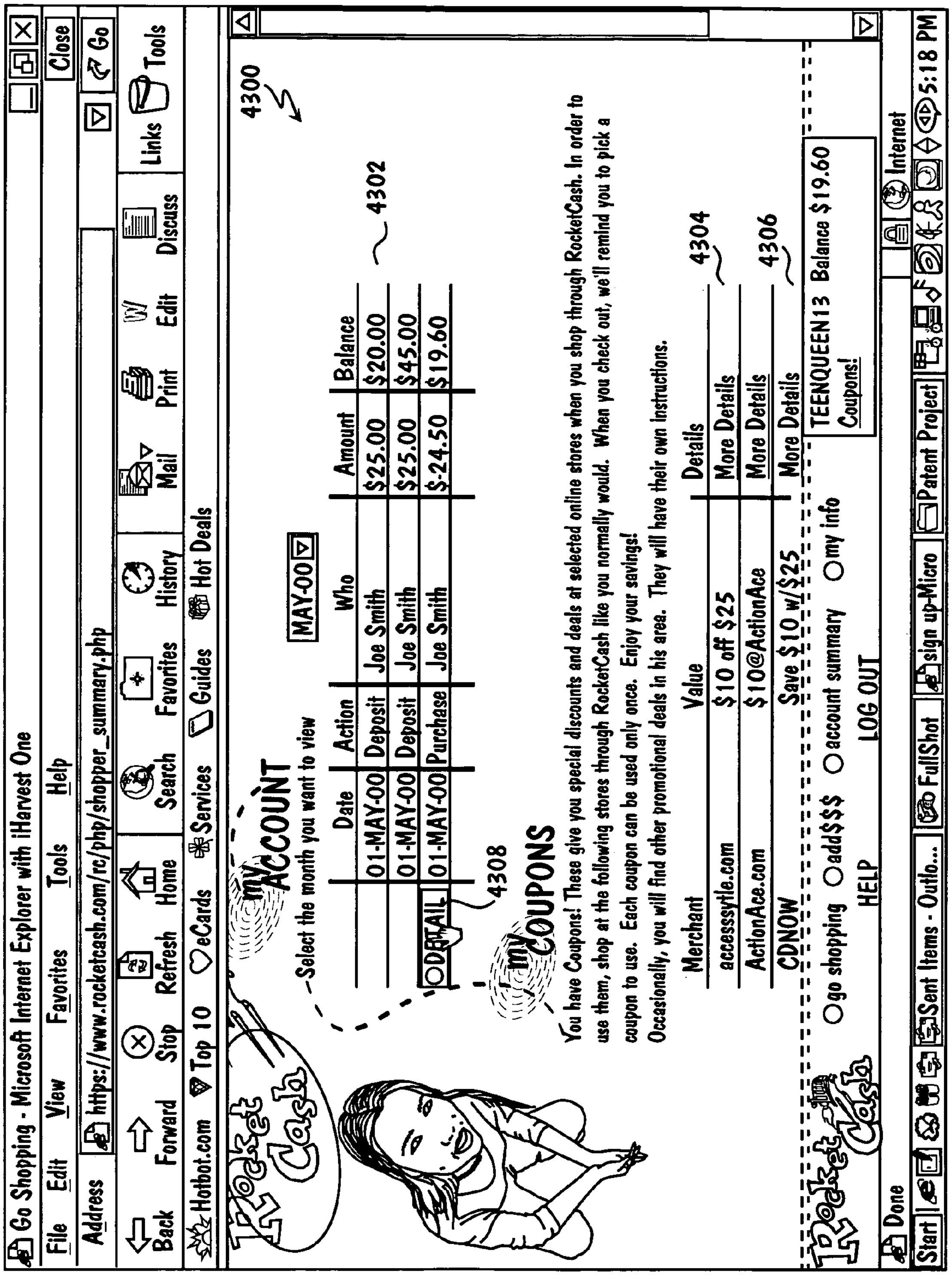
FIG. 43 is an account summary page displayed by a surrogate system of an embodiment.

FIG. 43 is an account summary page 4300 displayed by a surrogate system of an embodiment. The account summary page 4300 displays information including account activity information 4302 and coupon information 4304. The account activity information 4302 is selectable by month and includes information on deposits and purchases. The coupon information 4304 includes a list of coupons available for use by the user, including the redeeming merchant and the coupon value. The coupon information also includes an icon 4306 associated with each coupon that, when selected, allows the user to obtain detailed information on the associated coupon.

The account activity information 4302 also includes an icon 4308 associated with each purchase action that, when selected, allows the user to obtain detailed information on the associated purchase. Selection of the "DETAIL" icon 4308 results in the presentation of an account information page 4400.

Figure 44:
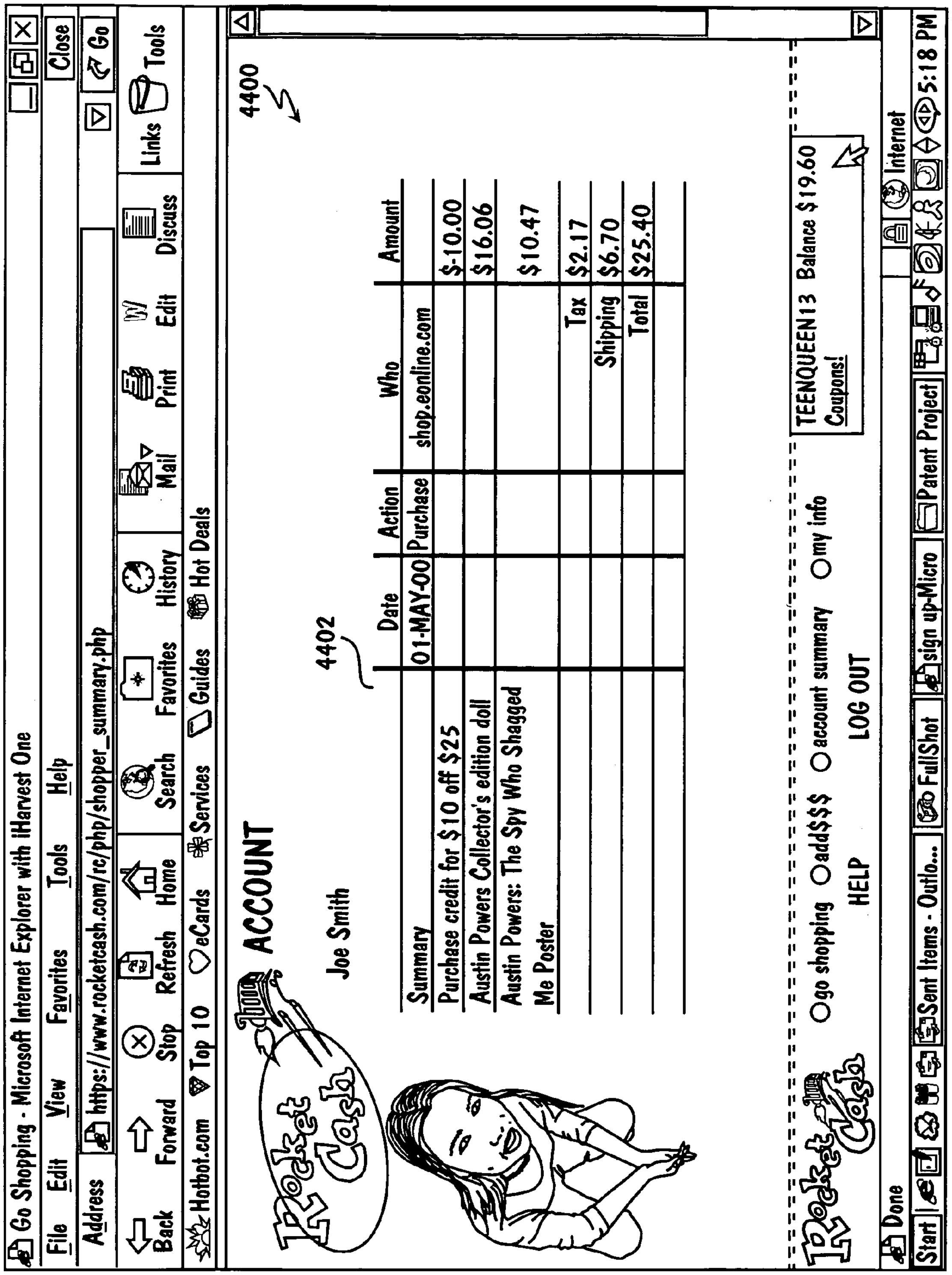
FIG. 44 is an account information page displayed by a surrogate system of an embodiment.

FIG. 44 is an account information page 4400 displayed by a surrogate system of an embodiment. The account information page 4400 includes, for each purchase, detailed information 4402 including the date of action, the type of action, the online merchant, the merchandise purchased along with the purchase price, credits or coupons used to offset the purchase price, tax assessed on the purchase, shipping charges, and total charges for the purchase, but is not so limited.

Figure 45:
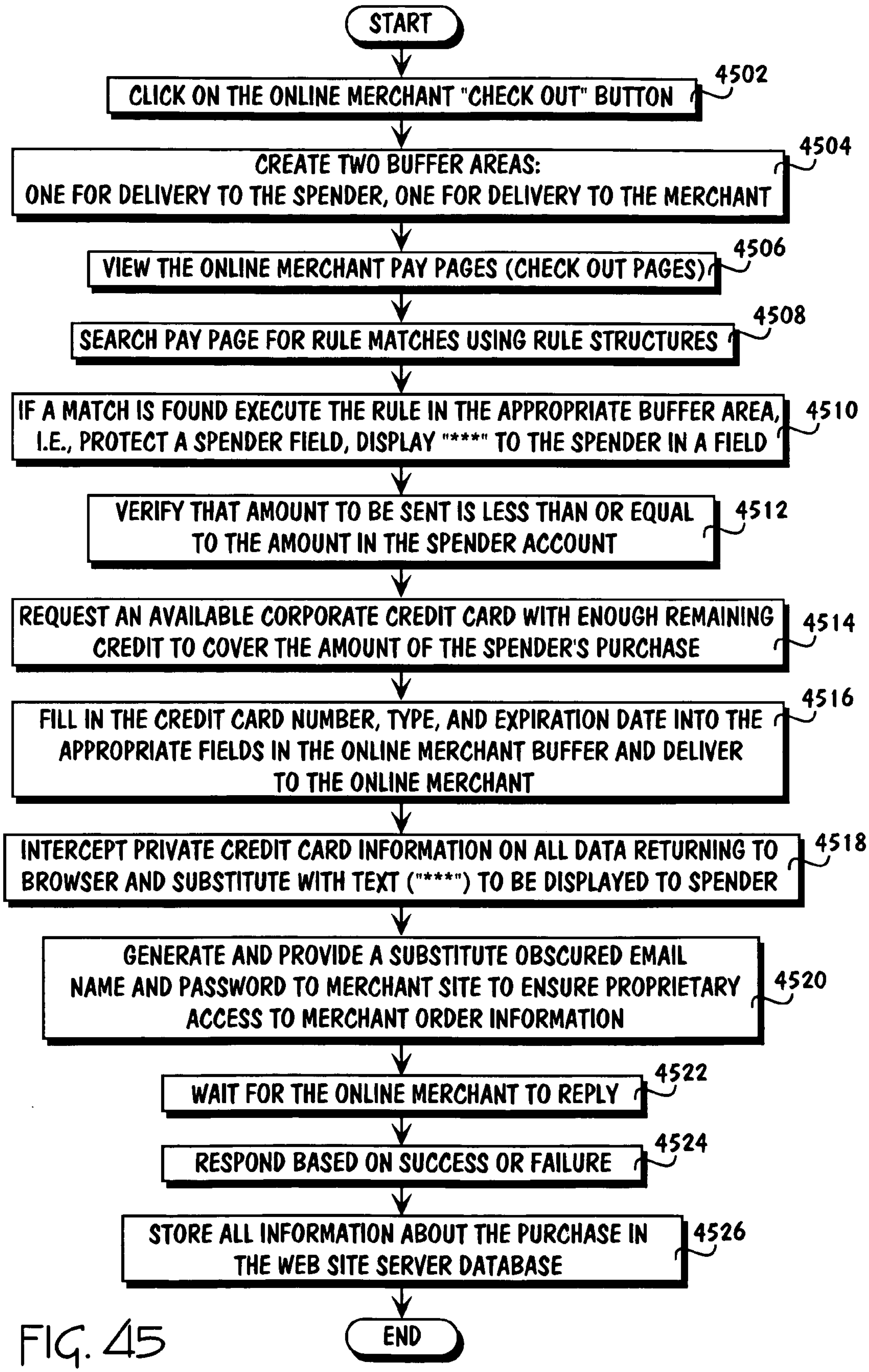
FIG. 45 is a flow chart for purchasing goods and services through a surrogate system of an embodiment.

FIG. 45 is a flowchart for purchasing goods and services through a surrogate system of an embodiment. Operation begins when, after selecting merchandise or services for purchase according to the processes provided on the online merchant web site, the user activates the "check out" button on the merchant web site or the surrogate system 4502. In response to activation of the check out sequence by the user, the surrogate server creates two buffer areas 4504. One buffer area is for delivery to the spender, and another buffer area is for delivery to the merchant. The surrogate server then reads the merchant pay pages 4506, or check out pages, and searches the pay pages for rule matches using rule structures 4508. When a rule match is located, the rule is executed in the appropriate buffer area (e.g., protect a spender field by displaying "*" to the spender in the protected field) 4510. Upon rule execution, the surrogate server verifies that the amount of the selected purchase is less than or equal to the user's available account balance 4512**.

After determining that the user's account balance is sufficient to make the purchase, the surrogate system searches a database containing surrogate credit cards and the associated account information 4514. When the user has been assigned a credit card or account, the surrogate system uses this credit card to fund the user's purchase. When the user has not been assigned a credit card, the surrogate system searches for a surrogate credit card having sufficient available credit to fund the user's selected purchase. The database information associated with the selected surrogate credit card is supplied to automatically fill in the appropriate fields in the merchant buffer 4516. The database information associated with the card comprises credit card number, card type, card expiration date, surrogate billing address, and surrogate email address, but is not so limited. The obscured form filling using the split buffer allows the surrogate credit card information to be obscured from the user, thereby maintaining the confidentiality of this information. The merchant buffer is delivered to the online merchant upon completion.

The private credit card information detected in data returning to the surrogate system is intercepted. Upon being intercepted, the credit card information is substituted with generic text, for example "** . . . *", and the generic text is displayed in the buffer area that is delivered to the user 4518. Furthermore, a surrogate email address comprising a substitute obscured email name and password is generated and provided to the merchant server 4520. This substitute email name and password ensures proprietary access to merchant order information.

The surrogate system server waits for and responds to any merchant electronic replies received in response to the purchase 4522–4524. These merchant replies include confirmation of order, out of stock notices, backorder information, shipping information, and anticipated delivery, but are not so limited. As the surrogate system is purchasing for the user using the surrogate's credit card, the surrogate has a need for some of the reply information from the merchant. However, the user, as the recipient of the merchandise, also needs pertinent reply information. Therefore, the surrogate provides a way to filter the merchant reply email and pass it on to the user.

In filtering the email, the surrogate system provides a surrogate dummy email address to the merchant during the automatic form filling of the merchant buffer. The surrogate dummy email address is linked, through the surrogate server, to the user's actual email address. As merchant replies are received in response to a particular order, the surrogate server filters the email for transactional information needed by the surrogate and then passes the email on to the user at their actual email address.

All information associated with purchases made using the surrogate server is stored by the surrogate system 4526. The surrogate system tracks purchase demographics and may provide these demographics to guardians, users, and merchants. Furthermore, the surrogate server may allow guardians, users, and merchants to filter and sort the demographic data. The demographic data comprises merchandise type, size, color, vendor, quantity, amount, merchant, date, time, spender account number, funder account number, and shipping address, but is not so limited.

The surrogate system of an embodiment provides account management information organized according to the funders, the spenders, and the surrogate. The account information organized according to the funder includes a funding transaction history and a transaction history for each spender funded. The account information organized according to the spender includes a transaction history organized by vendor, date, and category. The account information organized according to the surrogate includes surrogate credit card reconciliation reports and transaction history organized by funder, spender, surrogate credit cards, vendors, category, and demographics.

With reference to FIG. 2, a client accesses the system using typical web programs, including a web browser and email program. The user accesses the surrogate system web site using the web browser on a client computer and logs in, which allows the user to perform the following types of operations: manage account information including name, address, email address, and password; add money to the user's account or a different account; purchase gift certificates; restrict shopping including time of day/week or specific merchant restrictions; review shopping activity of user managed accounts; and, begin the shopping process.

The surrogate system web site maintains information about each registered user, or customer, in the surrogate system database. In addition to this, each shopper is assigned a unique credit system number or account number that can include credit card numbers. The credit card numbers correspond to credit cards of a credit card pool, wherein the pool can include Visa, Mastercard, American Express, and Discover credit cards. The database obtains the credit card numbers by directly communicating with the surrogate system bank.

Furthermore, the surrogate system database is coupled to the surrogate fraud detection system, thereby allowing the surrogate system to determine if a user or inputted data is, or potentially can be, fraudulent. If so, then the fraudulent user or data can be disabled, warnings sent to administrators, or other actions taken.

The surrogate system bank maintains financial information about the surrogate credit card pool, including available credit card numbers, credit card numbers assigned to particular users, enablement status of credit cards, the billing name/addresses, and the balances available on each card. The surrogate system bank can be a financial institution or credit issuing authority that is accessed over separate secure connections. Furthermore, the surrogate system bank can include financial institutions or credit issuing authorities accessible via the Internet or other credit system network. Moreover, the surrogate system bank can include a combination of financial institutions accessed over separate secure connections and members of the credit system or network.

A typical proxy server operates as a non-transparent proxy where the client browser knows it is using a proxy. The proxy servers of the surrogate system of an embodiment, however, operate as transparent proxy servers wherein the client browser does not know that the surrogate proxy servers are intercepting the electronic traffic between the client browser and the merchant. The proxy servers include the surrogate shopping servers and the surrogate email proxy server. The surrogate system proxy servers communicate with the client browser and the merchant server in providing merchant pages back to the client browser. The surrogate proxy servers cache the merchant pages, wherein the client browser explicitly returns to the surrogate system proxy servers which specify the merchant page or pages to hit, thereby increasing the speed of subsequent page hits.

The surrogate shopping proxy server of an embodiment is a transparent conduit between the shopper and the supported merchants, or online merchant partners. When a user wishes to shop at a merchant, the user is redirected to the surrogate shopping proxy server instead, which proxies all the information from the merchant shopping site in real time. The surrogate shopping proxy servers ensure that: the current user is a valid user; user interaction with the merchant site always returns control back to the surrogate shopping proxy servers; HTTP cookies are processed and proxied; merchant forms are automatically filled out; and, selected information such as credit card numbers are not displayed to the client. The surrogate shopping proxy servers are completely stateless, allowing more servers to be added or deleted without affecting the operation of any current ongoing client sessions, but are not so limited.

The surrogate shopping proxy servers also maintain the operational information of the surrogate system database, including: user information like user name, physical address, email address, password, telephone number, and account balance; credit card information for a surrogate system credit card assigned to the user; merchant forms or web pages that are to be processed by the shopping servers, and instructions on how processing is to be executed; and, coupons available to the user.

A surrogate shopping proxy server of an embodiment remains completely stateless, but is not so limited. As such, transactions are autonomous, thereby allowing any number of proxy servers to be implemented for a load balanced system, independent of which server is accessed. This allows the surrogate system to scale horizontally by simply adding more proxy servers to the load balanced system.

Figure 46:
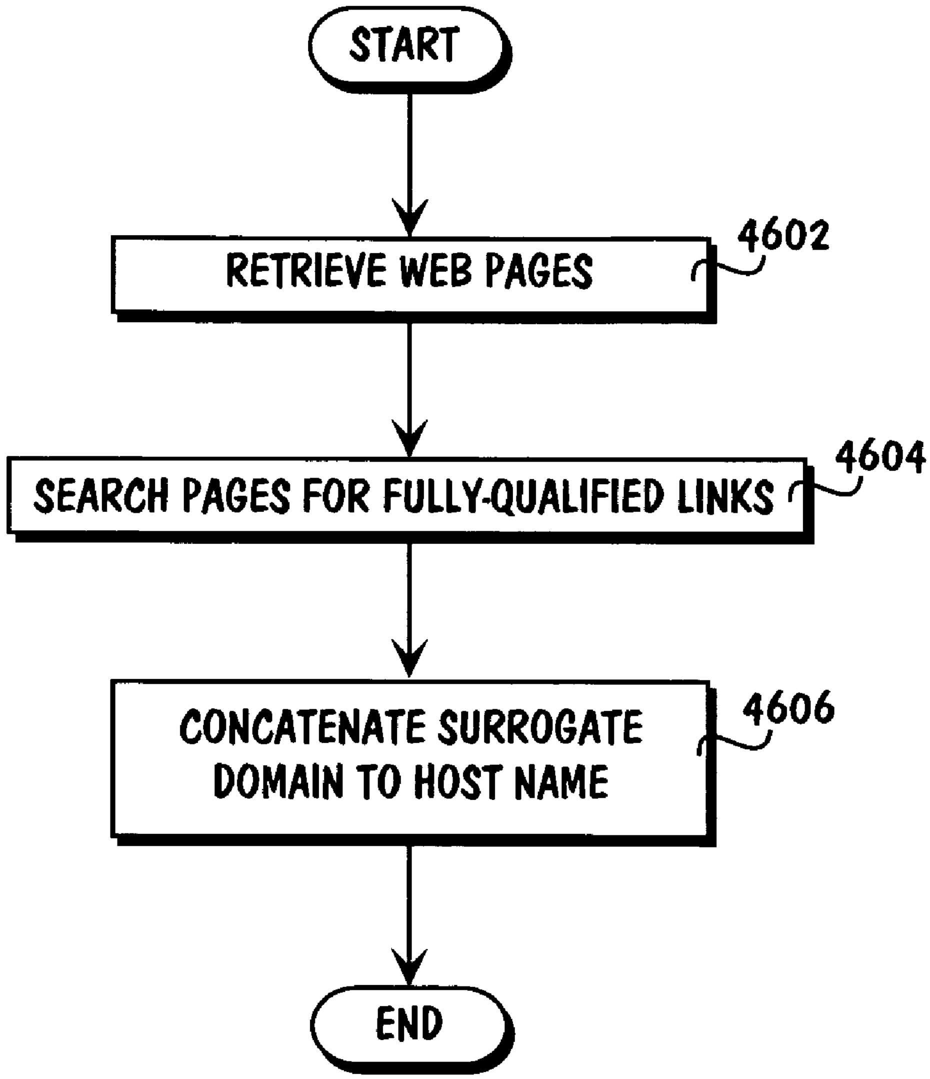
FIG. 46 is a flow chart for modifying a web page in an embodiment.

While shopping using the surrogate system, the user's web browser hits a page on the surrogate shopping proxy server, which in turn retrieves the page from the merchant web server. To ensure that the surrogate shopping proxy server always has control, it often modifies the page so that no matter what the customer clicks on, it always returns to the surrogate shopping proxy server. FIG. 46 is a flow chart for modifying a web page in an embodiment.

In considering modification of a page from a merchant web server, it is noted that each Uniform Resource Locator (URL) to a merchant looks the same except for the domain name. The domain name has appended to it the domain name of the surrogate shopping proxy server. For example, if the final URL being accessed is "http://www.USPTO.gov/shopping/product/item.html," it is rewritten to look like "http://www.USPTO.gov.proxy.surrogate.com/shopping/product/item.html". Therefore, the domain name proxy.surrogate.com is the domain name of the surrogate shopping proxy server. Consequently, the surrogate system owns the Domain Name System (DNS) domain proxy.surrogate.com and every subdomain under it. As such, *.proxy-.surrogate.com will return to the surrogate proxy server.

Using this scheme, the HTML pages being retrieved by the surrogate system 4602 do not have to be modified for types of links that include, but are not limited to, relative references (i.e. subdir/page.html), and absolute relative to the root (i.e. /full/path/subdir/page.html). Therefore, the fully-qualified links that include the host name, such as "http://hostname/full/path/subdir/page.html" are searched for and processed 4604.

Consequently, the surrogate system finds the host name (hostname) and concatenates the surrogate domain to it (hostname.proxy.surrogate.com) 4606. When the user browser accesses this final domain, it will return to the surrogate shopping proxy server and, based on the domain name being accessed, the surrogate shopping proxy server knows immediately what the target domain should be by stripping off the surrogate shopping proxy server's own domain name from the host name.

The processing of transmissions from the client web browser to the surrogate shopping proxy server includes a number of rules, but is not so limited. The surrogate shopping proxy domain is removed from the complete remote host name, and the new hostname name is used as the target of the proxy operation. The surrogate shopping proxy domain is removed from the "Referer" header, where some sites use the "Referer" header for navigation. The request is then sent on to the merchant web site.

Figure 47:
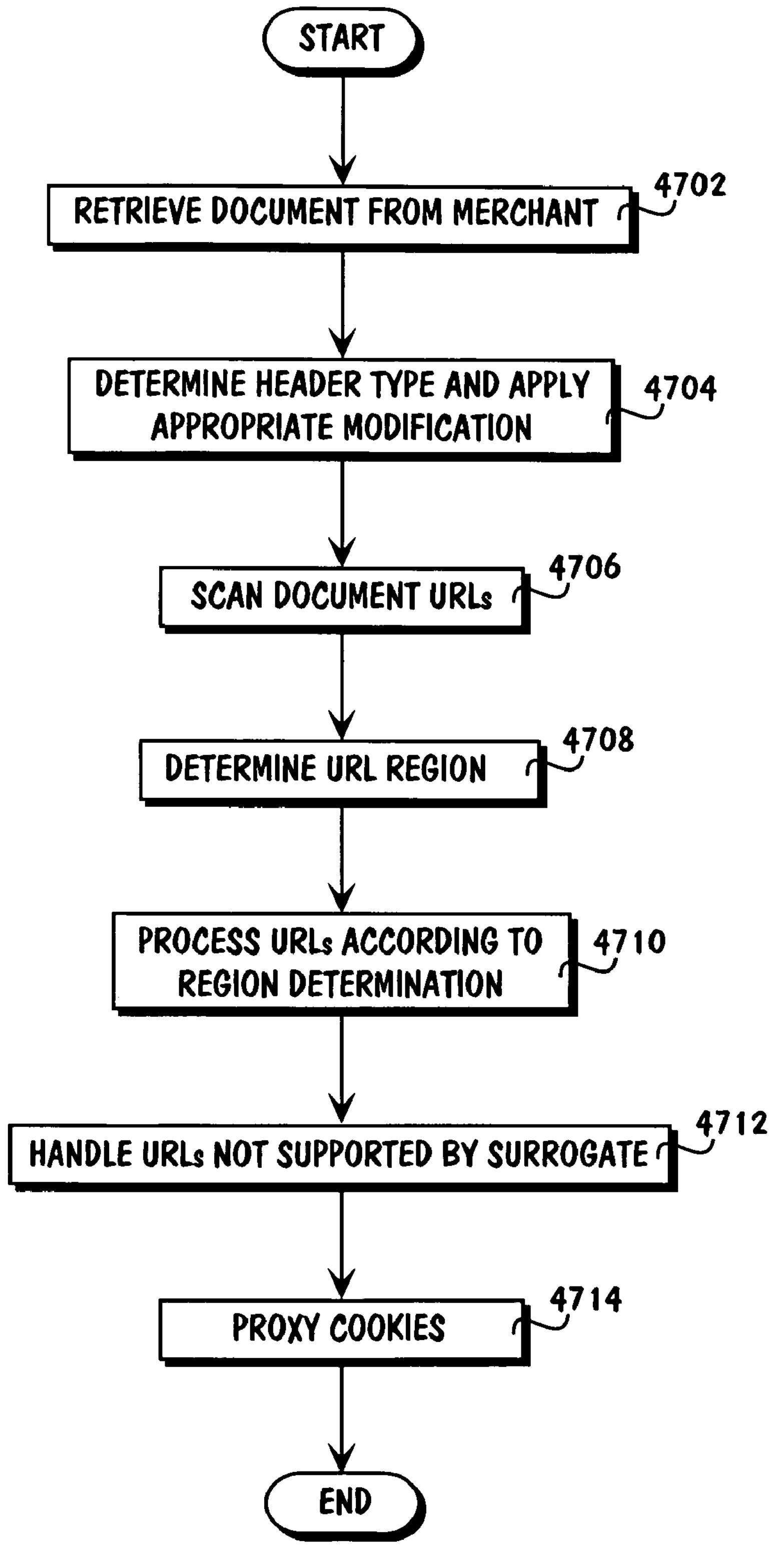
FIG. 47 is a flow chart for processing transmissions from a surrogate system of an embodiment to a client browser.

FIG. 47 is a flow chart for processing transmissions from a surrogate system of an embodiment to a client browser. The processing of transmissions from the surrogate shopping proxy server to the client web browser also includes a number of rules, but is not so limited. Operation begins by retrieving a response from the merchant web site 4702 and determining a header type 4704. If there is a "Location" header, the surrogate proxy domain is appended to the hostname as this is a form of redirection. If there is a "Content-Location" header, the proxy domain is appended to the hostname as this is a form of redirection. For any "Set-cookie" headers, the proxy domain is appended to the "domain" portion of the cookie if it exists. This ensures that the cookies are placed in the correct proxied domain.

Furthermore, the retrieved document is scanned for fully qualified URLs ("http://hostname/url" or "//hostname/url") 4706. The URLs can be within an HTML tag or within a javascript region 4708. If the URL is not within an HTML tag or within a javascript region, it is user visible and is not changed. Particular processing is executed, as follows, based on whether the URL is determined to be within an HTML tag or javascript region 4710.

Four alternative actions are available when the URL is within an HTML tag, but the embodiment is not so limited. As a first alternative, if the URL ends with an extension indicating that the content is binary data (i.e., .gif,.jpg, . . . ) then the hostname is not modified as the content does not need to be examined or modified. As a second alternative, if the URL appears to be embedded in another URL (i.e. an argument to another URL), don't modify the URL. As a third alternative, if the URL is not binary content, append the proxy domain to the hostname portion of the URL. As a fourth alternative, if the URL is part of a "<meta content='#; url'>" tag, modify the URL as this is a form of redirection.

When the URL is within a javascript region, the code is located that can force a page reload (i.e., ".location.replace (URL)", ".location=URL", ".location.href=URL") and the code is changed to call a function instead (i.e., ".location. replace(_rcFunc(URL))", ".location=_rcFunc(URL)"). Code is next added to the header of the page for _rcFunc( ). This function will check the incoming URL and, if fully qualified, append the proxy domain to the hostname.

While an embodiment of the surrogate system proxy server rewrites URLs so that they are transformed to a URL of a particular form, there can be many sites to which the proxy server does not want to proxy. For example, if a particular merchant web site has an advertiser link to another merchant web site, the link would be converted, but it may not be desirable to follow this link and proxy it because online shopping may not be supported or desired on this other site. Consequently, the proxy server of an embodiment uses an ErrorDocument handler that handles URLs not supported by the surrogate by not assigning a RewriteRule to those URLs 4712. This is done using a Common Gateway Interface (CGI) script that politely informs the spender that clicking on this link will take them "out of range" of the surrogate. For example, this might be in httpd.conf as "ErrorDocument 404/cgi-bin/outofrange.pl."

When proxying HTTP cookies 4714 in the surrogate shopping proxy server of an embodiment, the "domain" section of the cookie contains the surrogate proxy server domain appended to the end of the domain specified by the merchant web server, but is not so limited. For example, if the cookie header returned by the merchant web server is of the form "Set-Cookie: foo=bar; path=/; domain=.delias.com expires Mon, 9 Dec. 2002 13:46:00 GMT," the surrogate shopping proxy server modifies the header to the form "Set-Cookie: foo=bar; path=/; domain=.delias.com.proxy.surrogate.com expires Mon, 9 Dec. 2002 13:46:00 GMT." This ensures that the surrogate shopping proxy server retrieves the correct set of cookies from the browser. Also, these cookies can be passed on unmodified to the merchant web server.

An alternate proxy embodiment uses a single proxy server DNS name but, instead, modifies the path of the URL to include the remote server name. For example, a URL such as "http://www.USPTO.gov/dir/file.html" is modified to http://proxy.USPTO.gov/www/amazon.com/dir/file.html. In this case, when the proxy server receives the request, the remote server name can be stripped from the front of the path. A particularly powerful variation of this technique is to reverse the remote hostname and convert the "."'s to "/"'s. Using this technique, the URL "http://www.USPTO.gov/dir/file.html" is written as "http://proxy.USPTO.gov/moc/nozama/www/dir/file.html". Since the remote server name appears as multiple path segments, a hostname termination segment of "^" is also inserted to simplify the process of extracting the hostname. The resulting URL is written as "http://proxy.USPTO.gov/moc/nozama/www/^/dir/file-.html".

This technique provides an effective way to manage cookies that are passed between the browser and the remote server. When cookies are passed from the server to the browser, they contain an optional domain and path specification. The browser uses these values to determine whether or not to send the cookies back to the remote server on subsequent requests. Since the remote servers are proxied by a single domain (i.e. proxy.surrogate.com), the domain information in the cookie cannot be used. However, since the domain information for the remote server is specified as the initial segments of the URL path, the browser can emulates the domain functionality by writing the domain information into the path specifier for the cookie. For example, if the domain specifier for a cookie is ".amazon-.com", the equivalent path specifier would be the reversed version (again, replacing "."'s with "/"'s) which would be "/moc/nozama/". The domain specifier for the cookie can then be removed.

Since the path specifier for the cookie now contains the original domain information, the original path information is prepended to the cookie value and terminated with a "^" seperator. For example, if the cookie value is "data" and the path is "/images", the new cookie value would be "/images^data".

Using this technique, the browser sends cookies that are appropriate for the current remote domain, but this may include cookies that would otherwise not have been sent if the original path did not match the URL path. As cookies are sent from the browser back to the remote server, the proxy removes the original path information from the cookie value and compares that path with the path of the current URL. If the path from the cookie matches the initial path of the current URL, the cookie is forwarded to the remote server, otherwise it is removed from the HTTP header.

In performing this technique, the URLs on a proxied page are modified to include the remote server name. On a given page, every URL can be categorized as either fully qualified (i.e. "http://www.merchant.com.url" or "//www.merchant-.com.url"), absolute (i.e. "/path/file.html"), or relative (i.e. "path/file.html"). For fully qualified URLs, the remote server name is extracted from the URL, reversed (again, replacing "."'s with "/"'s), and prefixed with the server name of the proxy. For example, "http://www.USPTO.gov/dir/com.html" would be converted to "http://proxy.USPTO.gov/moc/nozama/www^dir/file.html". If the URL refers to binary content such as graphical images, the URL is left unmodified so it will bypass the proxy.

If the URL is absolute, the remote server name is assumed to be the remote server the page came from unless the page contains a <base href=""> tag which can specify an alternate default remote server. Once the remote server is established, the absolute URL is converted to a fully qualified URL by prefixing the combination of the proxy server name and the reversed remote server name. For example, "dir/file.html" in a page loaded from "http://www.USPTO.gov/ . . . " would be converted to "http://proxy.USPTO.gov/moc/nozama/www/^dir/fil.html". If the URL refers to binary content such as graphical images, the default remote server name is prefixed unmodified so the request will bypass the proxy.

Rather than modifying relative URLs, a <base href=""> tag is inserted into the top of the page. If there is already a <base href=""> tag, the existing href value is modified as described herein, as it will be fully qualified or absolute. In the absence of an existing <base href=""> tag, the newly inserted tag contains an href value that is computed by converting the fully qualified URL of the current page and removing the final path segment. For example, if the current page was loaded from "http://www.amazon.com/dir/path/file.html", the href value would be "http://proxy.surrogate-.com/moc/nozama/www/^/dir/path".

To find all URLs in a page, the proxy parses out the HTML tokens and finds those elements that can specify a link (i.e. SRC="", HREF="", ACTION=""). For each element in the page, the associated link is transformed as described herein.

In addition to HTML links, it is possible to specify URLs in javascript. For each block of javascript in a page, the constructs that can force a page reload (i.e. ".location.replace(URL)", ".location=URL", ".location.href=URL") are modified such that the URL specification is encapsulated in a function call (i.e. ".location.replace(_rcFunc(URL))", ".loation=_rcFunc(URL)"). Additional javascript is then inserted into the page to implement the _rcFunc( ) function call. Given a fully qualified, absolute, or relative URL, the _rcFunc( ) call implements the transformations described herein.

An additional method of loading a new page is to use an HTTP header such as "Location" or "Content-Location". The URLs specified in these headers are transformed as described herein.

New merchants are received into the surrogate system database by the surrogate shopping servers using an administrator and the Merchant Pay Page Tool. This allows one to go through a merchant site, find the forms that are to be processed, and specify to the servers how the forms are to be filled out.

Figure 48:
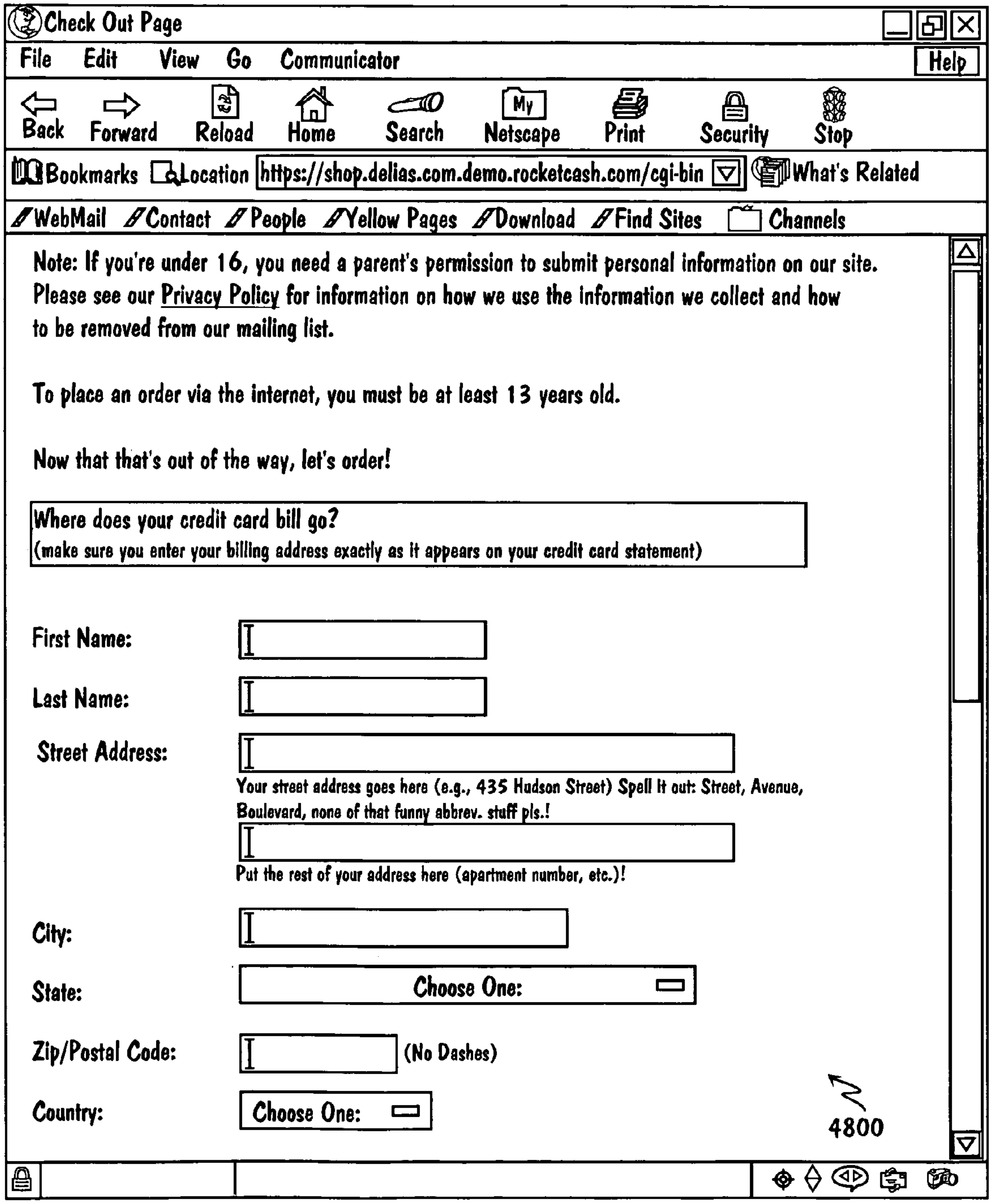
FIG. 48 is a merchant check out page prior to automatic fill by the form fill engine of an embodiment.
Figure 49:
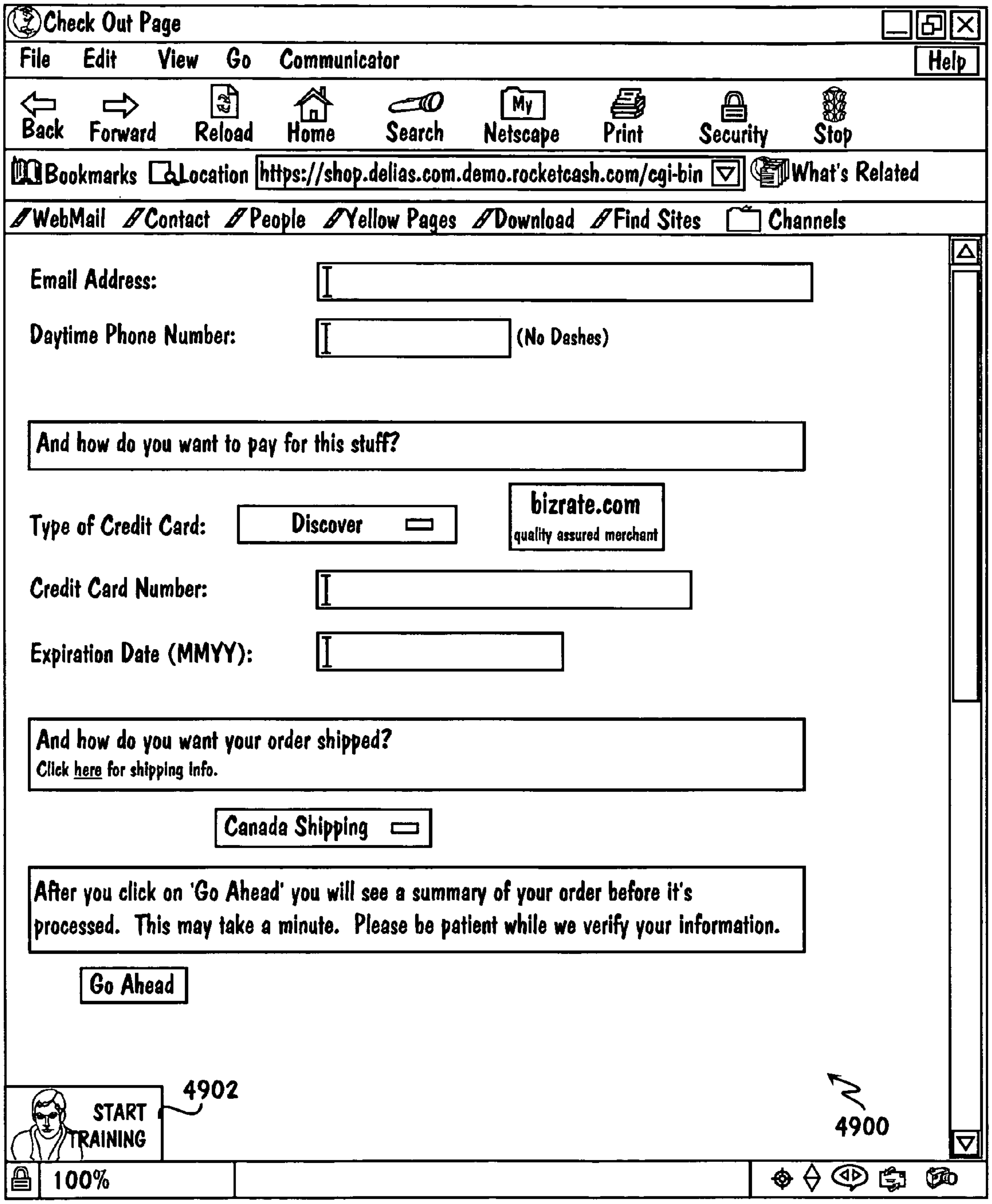
FIG. 49 is a merchant check out page displaying a trainer launch button or icon of an embodiment.
Figure 50:
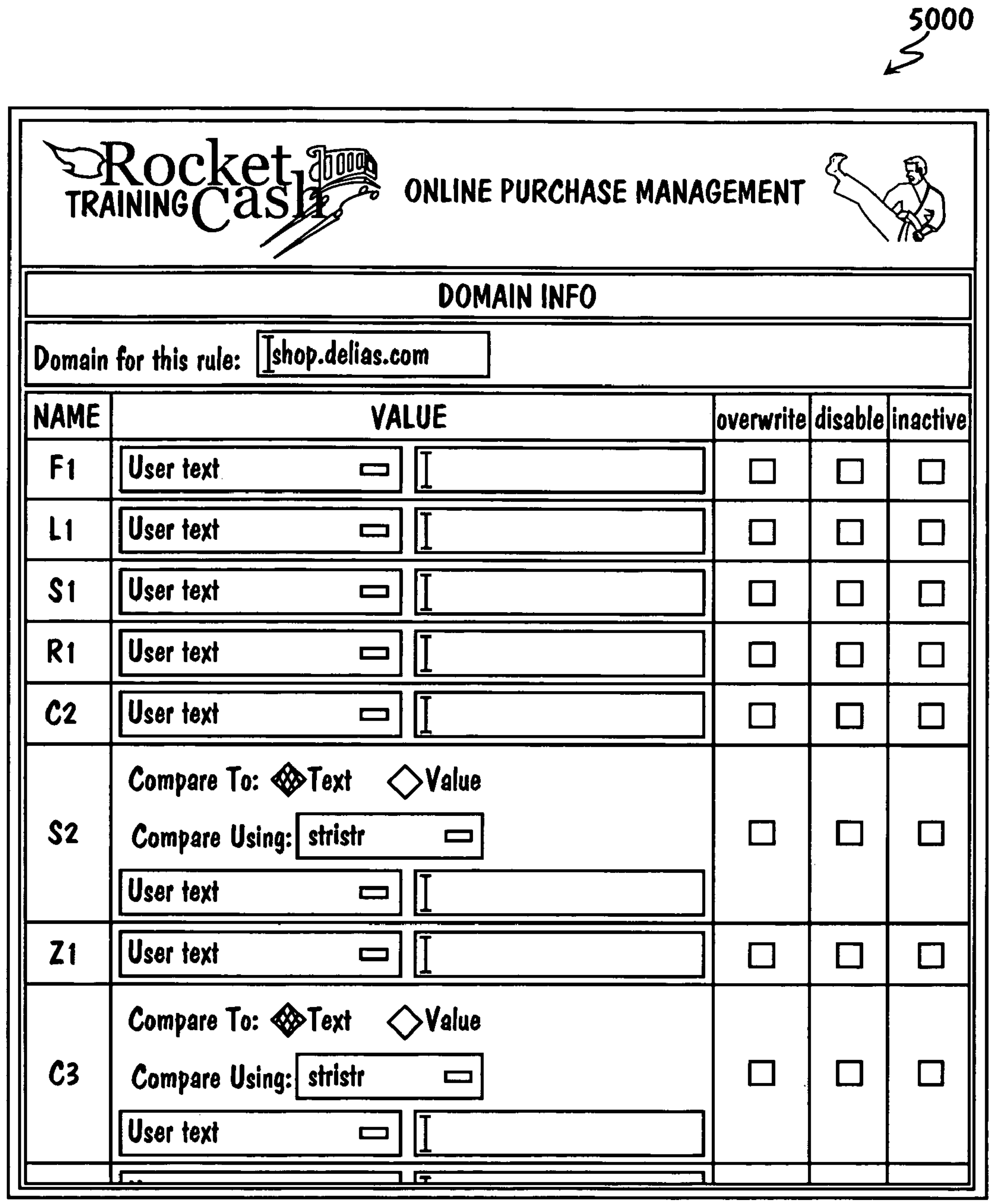
FIG. 50 is a training information page of an embodiment.
Figure 51:
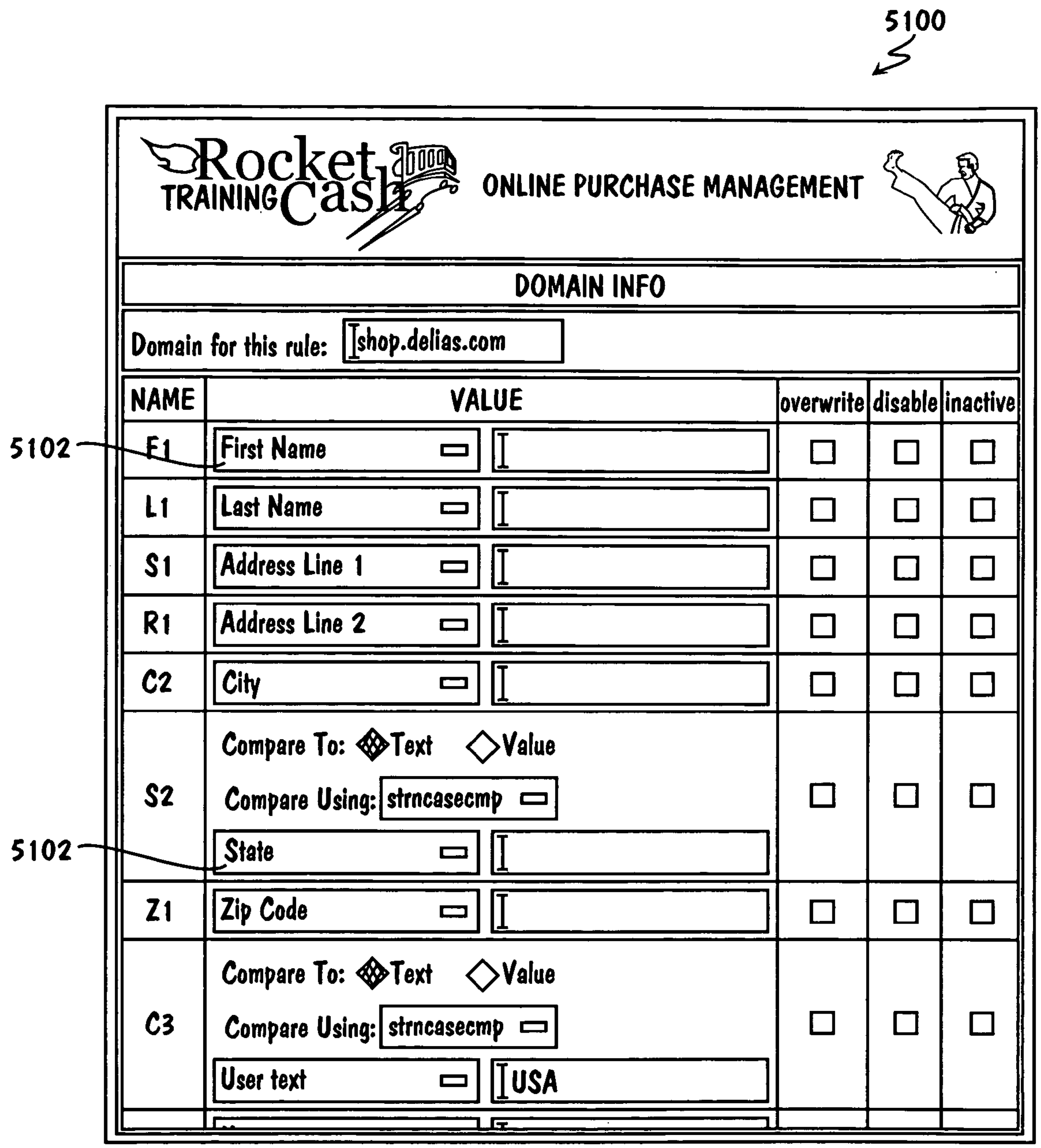
FIG. 51 is training information page of an embodiment including saved form fill settings.
Figure 52:
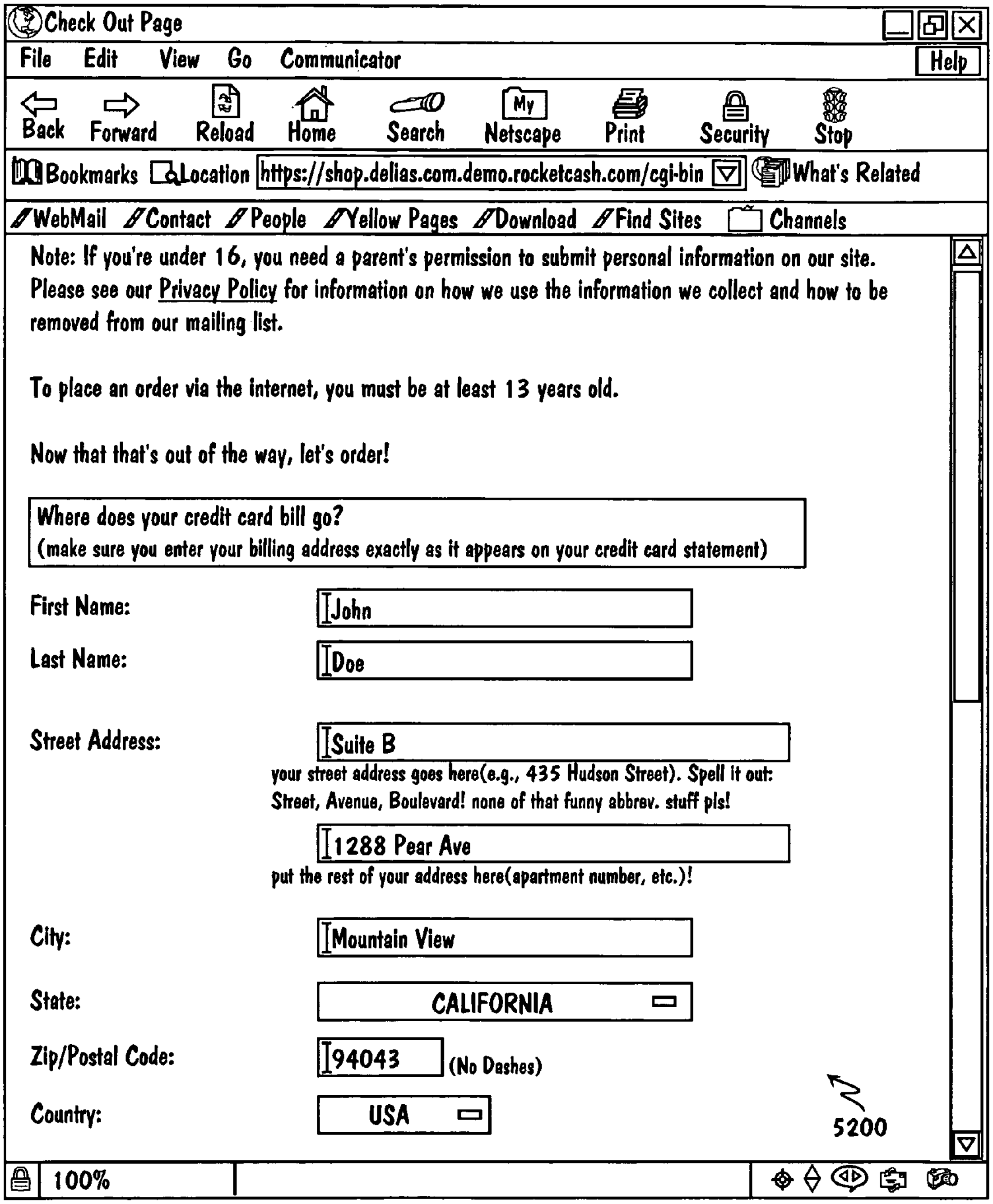
FIG. 52 is a merchant check out page following automatic fill by the form fill engine of an embodiment.
Figure 53:
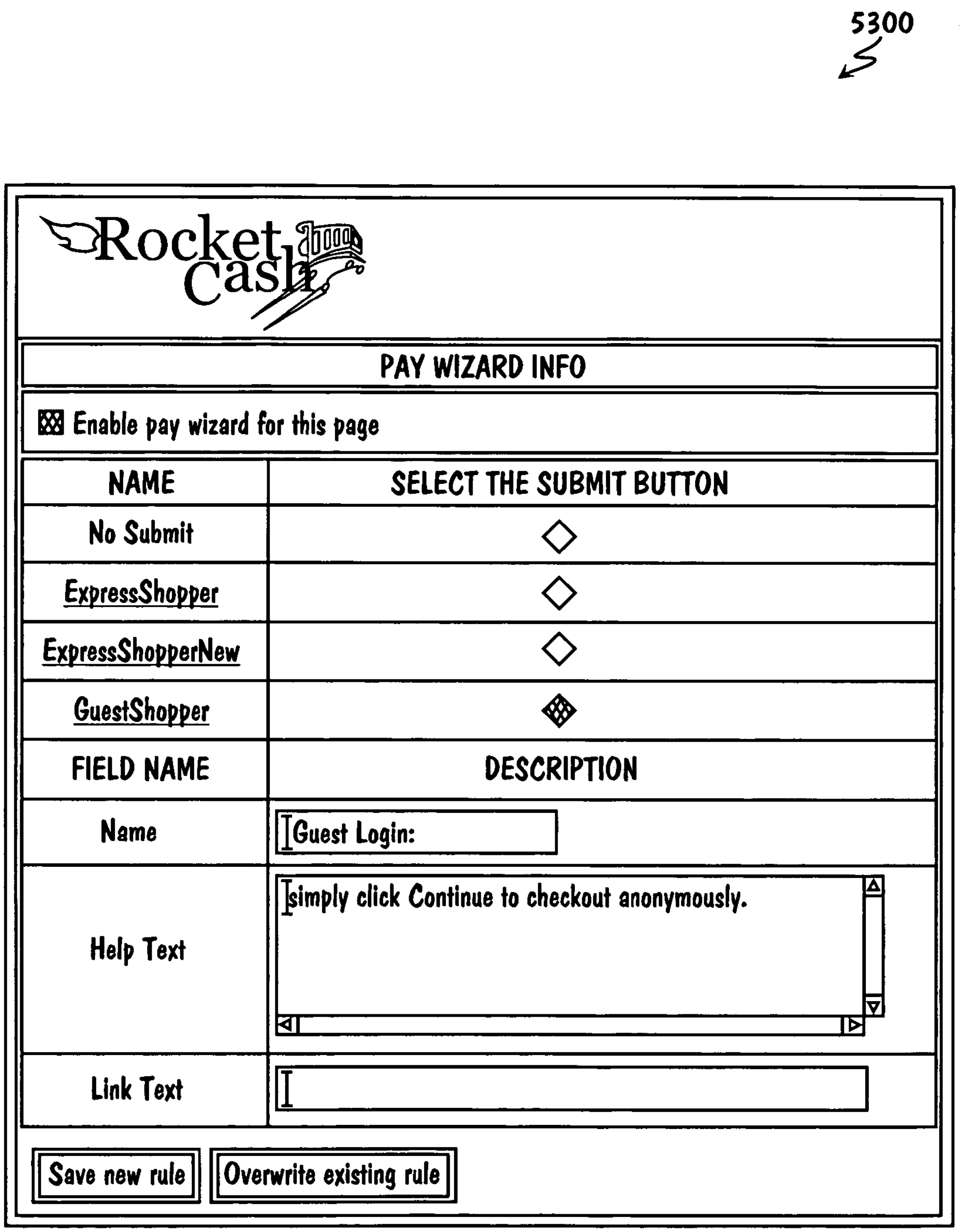
FIG. 53 is a Purchase Wizard, or Pay Wizard, information page or form of an embodiment.
Figure 54:
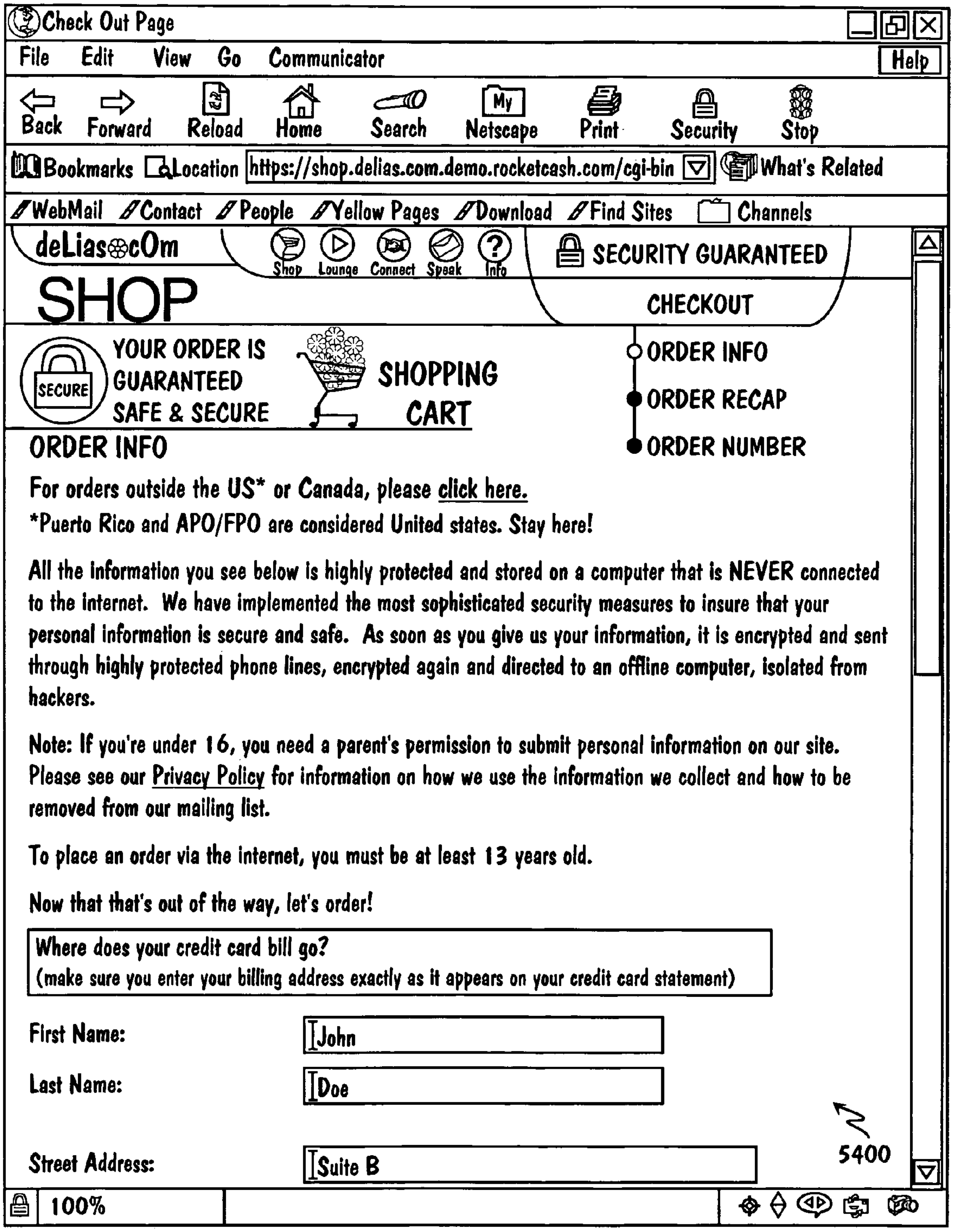
FIG. 54 is a merchant check out page without a Purchase Wizard template of an embodiment.
Figure 55:
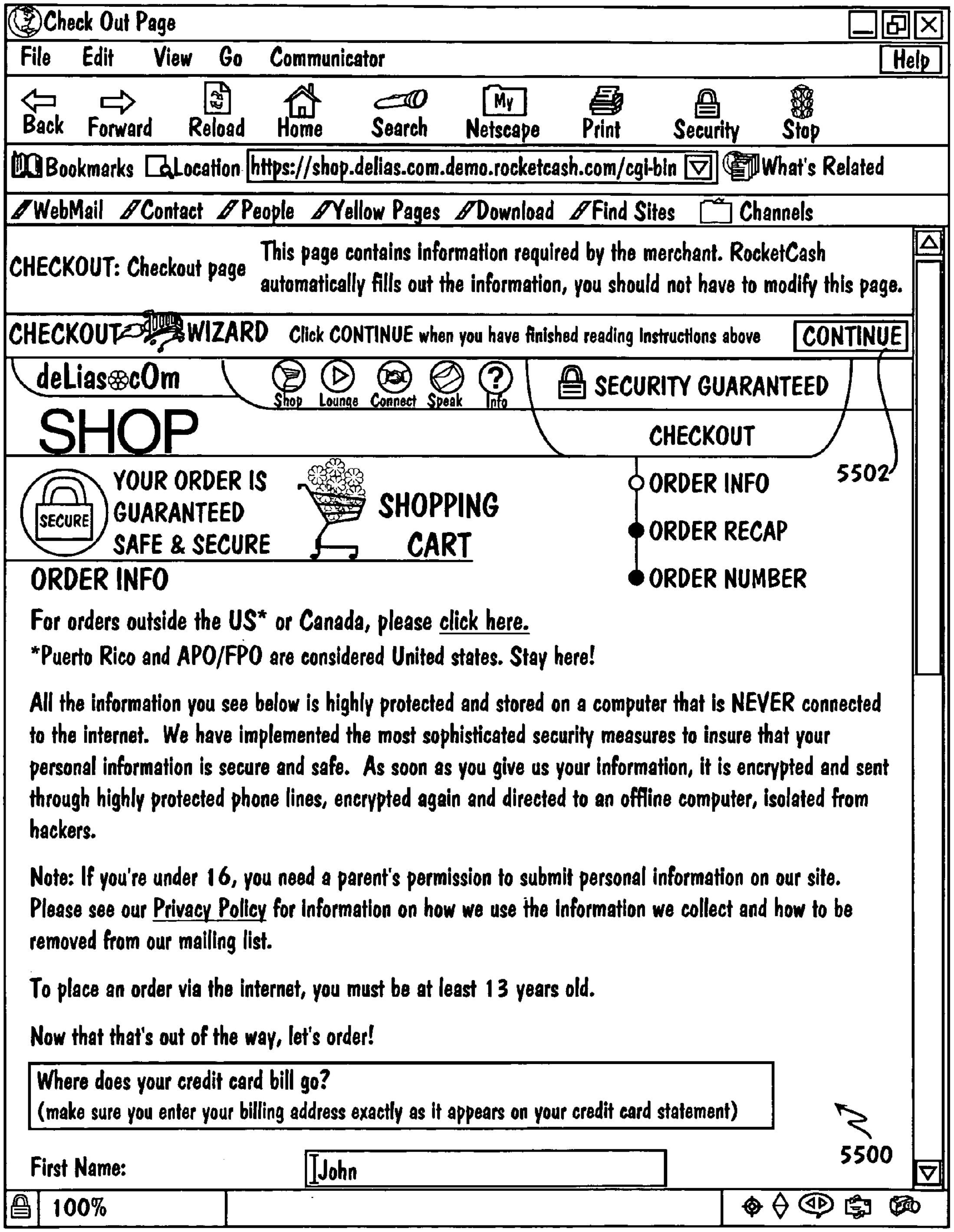
FIG. 55 is a merchant check out page with a Purchase Wizard template of an embodiment.
Figure 56:
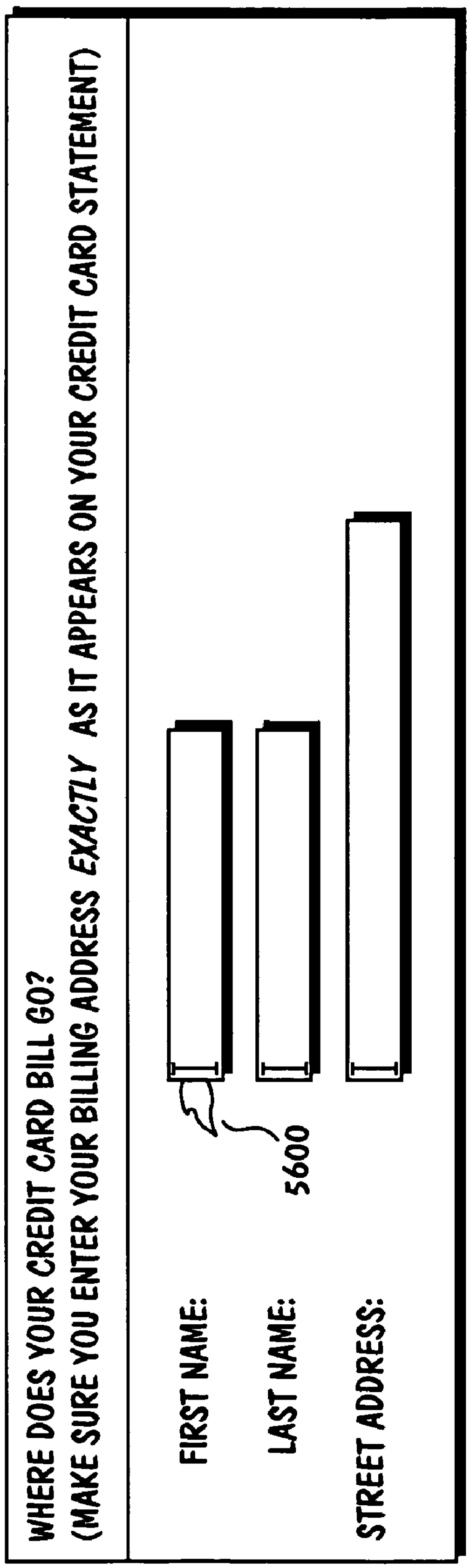
FIG. 56 shows an icon of an embodiment inserted into a merchant check out page.

FIGS. 48–56 illustrate use of a Merchant Pay Page Tool of an embodiment. The Merchant Pay Page Tool provides control over a form fill engine that automatically fills in merchant web site pages, or merchant pages, with user information requested upon check out or completion of a shopping session. FIG. 48 is a merchant check out page 4800 prior to automatic fill by the form fill engine of an embodiment. FIG. 49 is a merchant check out page 4900 displaying a trainer launch button of an embodiment. FIG. 50 is a training information page 5000 of an embodiment. FIG. 51 is training information page 5100 of an embodiment including saved form fill settings. FIG. 52 is a merchant check out page 5200 following automatic fill by the form fill engine of an embodiment. FIG. 53 is a Purchase Wizard information page 5300 or form of an embodiment. FIG. 54 is a merchant check out page 5400 without a Purchase Wizard template of an embodiment. FIG. 55 is a merchant check out page 5500 with a Pay Wizard template of an embodiment. FIG. 56 shows an icon 5600 of an embodiment inserted into the merchant check out page wherein clicking on a field element name in a trainer window highlights the field in the merchant check out page.

Figure 57:
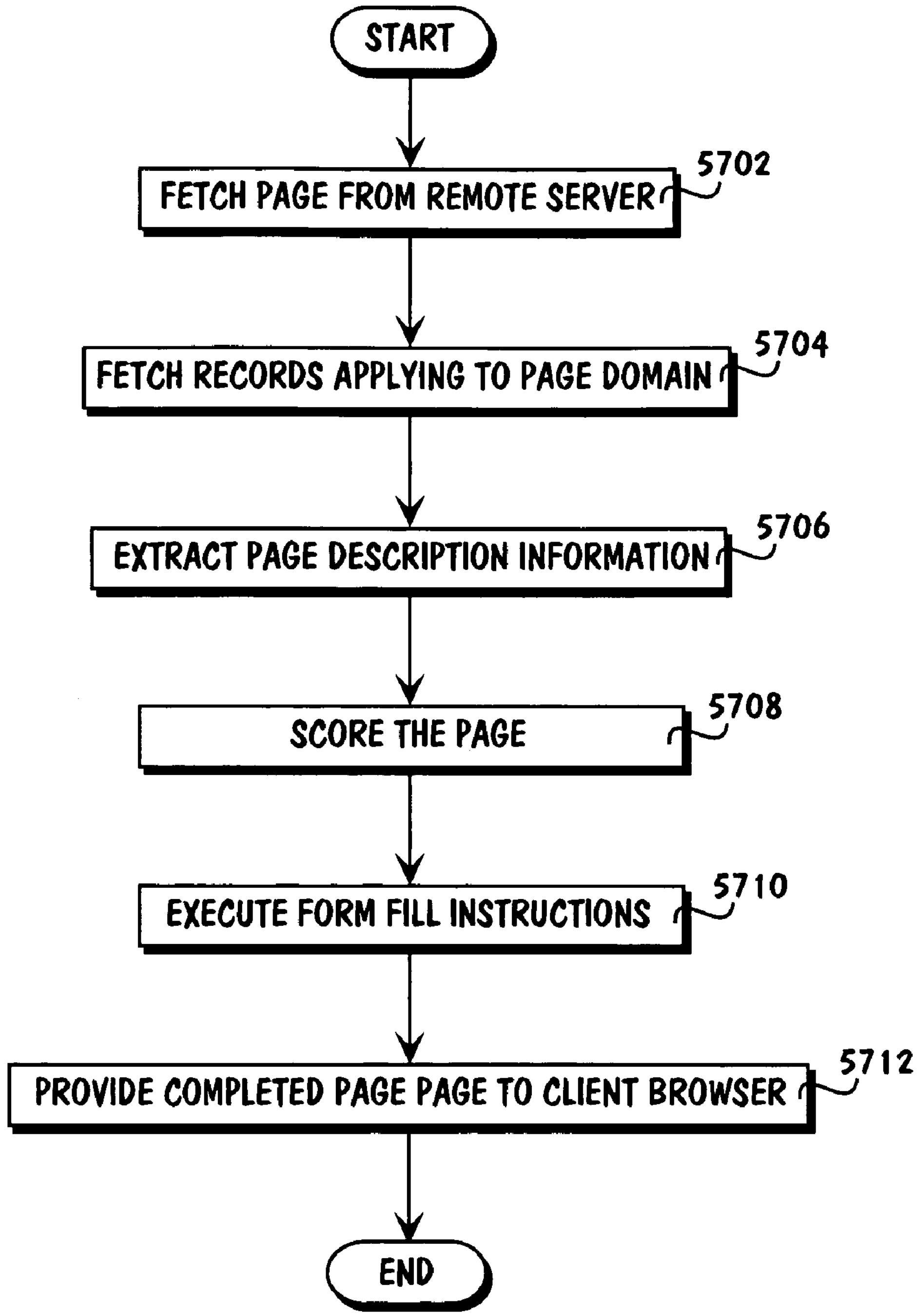
FIG. 57 is a flow chart of an automatic form fill of an embodiment.

The form fill engine automatically fills in merchant web site pages, or merchant pages. FIG. 57 is a flow chart of an automatic form fill of an embodiment. For each merchant page that will be automatically filled in using form fill, there is a record stored in a database that describes how to identify the form and how to fill it out. Included in this record is page signature information such as a list of form element types and names, a URL description, and a domain identifier. In addition, this record also contains a description of how to fill out the forms in the page. These records are cross referenced in the surrogate system database based on the domain to which they apply (for example, ".amazon.com").

When a page is fetched from a remote server 5702 by the proxy, the form fill engine fetches the records applying to the domain from which the remote page came 5704. For each record, the page description information is extracted 5706 to generate a scoring matrix and a list of instructions to implement the described form fill actions. This information is then cached locally in the proxy. Once this information is available, the merchant page is scored 5708 to see if it needs form fill.

In the scoring process, the form element types and names, the URL, and the domain for each record are compared to the merchant page in such a way that each record generates a score between 0–100. If the record with the highest score is over an absolute threshold of 80, for example, then the record is considered to be a match and the form fill process is initiated. Since the scoring process does not require an exact match of all page elements, it is immune from minor changes to the merchant pages.

When a match is found and form fill is to take place, the form fill instructions associated with the record are executed 5710. These instructions find and modify the various form tags within the page using information about the user that generated the request. When complete, the page is returned to the client browser 5712 where it appears pre-filled with the user's own information.

The form fill process performs the following operations depending on the form element type, but is not so limited:

- text/password: insert/overwrite the "value='userValue'" pair in the tag;
- checkbox: insert/remove the "checked" keyword from the tag;
- radio button: insert the "checked" keyword in the selected button and remove the "checked" keyword from all other buttons in the group; and
- selection: insert the "selected" keyword in the selected option tag and remove the "selected" keyword from all other option tags in the group.

During form fill, the user is identified by an encrypted cookie. Using the cookie, the following user information is available from the database to complete the form fill process, but the embodiment is not so limited: full name (e.g., Jon Doe); first name (e.g., Jon); last name (e.g., Doe); login name (system generated); password (system generated); full address (e.g., 123 Main St. Suite B); address line 1 (e.g., 123 Main St.); address line 2 (e.g., Suite B); city (e.g., San Jose); state (e.g., Calif.); state abbreviation (e.g., CA); country (e.g., United States); country abbreviation (e.g., US); zip code (e.g., 94523); full phone (e.g., 650-555-1234); area code (e.g., 650); phone prefix (e.g., 555); phone postfix (e.g., 1234); email (e.g., jdoe@foo.net); credit card number (e.g., 4111111111111111); credit card expiration date (mm/yyyy) (e.g., 05/2001); credit card expiration date (mmyy) (e.g., 0501); credit card expiration date (mm/yy) (e.g., 05/01); credit card expiration date (m) (e.g., 5); credit card expiration date (mm) (e.g., 05); credit card expiration date (yyyy) (e.g., 2001); and, credit card expiration date (yy) (e.g., 01).

Form fill records of an embodiment are stored in Extensible Markup Language (XML) format similar to that shown below, but are not so limited:

<element type='text' name='email' dbTag='dbEmail' userText='' score>;
<element type='text' name='emailVerify' dbTag='dbEmail' userText='' score>;
<element type='text' name='BillingFirstName' dbTag='dbFirstName' userText='' score>;
<element type='select' name='BillingState' dbTag='dbState' userText='' compareTo='text' compareType='4'>; and
<element type='select' name='BillingCountry' dbTag='userText' userText='united states' compareTo='text' compareType='4'>.

Each element tag in the record identifies a particular page tag for form filling. For each form element the record can include the following information: the name/type of the element for scoring purposes; a keyword to indicate whether or not this element should be used for scoring; and, a database tag name indicating the value to form fill or a user specified value to use instead.

FIG. 48 is a merchant check out page 4800 prior to automatic fill by the form fill engine of an embodiment. FIG. 52 is a merchant check out page 5200 following automatic fill by the form fill engine of an embodiment.

In addition to numerous form elements needing data entry, the checkout process is complicated by the fact that each merchant has a unique look and feel, and sequence of steps to complete the checkout process. Indeed, even within a single merchant site, there can be multiple checkout paths. For example, a user returning to a site might follow a different path than a new user. To simplify the checkout process across all merchants, a Purchase Wizard of an embodiment is inserted at a consistent location in each checkout page. This Purchase Wizard provides the user with specific instructions about how to complete the current page. Given that the form elements will be pre-filled by the surrogate system, these instructions normally call out optional items on the page such as gift wrapping options.

In addition to user specific instructions, the Purchase Wizard provides a "continue" button or icon that, when selected, advances the checkout process along the correct path for that particular user. For example, a merchant page may have two links to advance the checkout process depending on whether or not the user is an international user. In this case, the continue button in the wizard would advance the process along the correct path for the user without the user having to read the entire page and decide on the correct path manually. Because the Purchase Wizard has a consistent look and feel, and functionality across all merchants, a user can checkout on any site by simply following the instructions in the wizard and clicking on the Purchase Wizard continue button.

The surrogate system accommodates both a change in page layout over time and a change in page layout based on previous visits to the web site by the user in connecting the Purchase Wizard continue button to the correct link on the merchant page. Furthermore, multiple ways to link to the next page are accommodated, for example: simple URL (e.g., <a href= . . . >); form post using submit (e.g., <input type=submit . . . >); and, form post using image (e.g., <input type=image . . . >).

Typically, information to be sent back to the merchant is contained in a form that the user must complete. This being the case, the form contains some means for submitting the form, either in the form of a submit button or icon, or an image. Either way, the cases where the page layout changes over time or based on previous visits to the site by the user are handled by scoring the individual forms in a page similar to the way pages in the checkout process are scored for form fill. In this way, even if the layout of the page changes, the continue button can be attached to the correct form regardless of where it is located in the page.

In the case where the link to the next page is with <a href= . . . > URL, the continue button simply contains the same href as the desired link in the page. At the time the Purchase Wizard is inserted into the page, the desired href is located and copied into the Purchase Wizard continue button.

In the cases where the link to the next page is a form post using a submit icon, and an image submit, the Purchase Wizard continue button uses javascript to submit the correct form. However, there can be additional complications due to the fact that there may be multiple submits in the same form. In this case, additional hidden tags will be inserted into the form so that the proxy can fix the post such that it appears to have come from the correct submit even if the Purchase Wizard continue button was used.

Similarly, in the case of an image submit, the resulting post back to the merchant should contain a name.x and name.y component that would normally be missing if a javascript submit was used alone. Again, hidden tags are inserted into the form so that the proxy can fix the post to look like the image was actually clicked before passing it along to the merchant server.

The Purchase Wizard is inserted after the <body> tag in the merchant page as it passes through the proxy. FIG. 53 is a Pay Wizard or Purchase Wizard information page 5300 or form of an embodiment. FIG. 54 is a merchant check out page 5400 without a Purchase Wizard template of an embodiment. FIG. 55 is a merchant check out page 5500 with a Purchase Wizard template 5502 of an embodiment.

Figure 58:
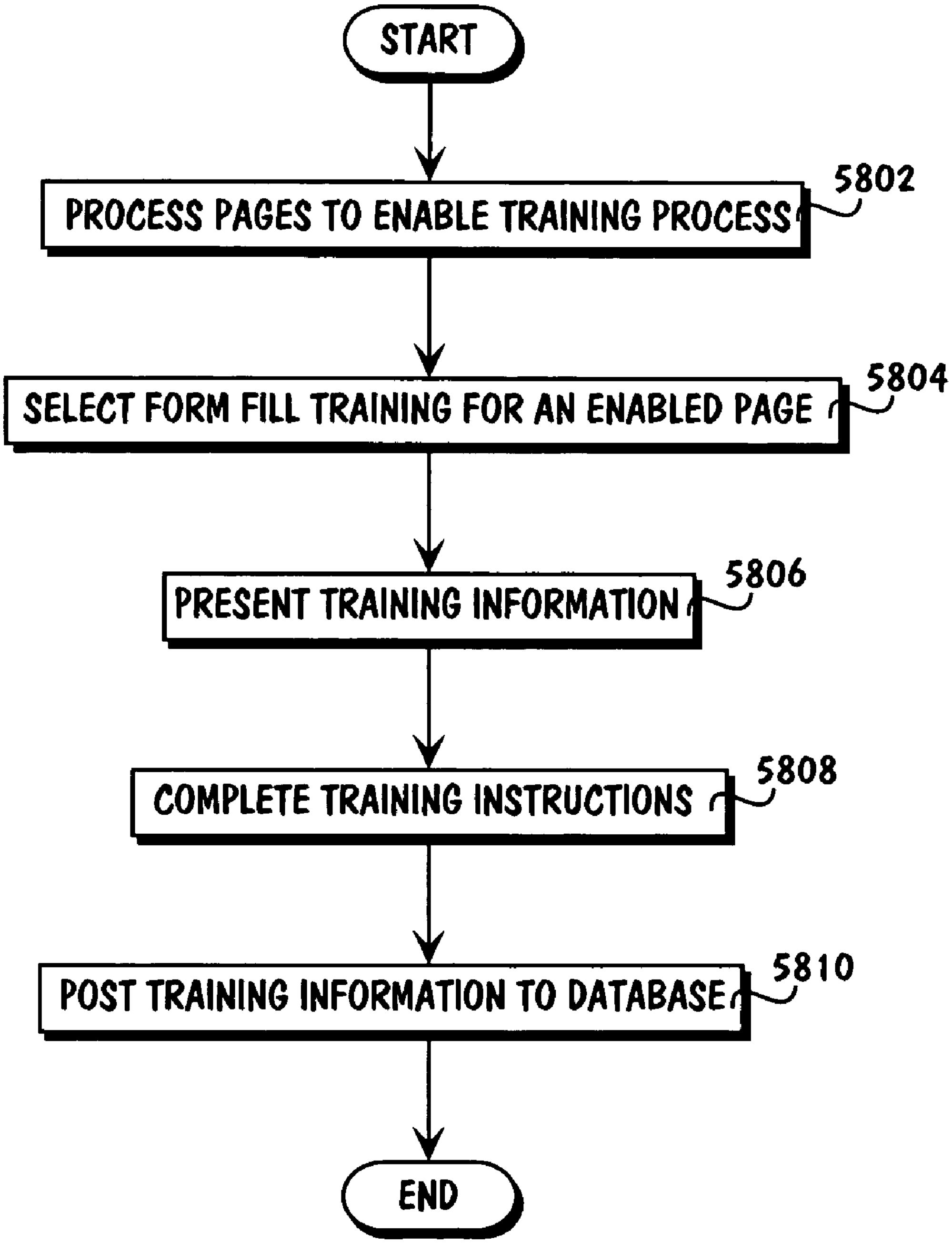
FIG. 58 is a flow chart for a form fill training process of an embodiment.

A trainer facilitates the process of generating form fill and wizard database records for merchant checkout pages. FIG. 49 is a merchant check out page 4900 displaying a trainer launch button 4902 of an embodiment. FIG. 50 is a training information page 5000 of an embodiment. FIG. 58 is a flow chart for a form fill training process of an embodiment. When enabled, the proxy performs the following actions 5802 on the pages that pass through it: insert a uniquely named anchor in front of each form element; insert a uniquely named transparent image in front of each form element; insert javascript at the bottom of the page to create a popup window; and, insert a "start training" button or icon at the bottom of the page that will invoke the popup window. Furthermore, the trainer generates the following HTML code for the popup window: for each form element that may need form fill, insert a row of controls in the form fill portion of the trainer; and, for every submit button, insert a row of controls in the wizard portion of the trainer.

When the "start training" icon 4902 or button is selected 5804 in the browser page 4900, a popup window 5000 containing all the training information for this page is presented 5806. If this page was previously trained, the previously saved settings 5102 are reflected in the training window 5100. The user can then use the controls in the training window to indicate to the proxy which portions of the page should be form filled, whether or not there should be a Purchase Wizard 5300 for this page, and to what the Purchase Wizard continue button should be attached 5808. To aid in the training process, icons 5602 are inserted into the original merchant document so that clicking on a field element name in the trainer window will highlight the field in the original document 5600.

When complete, a save button or icon in the trainer window is used to post the information back to the proxy 5810 which then converts the arguments to a database record. This record is stored in the database and all proxies are sent a cache flush message so that the next request for a page from the merchant will reflect the new record regardless of which proxy server actually services the request. FIG. 51 is training information page 5100 of an embodiment including saved form fill settings.

In executing a purchase transaction, the surrogate shopping servers communicate with the merchant shopping site, but are not so limited. When payment is required, the surrogate shopping server sends information associated with the credit card assigned to the current shopper to the merchant site. The merchant is then able to use that credit card for payment for any product purchased by the user using the network associated with the credit card, for example the Visa, Mastercard, American Express, and Discover card network. That request eventually gets back to the surrogate bank which will allow or decline the purchase through the surrogate system depending on the available balance and credit limit on that credit card.

Figure 59:
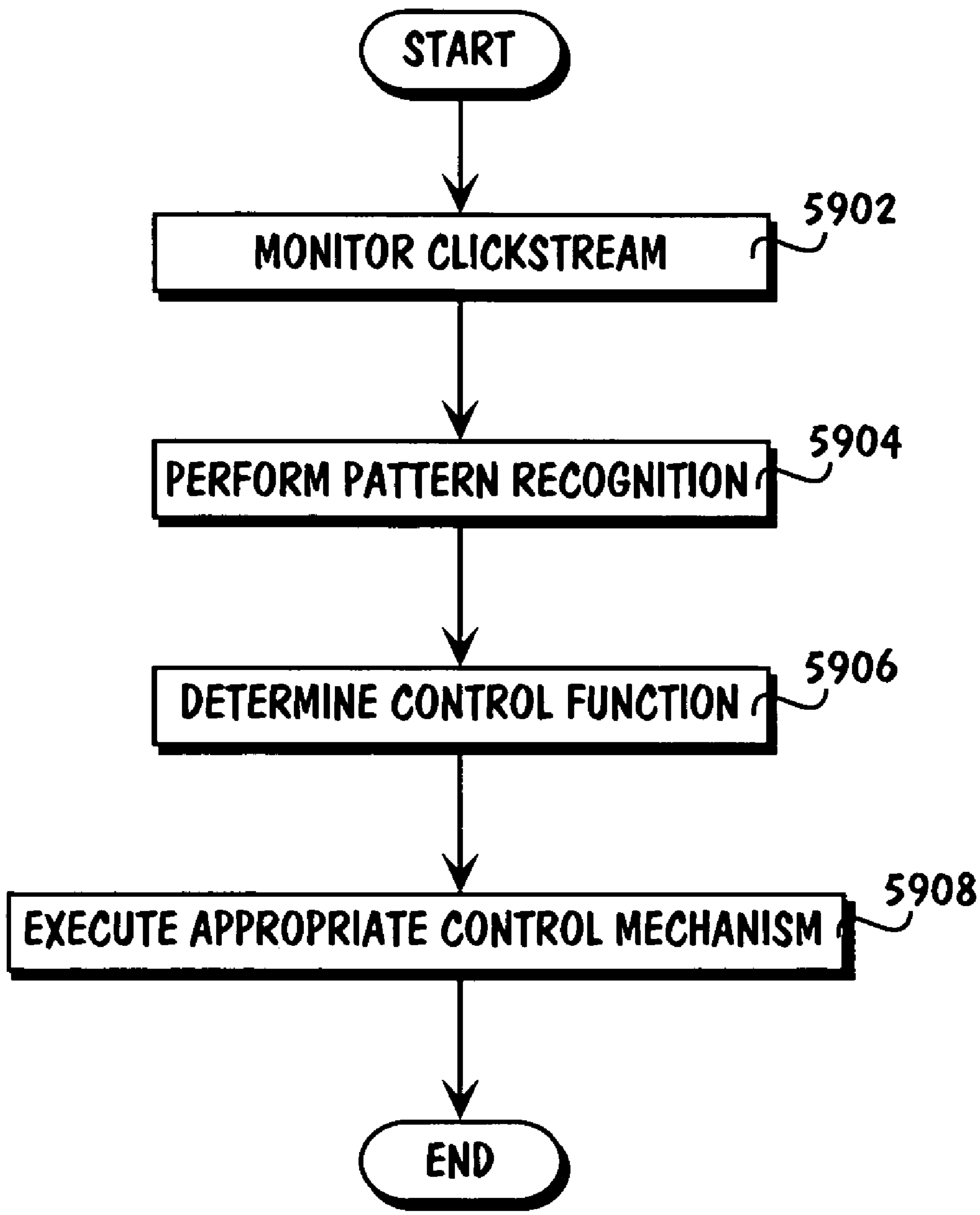
FIG. 59 is a flow chart for a data stream monitoring process of an embodiment.

FIG. 59 is a flow chart for a data stream monitoring process of an embodiment. During the hosted shopping sessions the surrogate system provides real-time levels of control over the information available to a user by monitoring the data stream 5902 of transactions effected through the surrogate system and performing pattern recognition on data streams transmitted 5904 from the online merchant web site. The data stream monitoring and pattern recognition provides the surrogate system with information including the online merchant web sites visited by a user, the type of merchandise for which the user is shopping, and the type of items purchased by a user. As such, the surrogate system can control the provision of information 5906 to users and the purchases of a user. The control includes, but is not limited to, information or page insertion, information or page substitution, and information or page blocking 5908.

In controlling the provision of information, the surrogate system can insert pages or information into the information presented to the viewer by the online merchant web site in response to information obtained from the user. The inserted information includes, but is not limited to, advertisements for items that are equivalent or similar to items for which the user is shopping or has selected for purchase, special offers, and savings coupons for items that are equivalent or similar to items for which the user is shopping or has selected for purchase.

Likewise, the surrogate system can prevent or disable the viewing of information that otherwise might be presented to a user, thereby effecting a level of security. For example, a user identified as a minor child might be prevented from viewing information related to items that the user is not allowed to purchase, for example pornographic materials found on a merchant web site. The surrogate system pattern recognition feature recognizes that material transmitted from the merchant might be pornographic and, in response, blocks viewing of the material while disabling the purchase mechanism associated with this material.

Furthermore, the surrogate system of an embodiment provides real-time control over the types of merchandise that can be purchased through the surrogate system using Merchant Category Codes. This control is effected by allowing shopping at online merchants according to the Merchant Category Codes associated with particular merchants. In an alternate embodiment, this control can be effected by preventing shopping at online merchants according to the associated Merchant Category Codes.

Figure 60:
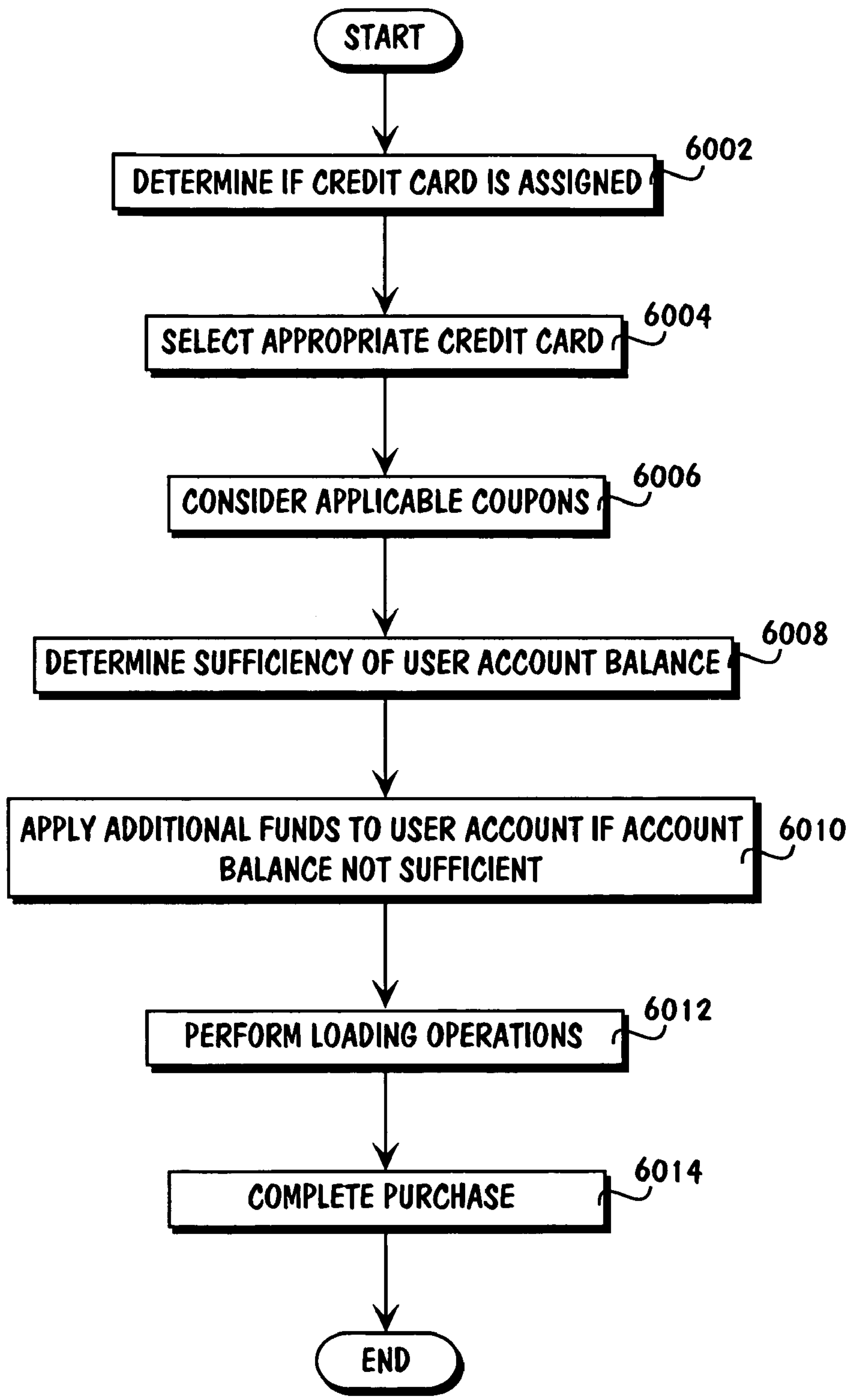
FIG. 60 is a flow chart of a payment transaction of an embodiment.

A payment transaction is effected at such time as the user has completed a shopping session via the surrogate system at an online merchant shopping site and is ready to check out and pay for the selected merchandise. FIG. 60 is a flow chart of a payment transaction of an embodiment. The surrogate system of an embodiment retrieves a credit card number from a pool of credit card numbers maintained by the surrogate system. The pool of credit cards can include Visa, Mastercard, Discover, and American Express credit cards, but is not so limited. The retrieved credit card number is associated with a credit card having available credit equal to or greater than the current purchase amount. The selected credit card number, for purposes of the current transaction, is linked to the user with information including the user's name and transaction information including the transaction date, amount, merchant, and merchandise.

The surrogate system of an alternate embodiment assigns a unique credit card number to a user at the time the associated surrogate system account is opened or activated. While the assigned credit card is maintained in the surrogate system credit card pool, it is assigned for the exclusive use of the particular user for such time as the user has an active surrogate system account. A payment transaction is completed using the assigned credit card number.

In effecting the purchase transaction, the surrogate system determines whether a surrogate credit card is assigned to the user 6002. If no credit card has been assigned, a credit card number is retrieved from the pool of credit cards and assigned to the user 6004. The surrogate system next determines whether the credit card assigned is new, or whether the user's shipping address has changed. If it is determined that updated information is needed, the surrogate system prompts the user for updated information. The user is also prompted for any coupons that are to be applied to the purchase. The coupon values or amounts, upon validation, are subtracted from the total amount of the purchase to arrive at the amount due from the user's account 6006.

A determination is made whether the user's account balance is greater than the amount due 6008. If the user's account balance is less than the amount due, a prompt is issued to the user as to whether the user wants to fund the difference with another funding source, for example a personal credit card. Additional funding sources used can also include online currency in currency conversion partner accounts and incentive codes. If the user does not wish to fund the difference with a personal credit card, the purchase transaction is terminated.

If the user does wish to fund the difference with a personal credit card 6010, then the user is prompted for the personal credit card information including the type of card, name on the card, billing address, card number, and card expiration date. The corresponding credit card network is queried to receive validation of the card. Upon validation of the user's personal credit card, the purchase transaction is continued.

The purchase transaction continues with the user reaching the final step of the purchase transaction wherein the user is queried to confirm the purchase. Upon confirmation, when the user's personal credit card is used to fund the balance between the amount due and the amount present in the user's surrogate account, the appropriate credit card network is accessed and the user's personal credit card is charged for the balance. The finds charged against the user's personal credit card are credited to the user's account balance, thereby making the amount present in the user's surrogate account equal to the amount due.

The transaction continues with a determination whether there are any pending operations that require loading/unloading of money to/from the surrogate credit card assigned to the user 6012. This step is used because, as a user deposits money into their surrogate account, or earns money, or redeems other forms of currency, the money is not loaded onto the surrogate card. Instead, the money is marked as pending. In this manner, other monies are accommodated that may be applied against a purchase, for example, coupons and monies from a user's own credit card. When any pending operations are determined to be complete, the surrogate bank is directed to perform a loading operation in which the amount due is loaded from the user's surrogate account to their surrogate credit card. A final purchase request is transferred to the online merchant shopping site, and the user's surrogate account balance is adjusted accordingly 6014.

Offline shopping is supported by the surrogate system of an embodiment. In supporting offline shopping a user, upon acceptance of applicable restrictions and permissions, may select an option upon opening an account in the surrogate system resulting in the issuance of a physical debit card. The debit card can be issued by a credit card issuer or bank and is of a type including Visa, Mastercard, American Express, and Discover, but is not so limited. The debit card is linked to the user's surrogate account, and has an available spending limit equal to the amount of credit in the user's surrogate system account. The surrogate system periodically updates the debit card issuing authority as to the available spending limit associated with each debit card for which the surrogate system has a corresponding account. The offline merchants enabled to accept the card are controlled by the issuing authority using Merchant Category Codes. In this manner, the types of merchandise that can be purchased with the debit card are limited.

In performing surrogate credit card reconciliation subsequent to completed purchase transactions, the surrogate system of an embodiment maintains two ledgers, a surrogate system ledger, and a credit card statement ledger. The surrogate system ledger is available for viewing by the user while the credit card ledger is not available for viewing, but the system is not so limited. The surrogate system ledger captures the user's surrogate account balance and all shopping activity based on the merchant web pages. The credit card statement ledger is periodically returned by the surrogate bank, for example each night, and contains all activity resulting in a surrogate account balance change including purchasing and card loading activities. The surrogate system receives the credit card statement ledger from the bank and uses it to adjust the surrogate system ledger to reflect surrogate system account activities.

In performing the reconciliation, the credit card statement ledger provides merchant charges against the surrogate credit cards. These entries are matched up with corresponding entries in the surrogate system ledger and any difference in amounts between the credit card statement ledger and the surrogate system ledger are adjusted using an adjustment record to the surrogate system ledger. The entries are matched using the merchant name and a match of the purchase prices within a programmable percentage amount.

Other reconciliation situations involve returned items and orders that do not ship. If a user returns an item, the merchant credits an amount back to the corresponding surrogate credit card. That credit amount will display in the credit card ledger, and that credit will be applied to the surrogate system ledger when detected.

If an order does not ship, or is cancelled, the surrogate system ledger will have one or more entries that are not reconciled for a specified timeout period, for example, 60 days. If no reconciliation occurs, then a credit can immediately be given to the user, or a report sent to the surrogate financial administrator to allow further research into the specific purchase status, but the embodiment is not so limited. The surrogate financial administrators have access to both types of ledgers in order to take manual action as required. Reports may be generated at any time displaying any discrepancies.

The surrogate system maintains strict control of emails sent from the merchant shopping site to the user in order to filter out spam, or unsolicited, transmissions, protect credit card numbers or other surrogate system information, or to use the email for its own internal processing. In performing this function, users of the surrogate system are prompted to input their email address during sign up or administration. However, instead of using the user's actual email address, the surrogate system provides a unique surrogate email address for each user when an email address is requested by an online merchant. The surrogate email address is not known by the user to which it is assigned.

When email is received at this unique email address, the surrogate email proxy looks up or determines the user's actual email address from the database, performs any operations based on the email content, and forwards it onto the customer if so requested. Therefore, when a merchant shopping site uses an email to communicate with the user, the proxied email addresses are used instead.

The purpose of this surrogate email address is to ensure that all email from the online merchant to the user is sent initially to the surrogate email proxy. The surrogate email proxy processes the email before sending it to the user, processing that includes filtering and categorizing of the email. Therefore, the user continues to receive the emails they expect from the online merchant, for example order confirmation and status emails, unless the surrogate email proxy chooses to not forward a specific email based on the configuration.

Upon specifying an email address to the surrogate system management during sign up or administration, the surrogate system assigns a unique secret email address for the new user. The user's email address goes to the special surrogate email server along with the corresponding secret email address, for example: user@aol.com==>ss_random123@surrogate.com. When the user shops at merchant shopping sites via the surrogate shopping servers and an email address is requested by the merchant site, the surrogate email address is provided rather than the real email address.

When a merchant sends email to the user it is sent to the special surrogate email address. The surrogate email proxy determines the user's actual email address from the surrogate database and replaces all instances of the special surrogate email address with the actual email address. Furthermore, the surrogate email proxy removes all credit card numbers and other internal surrogate system data from the merchant email transmission.

The surrogate email proxy also applies any corresponding merchant-specific filters to the email message, depending on where the email message originated. Using classifications based on the content in the email header and body, the surrogate email proxy evaluates the email and classifies it into one of the following categories: SPAM, if the user configures their account to not receive spam, this email is eliminated; STATUS, forward to the actual email address, keeping a copy within the surrogate system for administrative purposes; NORMAL, forward to the actual email address; UNKNOWN, do not forward the email, and send it to a special surrogate account where it is reviewed before classifying it as either SPAM, STATUS, or NORMAL. As such, the surrogate email proxy determines whether to provide email from the online merchant to the user.

The foregoing description of various embodiments of the claimed invention is presented for purposes of illustration and description. It is not intended to limit the claimed invention to the precise forms disclosed. Many modifications and equivalent arrangements may be apparent.

What is claimed is:

1. A method for surrogate control of electronic commerce transactions, comprising:

- funding at least one surrogate account in a surrogate electronic system;
- accessing at least one electronic commerce system through the surrogate electronic system;
- selecting at least one item for purchase from the at least one electronic commerce system;
- selecting at least one credit card account in the surrogate electronic system;
- determining an amount due to complete at least one purchase transaction on the at least one electronic commerce system;

transferring funds equal to the amount due from the at least one surrogate account to the at least one credit card account;

executing the at least one purchase transaction using the at least one credit card account;

reconciling transactions for the at least one credit card account, wherein reconciling includes:

maintaining a surrogate system ledger including at least one balance for the at least one surrogate account and at least one corresponding purchase transaction record;

periodically receiving a credit account statement ledger including purchase transactions resulting in a chance in the at least one balance; and using the credit account statement ledger to adjust the surrogate system ledger.

2. The method of claim 1, further comprising performing fraud detection on at least one fund source.

3. The method of claim 1, wherein funding comprises placing funds in the at least one surrogate account from at least one fund source, wherein the at least one fund source includes at least one fund source selected from a group consisting of credit cards, checks, money orders, gift certificates, incentives, online electronic currency, Automatic Teller Machines, and stored value cards.

4. The method of claim 3, wherein funding using online electronic currency comprises:

determining a plurality of online electronic currency balances in a plurality of accounts;

aggregating an amount of online electronic currency from the plurality of accounts.

5. The method of claim 3, wherein incentives comprise incentive codes resulting from the purchase of a product.

6. The method of claim 1, wherein accessing is transparent.

7. The method of claim 1, further comprising:

compiling records of purchase transactions completed through the surrogate electronic system;

presenting at least one list of merchants rank ordered according to the compiled records.

8. The method of claim 1, further comprising controlling information provided through the surrogate electronic system from the at least one electronic commerce system.

9. The method of claim 8, wherein the controlling comprises:

monitoring data streams;

performing pattern recognition on data streams transferred from the at least one electronic commerce system;

determining content of the data streams;

controlling information provided from the at least one electronic commerce system in response to the content.

10. The method of claim 9, wherein controlling includes at least one operation selected from a group consisting of inserting additional information into the data stream, substituting information in the data stream, filtering information in the data stream, and removing information from the data stream.

11. The method of claim 8, wherein the controlling comprises:

assigning a surrogate electronic mail address to a user that is mapped to an actual electronic mail address of the user;

providing the surrogate electronic mail address to the at least one electronic commerce system in response to requests for the actual electronic mail address;

filtering and categorizing electronic mail received from the at least one electronic commerce system, wherein sensitive information of the surrogate electronic system is removed; and forwarding the filtered electronic mail to the actual electronic mail address of the user.

12. The method of claim 1, wherein determining an amount due to complete at least one purchase transaction comprises:

determining a total amount due to complete the at least one purchase transaction;

determining a value of applicable credits selected from a group consisting of coupons, merchant incentives, and surrogate system incentives; and subtracting the value of applicable credits from the total amount due to get the amount due.

13. The method of claim 1, wherein selecting at least one credit card account includes determining if the available credit of the at least one credit card account is sufficient to cover a purchase amount of the at least one purchase transaction.

14. The method of claim 1, wherein transferring funds comprises:

determining if a balance of the at least one surrogate account is enough to cover the amount due; and increasing the balance of the at least one surrogate account if the balance is not enough, the increasing including receiving and aggregating funds from a plurality of fund sources.

15. A system for surrogate control of electronic commerce transactions, comprising:

a surrogate web site coupled among at least one client computer, at least one financial system, and at least one database including at least one user account, wherein the at least one user account is funded by a user with at least one user funding source; and at least one proxy server coupled among the at least one database, the at least one client computer, and at least one electronic merchant system, wherein at least one purchase transaction is supported on at least one client browser and the at least one electronic merchant system through the at least one proxy server, wherein payment for the at least one purchase transaction is funded using a surrogate funding source loaded with funds from the at least one user account, the surrogate funding source comprising a credit card account, wherein the at least one proxy server reconciles transactions for the at least one user account, wherein reconciling includes:

maintaining a surrogate system ledger including at least one balance for the at least one user account and at least one corresponding purchase transaction record;

periodically receiving a credit account statement ledger including purchase transactions resulting in a change in the at least one balance; and using the credit account statement ledger to adjust the surrogate system ledger.

16. The system of claim 15, further comprising at least one fraud detection device for performing fraud detection scoring on the at least one user funding source and information associated with the user.

17. The system of claim 15, wherein the at least one user account is funded by placing funds in the at least one user account from the at least one user funding source, wherein the at least one user funding source includes at least one funding source selected from a group consisting of credit cards, checks, money orders, gift certificates, incentives, online electronic currency, Automatic Teller Machines, and stored value cards.

18. The system of claim 17, wherein funding using online electronic currency comprises:

determining a plurality of online electronic currency balances in a plurality of accounts at a plurality of locations on at least one network;

aggregating an amount of online electronic currency from the plurality of accounts.

19. The system of claim 17, wherein incentives comprise incentive codes resulting from the purchase of a product.

20. The system of claim 15, wherein the at least one proxy server:

compiles records of purchase transactions completed through the system;

presents to the user at least one list of electronic merchant systems rank ordered according to the compiled records.

21. The system of claim 15, wherein the at least one proxy server controls information provided through the surrogate web site from the at least one electronic merchant system, wherein the at least one proxy server includes at least one shopping proxy server and at least one email proxy server.

22. The system of claim 21, wherein the controlling comprises:

monitoring data streams;

performing pattern recognition on data streams transferred from the at least one electronic merchant system;

determining content of the data streams;

controlling information provided to the at least one client browser from the at least one electronic merchant system in response to the content.

23. The system of claim 22, wherein controlling includes at least one operation selected from a group consisting of inserting additional information into the data stream, substituting information in the data stream, filtering information in the data stream, and removing information from the data stream.

24. The system of claim 21, wherein the controlling comprises:

assigning a surrogate electronic mail address to the user that is mapped to an actual electronic mail address of the user;

providing the surrogate electronic mail address to the at least one electronic merchant system in response to requests for the actual electronic mail address;

filtering and categorizing electronic mail received from the at least one electronic merchant system, wherein sensitive information of the system for surrogate control is removed; and forwarding the filtered electronic mail to the actual electronic mail address of the user.

25. The system of claim 15, wherein the at least one proxy server determines an amount due to complete the at least one purchase transaction by:

determining a total amount due to complete the at least one purchase transaction;

determining a value of applicable credits selected from a group consisting of coupons, merchant incentives, and surrogate system incentives; and subtracting the value of applicable credits from the total amount due to get the amount due.

26. The system of claim 15, wherein payment for the at least one purchase includes determining if the available credit of the surrogate funding source is sufficient to cover a purchase amount of the at least one purchase transaction.

27. The system of claim 15, wherein payment for the at least one purchase transaction comprises:

determining if a balance of the at least one user account is enough to cover the amount due; and increasing the balance of the at least one user account if the balance is not enough, the increasing including receiving and aggregating funds from a plurality of fund sources.

28. A device for controlling electronic commerce transactions, comprising at least one surrogate processing system including a database coupled among at least one client computer and at least one electronic merchant system and a surrogate web site and at least one financial system and at least one transparent proxy server, wherein the at least one surrogate processing system is configured to:

fund at least one surrogate account in the database;

access the at least one electronic merchant system to allow selection of items for purchase from the at least one electronic merchant system using the at least one client computer;

select at least one surrogate credit card account;

determine an amount due to complete at least one purchase transaction on the at least one electronic merchant system;

transfer funds equal to the amount due from the at least one surrogate account to the at least one surrogate credit card account; and execute the at least one purchase transaction using the at least one surrogate credit card account, wherein the at least one surrogate processing system is further configured to reconcile transactions for the at least one credit card account by:

maintaining a surrogate system ledger including at least one balance for the at least one surrogate account and at least one corresponding purchase transaction record;

periodically receiving a credit card account statement ledger including purchase transactions resulting in a change in the at least one balance; and using the credit card account statement ledger to adjust the surrogate system ledger.

29. The device of claim 28, wherein the at least one surrogate processing system is further configured to perform fraud detection scoring on at least one fund source.

30. The device of claim 28, wherein funding comprises placing funds in the at least one surrogate account from at least one fund source, wherein the at least one fund source includes at least one fund source selected from a group consisting of credit cards, checks, money orders, gift certificates, incentives, online electronic currency, Automatic Teller Machines, and stored value cards.

31. The device of claim 30, wherein incentives comprise incentive codes resulting from the purchase of a product.

32. The device of claim 30, wherein funding using online electronic currency comprises:

determining a plurality of online electronic currency balances in a plurality of accounts at a plurality of locations on at least one network;

aggregating an amount of online electronic currency from the plurality of accounts.

33. The device of claim 28, wherein the at least one surrogate processing system is further configured to:

compile records of purchase transactions completed through the surrogate electronic system;

present to a user at least one list of merchants rank ordered according to the compiled records.

34. The device of claim 28, wherein the at least one surrogate processing system is further configured to control information provided through the surrogate electronic system from the at least one electronic commerce system using the at least one transparent proxy server, wherein the at least one transparent proxy server includes at least one shopping proxy server and at least one email proxy server.

35. The device of claim 34, wherein the control of information comprises:

monitoring data streams;

performing pattern recognition on data streams transferred from the at least one electronic commerce system;

determining content of the data streams;

controlling information provided to the at least one client computer from the at least one electronic commerce system in response to the content.

36. The device of claim 35, wherein controlling information includes at least one operation selected from a group consisting of inserting additional information into the data stream, substituting information in the data stream, filtering information in the data stream, and removing information from the data stream.

37. The device of claim 34, wherein the control of information comprises:

assigning a surrogate electronic mail address to a user that is mapped to an actual electronic mail address of the user;

providing the surrogate electronic mail address to the at least one electronic commerce system in response to requests for the actual electronic mail address;

filtering and categorizing electronic mail received from the at least one electronic commerce system, wherein sensitive information of the surrogate electronic system is removed; and forwarding the filtered electronic mail to the actual electronic mail address of the user.

38. The device of claim 28, wherein determining an amount due to complete at least one purchase transaction comprises:

determining a total amount due to complete the at least one purchase transaction;

determining a value of applicable credits selected from a group consisting of coupons, merchant incentives, and surrogate system incentives; and subtracting the value of applicable credits from the total amount due to get the amount due.

39. The device of claim 28, wherein selecting at least one surrogate credit card account includes determining if the available credit of the at least one surrogate credit card account is sufficient to cover a purchase amount of the at least one purchase transaction.

40. The device of claim 28, wherein transferring funds comprises:

determining if a balance of the at least one surrogate credit card account is enough to cover the amount due; and increasing the balance of the at least one surrogate credit card account if the balance is not enough, the increasing including receiving and aggregating funds from a plurality of fund sources.

41. A computer readable medium containing executable instructions which, when executed in a processing system, causes the system to control electronic commerce transactions, the control comprising:

funding at least one surrogate account in a surrogate electronic system;

accessing at least one electronic commerce system through the surrogate electronic system;

selecting at least one item for purchase from the at least one electronic commerce system;

selecting at least one credit card account in the surrogate electronic system;

determining an amount due to complete at least one purchase transaction on the at least one electronic commerce system;

transferring funds equal to the amount due from the at least one surrogate account to the at least one credit card account;

executing the at least one purchase transaction using the at least one credit card account; and reconciling transactions for the at least one credit card account, wherein reconciling includes:

maintaining a surrogate system ledger including at least one balance for the at least one surrogate account and at least one corresponding purchase transaction record;

periodically receiving a credit card account statement ledger including purchase transactions resulting in a change in the at least one balance; and using the credit card account statement ledger to adjust the surrogate system ledger.

42. The computer readable medium of claim 41, wherein funding comprises placing funds in the at least one surrogate account from at least one fund source, wherein the at least one fund source includes at least one fund source selected from a group consisting of credit cards, checks, money orders, gift certificates, incentives, online electronic currency, Automatic Teller Machines, and stored value cards, wherein funding using online electronic currency includes determining a plurality of online electronic currency balances in a plurality of accounts, and aggregating an amount of online electronic currency from the plurality of accounts.

43. The computer readable medium of claim 41, wherein the control further comprises:

compiling records of purchase transactions completed through the surrogate electronic system;

presenting at least one list of merchants rank ordered according to the compiled records.

44. The computer readable medium of claim 43, wherein incentives comprise incentive codes resulting from the purchase of a product.

45. The computer readable medium of claim 41, wherein the control further comprises controlling information provided through the surrogate electronic system from the at least one electronic commerce system.

46. The computer readable medium of claim 45, wherein controlling information comprises:

monitoring data streams;

performing pattern recognition on data streams transferred from the at least one electronic commerce system;

determining content of the data streams; and controlling information provided from the at least one electronic commerce system in response to the content.

47. The computer readable medium of claim 46, wherein controlling information includes at least one operation selected from a group consisting of inserting additional information into the data stream, substituting information in the data stream, filtering information in the data stream, and removing information from the data stream.

48. The computer readable medium of claim 45, wherein controlling information comprises:

assigning a surrogate electronic mail address to a user that is mapped to an actual electronic mail address of the user;

providing the surrogate electronic mail address to the at least one electronic commerce system in response to requests for the actual electronic mail address;

filtering and categorizing electronic mail received from the at least one electronic commerce system, wherein sensitive information of the surrogate electronic system is removed; and forwarding the filtered electronic mail to the actual electronic mail address of the user.

49. An electromagnetic medium containing executable instructions which, when executed in a processing system, causes the system to control electronic commerce transactions, the control comprising:

funding at least one surrogate account in a surrogate electronic system;

accessing at least one electronic commerce system through the surrogate electronic system;

selecting at least one item for purchase from the at least one electronic commerce system;

selecting at least one credit card account in the surrogate electronic system;

determining an amount due to complete at least one purchase transaction on the at least one electronic commerce system;

transferring funds equal to the amount due from the at least one surrogate account to the at least one credit card account;

executing the at least one purchase transaction using the at least one credit card account;

reconciling transactions for the at least one credit card account, wherein reconciling includes:

maintaining a surrogate system ledger including at least one balance for the at least one surrogate account and at least one corresponding purchase transaction record;

periodically receiving a credit card account statement ledger including purchase transactions resulting in a change in the at least one balance; and using the credit card account statement ledger to adjust the surrogate system ledger.

50. The electromagnetic medium of claim 49, wherein funding comprises placing funds in the at least one surrogate account from at least one fund source, wherein the at least one fund source includes at least one fund source selected from a group consisting of credit cards, checks, money orders, gift certificates, incentives, online electronic currency, Automatic Teller Machines, and stored value cards, wherein funding using online electronic currency includes determining a plurality of online electronic currency balances in a plurality of accounts, and aggregating an amount of online electronic currency from the plurality of accounts.

51. The electromagnetic medium of claim 50, wherein incentives comprise incentive codes resulting from the purchase of a product.

52. The electromagnetic medium of claim 49, wherein the control further comprises:

compiling records of purchase transactions completed through the surrogate electronic system;

presenting at least one list of merchants rank ordered according to the compiled records.

53. The electromagnetic medium of claim 49, wherein the control further comprises controlling information provided through the surrogate electronic system from the at least one electronic commerce system.

54. The electromagnetic medium of claim 53, wherein controlling information comprises:

monitoring data streams;

performing pattern recognition on data streams transferred from the at least one electronic commerce system;

determining content of the data streams; and controlling information provided from the at least one electronic commerce system in response to the content.

55. The electromagnetic medium of claim 54, wherein controlling information includes at least one operation selected from a group consisting of inserting additional information into the data stream, substituting information in the data stream, filtering information in the data stream, and removing information from the data stream.

56. The electromagnetic medium of claim 53, wherein controlling information comprises:

assigning a surrogate electronic mail address to a user that is mapped to an actual electronic mail address of the user;

providing the surrogate electronic mail address to the at least one electronic commerce system in response to requests for the actual electronic mail address;

filtering and categorizing electronic mail received from the at least one electronic commerce system, wherein sensitive information of the surrogate electronic system is removed; and forwarding the filtered electronic mail to the actual electronic mail address of the user.

* * * * *

UNITED STATES PATENT AND TRADEMARK OFFICE

CERTIFICATE OF CORRECTION

PATENT NO. : 7,006,993 B1
APPLICATION NO. : 09/579787
DATED : February 28, 2006
INVENTOR(S) : Leslie Cheong et al.

It is certified that error appears in the above-identified patent and that said Letters Patent is hereby corrected as shown below:

(1) In claim 1, column 35, line 13, the term "chance" should be read as --change--; and (2) In claim 49, column 41, line 34, after "account" the word --and-- should be inserted.

Signed and Sealed this

Nineteenth Day of September, 2006

JON W. DUDAS
*Director of the United States Patent and Trademark Office*